United States Patent
Siminoff et al.

(10) Patent No.: US 10,922,547 B1
(45) Date of Patent: Feb. 16, 2021

(54) LEVERAGING AUDIO/VIDEO RECORDING AND COMMUNICATION DEVICES DURING AN EMERGENCY SITUATION

(71) Applicant: Amazon Technologies, Inc., Seattle, WA (US)

(72) Inventors: James Siminoff, Pacific Palisades, CA (US); Elliott Lemberger, Santa Monica, CA (US); Jih-Sheng Liu, Taipei (TW)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 16/141,098

(22) Filed: Sep. 25, 2018

(51) Int. Cl.
| G06K 9/00 | (2006.01) |
| H04N 5/232 | (2006.01) |
| G08B 25/00 | (2006.01) |
| G06F 9/54 | (2006.01) |
| G06F 16/29 | (2019.01) |

(52) U.S. Cl.
CPC ......... *G06K 9/00718* (2013.01); *G06F 9/542* (2013.01); *G06F 16/29* (2019.01); *G06K 9/00744* (2013.01); *G08B 25/001* (2013.01); *G08B 25/009* (2013.01); *H04N 5/23206* (2013.01); *G06K 2009/00738* (2013.01)

(58) Field of Classification Search
None
See application file for complete search history.

(56) References Cited

U.S. PATENT DOCUMENTS

| 7,680,947 B2* | 3/2010 | Nicholl ............... G08B 13/196 709/231 |
| 8,645,485 B1* | 2/2014 | Yadid ............... H04N 21/25891 709/203 |
| 8,934,015 B1* | 1/2015 | Chi ........................ G06F 3/167 348/158 |
| 9,009,596 B2* | 4/2015 | Ortiz .................. H04N 1/32101 715/716 |
| 9,418,703 B2* | 8/2016 | Abbate ................ H04N 9/8205 |
| 2011/0018998 A1* | 1/2011 | Guzik ................ G06K 9/00221 348/143 |
| 2011/0092248 A1* | 4/2011 | Evanitsky .............. G08B 25/08 455/556.1 |
| 2012/0092161 A1* | 4/2012 | West .................... G08B 25/016 340/540 |

(Continued)

*Primary Examiner* — Fernando Alcon
(74) *Attorney, Agent, or Firm* — Greenberg Traurig, LLP

(57) ABSTRACT

A method for monitoring an active fire is provided. The method receives a request from an authorized party for live audio/video (A/V) data from a geographical area of the fire. The method identifies a plurality of A/V recording and communication devices in the geographical area of the fire. The method sends an authorization request to a plurality of client devices that each is associated with at least one of the A/V recording and communication devices, the authorization request for accessing live A/V data generated by the A/V recording and communication devices. The method receives authorization from at least one of the client devices for accessing the live A/V data generated by at least one A/V recording and communication device associated with the at least one client device. The method provides the live A/V data generated by the at least one A/V recording and communication device to the authorized party.

17 Claims, 30 Drawing Sheets

(56) References Cited

U.S. PATENT DOCUMENTS

| | | | |
|---|---|---|---|
| 2012/0224826 A1* | 9/2012 | Caudle | H04N 5/91 386/224 |
| 2013/0063489 A1* | 3/2013 | Hourie | G06T 17/05 345/643 |
| 2016/0192009 A1* | 6/2016 | Sugio | G06K 9/3241 725/32 |
| 2017/0180780 A1* | 6/2017 | Jeffries | H04N 21/4307 |
| 2017/0251347 A1* | 8/2017 | Mehta | H04W 4/90 |
| 2017/0287170 A1* | 10/2017 | Perona | G06K 9/00664 |
| 2019/0373219 A1* | 12/2019 | Sautner | G06K 9/00744 |

\* cited by examiner

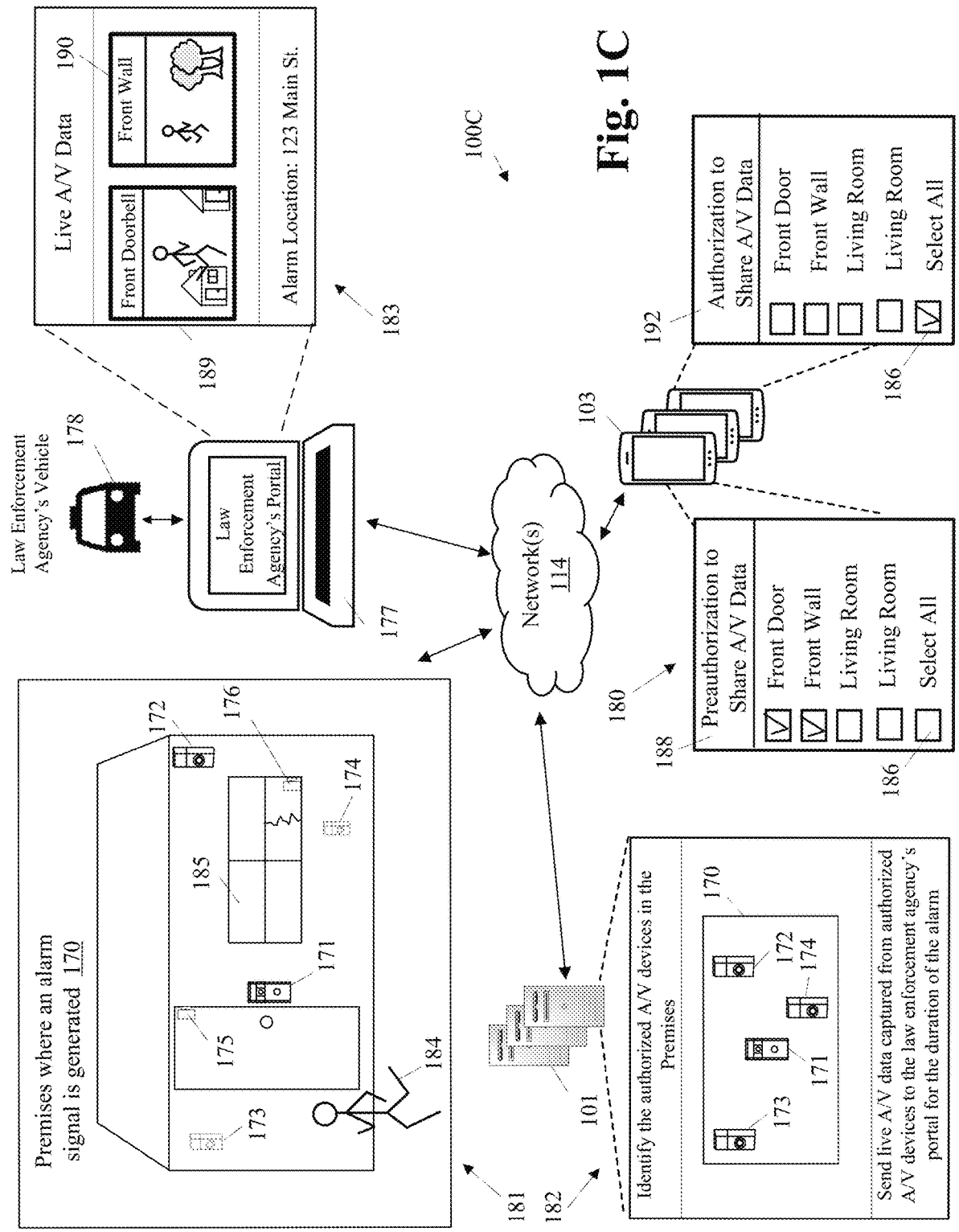

LEVERAGING AUDIO/VIDEO RECORDING AND COMMUNICATION DEVICES DURING AN EMERGENCY SITUATION

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present leveraging audio/video recording and communication devices during an emergency situation now will be discussed in detail with an emphasis on highlighting the advantageous features. These embodiments depict the novel and non-obvious leveraging audio/video recording and communication devices during an emergency situation shown in the accompanying drawings, which are for illustrative purposes only. These drawings include the following figures, in which like numerals indicate like parts:

FIG. 1C is a functional diagram illustrating an embodiment of a system for capturing live A/V data by one or more A/V devices during an alarm condition and sharing the A/V data with a law enforcement agency for the duration of the alarm condition, according to various aspects of the present disclosure;

DETAILED DESCRIPTION

Figure 1A:
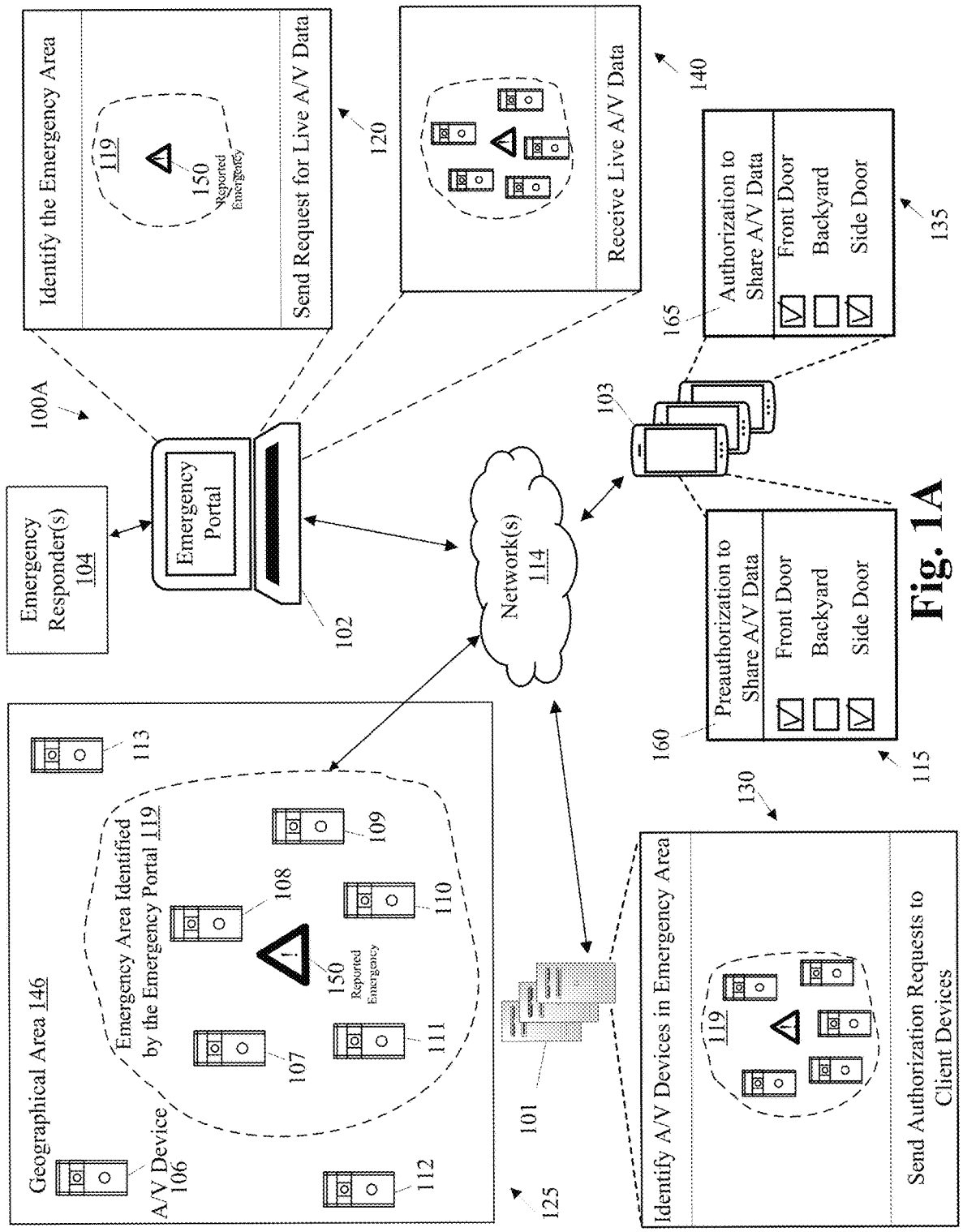
FIG. 1A is a functional diagram illustrating an embodiment of a system for recording A/V data of an active emergency and sharing the footage with an authority, in real-time, according to various aspects of the present disclosure.

One aspect of the present embodiments includes the realization that, historically, security systems have been designed and intended to protect only the property at which the security systems are installed. A typical security system is self-contained, and provides a warning, and/or audio/video data recorded by the security system devices, to the property owner during an emergency situation (e.g., when an intrusion is detected at the property, when fire is detected by a security camera of a security system, etc.). However, potential threats detected by one or more security devices of one or more properties within a neighborhood are not reported to emergency authorities for monitoring, and/or containing/managing, the emergency threats. An authority may use live audio/video data recorded by one or more audio/video (A/V) recording and communication devices (also referred to herein as "A/V devices") to monitor and/or track the active events (e.g., emergency events) as they occur. The authority may also use the live A/V data to gain additional information regarding a live event. As an example, if there is a fire emergency, a fire department agency may leverage one or more A/V devices to monitor and/or track the fire as it moves from one geographical location to another. It would be advantageous, then, to enhance the functionality of the A/V devices that are available in a surrounding area by facilitating easy sharing of the live A/V data recorded by such devices with such an authority.

The present embodiments, as described in detail below, provide this enhancement. In particular, the present embodiments may enable the live A/V data captured by the A/V device(s) to be readily shared with a requesting party (e.g., a fire department agency in case of a fire). In addition, the present embodiments may allow the requesting party to gain permission from one or more users of the one or more A/V devices to share the live A/V data captured by the A/V devices during an active event, such as an emergency. The permission may be a preauthorization or a real-time authorization given by the user(s) when an active event occurs in a geographical area.

The remaining detailed description describes the present embodiments with reference to the drawings. In the drawings, reference numbers label elements of the present embodiments. These reference numbers are reproduced below in connection with the discussion of the corresponding drawing features.

FIG. 1A is a functional diagram illustrating an embodiment of a system 100A for recording A/V data of an active emergency and sharing the footage with an authority, in real-time, according to various aspects of the present disclosure. The system 100A may provide an interface or portal for emergency responder(s) 104 to swiftly respond to an emergency case. Examples of different types of emergency cases may include fire, crime, public safety threat, explosion, medical, natural disaster (e.g., earthquake, hurricane, tornado, flood, mudslide, avalanche, volcanic eruption), etc. The authority to share the live A/V data may be different depending on the type of emergency and may include one or more authorized parties, such as a fire department, a state agency, a federal agency, a police department, a sheriff's department, etc. With reference to FIG. 1A, the system 100A may include one or more client devices 103, one or more A/V devices 106-113, one or more networked devices 101, and one or more emergency portals 102 that are connected to each other by one or more networks 114. For simplicity, only one emergency portal 102 is shown in FIG. 1A.

Each of the A/V devices 106-113 may include a camera, a microphone, a speaker, a wireless communication interface, etc. The A/V devices 106-113 may also include one or more motion sensors and/or motion detection software to detect motion when an object (e.g., a person, an animal, a vehicle) appears in the field(s) of view of the camera. The A/V devices 106-113 may record a video clip of the object that triggered the motion event. In addition, or in lieu of recording the video clip, the A/V devices may record an audio clip and/or take one or more still images. Although the term video clip is used in several examples in this specification, the present embodiments are equally applicable to video clips with audio, video clips without audio, audio clips without video, and a group of one or more still images, which are collectively referred to as the A/V data.

The motion detection functionality may activate or trigger any authorized A/V device(s) to capture and share A/V data with a requesting party. For example, when a trespasser, such as a burglar, enters a restricted area, the motion detection sensor may (i) detect motion in the area; (ii) automatically start recording video of the area; and (iii) share the video with one or more security agents (e.g., law enforcement agency, security agency, etc.). This may allow the security agents to swiftly respond to the trespasser that has entered the restricted area. As another example, for the same emergency case, if there are multiple A/V devices around the restricted area, multiple A/V devices may be triggered around the area to capture and share the live A/V data with the security agent(s).

The A/V devices 106-113 may be equipped with other types of sensors to automatically detect or identify an active emergency. For example, for automatic fire detection, the A/V devices may be equipped with a smoke detector; for automatic carbon monoxide detection, the A/V devices may be equipped with a carbon monoxide detector; for earthquake or other natural disaster detection, the A/V devices may be equipped with a seismic sensor; etc. The A/V devices 106-113, in addition to, or in lieu of, including the sensors/detectors, may perform computer data processing (vision, audio, and/or image) to detect active live events, such as smoke, flames, running water, falling debris, etc.

With reference to FIG. 1A, the A/V devices 106-113 may be spread across a geographical area 146. There may be one or more A/V devices around a given location in the geographical area. The A/V devices around a location may be associated with, and/or controlled by, an entity. Examples of different types of entity may include owner, company, enterprise, local agency, government agency, etc. As will be described in detail below, only a select few but not all of the A/V devices 106-113 in a given location may be available to capture A/V data for the emergency portal 102.

The client devices 103 may send one or more authorizations to the networked devices 101 to share live A/V data with the emergency portal 102. The authorization may be a preauthorization or a real-time authorization. The preauthorization 160 may be received prior to the emergency being reported, whereas the real-time authorization 165 may be received after the emergency is reported.

With further reference to FIG. 1A, an emergency 150 is reported in the geographical area 146. The preauthorization 160 may be received at the networked devices 101, from the client device(s) 103, at any time prior to the reported emergency 150. The preauthorization 160 may be a menu option in an application or program that runs on a client device 103. In some aspects of the present embodiments, the networked device(s) 101 may send preauthorization request(s) to the client device(s) 103.

The client device 103 may send a request to the networked devices 101 to opt out of the preauthorization or change the authorization status from being authorized to being nonauthorized. In some aspects of the present embodiments, if a client device 103 opts out of preauthorization, the same client device may be notified by the networked devices 101 requesting permission to capture and share data with the emergency portal 102 when an emergency is reported.

Similar to the preauthorization option 160, the real-time authorization 165 may be controlled with a client application (e.g., apps, software, web portal, etc.) that operates on the client devices 103. The user of a client device 103 may wish to turn off receiving real-time permission requests with the client device 103. The real-time notification may be received at the client device 103 as an event notification. The event notification may be displayed as a pop-up banner on the display of the client device 103. The event notification may include a short text identifying the type of the live event (e.g., live emergency event, such as fire, crime, and medical), the identification of a set of one or more A/V devices, and the time and date that an emergency was reported around or near the reported area.

The event notification, in some aspects of the present embodiments, is a push notification that may be displayed on a display of the client device 103 even when the client device is executing an application unrelated to the management and control of the A/V devices. In some aspects of the present embodiments, the event notification may be displayed on the display of the client device 103 when the client device is in a locked mode. In some aspects of the present embodiments, a client device 103 is in the locked mode when only a reduced set of controls can be used to provide input to the device. In some aspects of the present embodiments, when the display of the client device 103 is turned off (e.g., to save battery power), the client device may turn on the display and display the event notification. In addition to, or in lieu of, displaying a banner, the client device 103 may play an audio sound (such as one or more tones, one or more chimes, etc.), and/or the client device 103 may vibrate one or more times to draw the attention of the user of the client device 103.

The preauthorization 160 and/or real-time authorization 165 may be for sharing A/V data by one A/V device or multiple A/V devices. With reference to FIG. 1A, if a user has three A/V devices, one on the front door, a second on the backyard, and a third on the side door, the user may use the client device 103 to select one or more of the A/V devices for preauthorization. In the example of FIG. 1A, for both preauthorization and real-time authorization, the users of the client devices have chosen to share A/V data from only the front and the side door, and not the backyard. With the client device 103, a user may also choose not to share any live A/V data with a requesting party.

The networked devices 101 may be notified by the emergency portal 102 that there is an area 119 within the geographical area 146 where an emergency 150 has been reported. This area 119 may also be referred to herein as an emergency area and/or an area with a reported active event. Thus, in some aspects of the present embodiments, the emergency area 119 is the nearby area surrounding the reported emergency 150. As will be described in detail below, in some of the present embodiments, the emergency portal 102 may be used to identify the emergency area 119 and provide the data relating to the area to the networked device(s) 101. In other embodiments, one of the A/V devices 116-113 may capture the A/V data of an emergency, send the A/V data to a networked device(s) 101, and the networked device(s) 101 may automatically identify authorized A/V devices in the same area and activate them to capture the live A/V data of the emergency.

After receiving the identification data (e.g., an address, geographical coordinates system (GCS), map data, etc.) of the emergency area 119, the networked devices 101 may use the identified emergency area 119 to identify the A/V devices 106-113 that are located within the emergency area, and request live A/V data from the identified A/V devices 107-111 (e.g., from the A/V devices that have granted preauthorization or live authorization). In the example of FIG. 1A, the A/V devices 107-111 are within the emergency area 119 identified by the emergency portal 102.

With continued reference to FIG. 1A, the networked devices 101 may perform different tasks or operations based on an A/V device's authorization status. If an A/V device is preauthorized to share the live A/V data, the networked devices 101 may identify the A/V device, determine that the A/V device is preauthorized to share the live A/V data, and then provide access to the live A/V data by the emergency portal 102. The capturing of live A/V data near the reported area of the event may occur when the A/V device is triggered or set off (e.g., by motion detection, sensors, data processing, etc.). In some aspects of the present embodiments, the networked devices 101 may provide access to each authorized A/V device (107-111) in the emergency area 119, regardless of whether the A/V device is capturing an event or not. That is, in some aspects of the present embodiments, if the A/V device is already triggered and capturing the A/V data, then the A/V device may provide the live data to the networked devices 101 through the networks 114. If the A/V device is not triggered, the A/V device may start capturing the A/V data and provide the captured data to the networked devices 101 after receiving a request (or an activating signal), for example, from the emergency portal 102.

If an A/V device (107-111) within the emergency area 119 is not preauthorized to share live A/V data, the networked devices 101 may identify the A/V device, determine that the A/V device is not preauthorized to share live A/V data, and then send an authorization request to one or more client devices 103 that is associated with that A/V device. Once the user of a client device 103 confirms the authorization request, the network devices 101 may receive confirmation of the authorization and may provide access to any A/V data captured by the authorized A/V device.

The A/V devices 106-113, the networked device(s) 101, and the emergency portal 102, in some aspects of the present embodiments, may perform computer vision, audio, and/or image processing to determine whether the A/V data depicts one or more objects and/or events. As an example, the A/V devices 106-113, the networked device(s) 101, and the emergency portal 102, may use computer data processing to identify a burning fire, a person (e.g., a face), or some other object in the real world. As another example, audio data may be used to detect burglars in a restricted area or to detect requests for help from victims during a man-made or naturally caused emergency.

In some aspects of the present embodiments, the emergency portal 102 may perform one or more of different processes in order to update the geographical area of interest (e.g., the emergency area 119). For example, in case of a brushfire or wildfire, the emergency portal 102 may analyze the A/V data in a video stream received from an A/V device to identify the fire in the video stream (e.g., through computer vision, image processing, audio processing) and track the fire as it moves from one geographical location to another. In some aspects of the present embodiments, analysis of the data may be performed by the A/V devices 106-113 and/or the backend devices 101. If the fire moves to a location where there are other A/V devices within the current emergency area, the emergency portal 102 may choose to update the emergency area to a new geographical location. The emergency portal 102 may also use the results of A/V data analyzed by the networked device(s) 101 and/or the A/V devices 107-111 to update the geographical location.

In some aspects of the present embodiments, one or more of the A/V devices 106, 112, and 113 that are outside the currently identified emergency area 119 may also record A/V data as part of their routine operations. The A/V devices 106, 112, 113, and/or the networked devices 101 may analyze the recorded A/V data and identify signs of emergency (e.g., smoke from a fire) in the vicinity of the A/V devices 106, 112, 113. The sign of emergency may then be reported by the networked device(s) 101 (e.g., when the A/V device that has detected the signs of emergency is preauthorized to share the A/V data with the authority associated with the emergency portal 102. The emergency portal 102 may then use the signs of emergency to update the emergency area 119.

In some aspects of the present embodiments, the start of an emergency may be detected and/or reported by analyzing the A/V data recorded by an A/V device that is located in the emergency area. For example, one of the A/V devices 107-111 and/or the networked devices 101 may analyze the A/V data recorded by an A/V device and identify signs of emergency (e.g., smoke or flames from a fire) in the vicinity of the A/V device. The signs of emergency may then be reported by the networked device(s) 101 to the emergency portal 102 (e.g., when the A/V device that has detected the signs of emergency is preauthorized to share the A/V data with the authority associated with the emergency portal 102).

In some aspects of the present embodiments, the progress of an emergency may be monitored by analyzing the A/V data recorded by the authorized A/V devices 106-113 that are inside or in the vicinity of the currently identified emergency area 119. For example, any of the A/V devices 107-111, the networked devices 101, and/or the emergency portal 102 may analyze the A/V data recorded by the authorized A/V devices and determine that either the signs of the emergency (e.g., water from a flood, smoke and flames from a fire, etc.) are no longer detected in the A/V data and/or new signs of the emergency are detected. The networked device(s) 101 may then report the signs of the emergency to the emergency portal 102.

When an active emergency is over, the networked device(s) 101 may receive signal(s) or message(s) from the emergency portal 102 that the emergency has ended. Thereafter, the networked device(s) 101 may end or terminate sending the live A/V data to the emergency portal 102.

With reference to FIG. 1A, the emergency portal 102 may be used to identify the emergency area 119 based on the reported emergency 150. For instance, an authority associated with the emergency portal 102 (e.g., the fire department) may use the emergency portal 102 to specify an address that identifies a location to capture the live A/V data. In addition to, or in lieu of, specifying an address, the authorizing party may draw a shape (e.g., circle, polygon, square, arbitrary shape, etc.) that identifies the emergency area 119 on a map. In some aspects of the present embodiments, a geographic coordinate system (GCS) may be used to identify the location by the location's longitude and latitude values (e.g., when the reported location has no physical location address).

In addition to specifying a location, the emergency portal 102 may be used to update the emergency area 119. Examples of different updates may include changing the size and moving the emergency area 119. For example, there may be a case where no more emergencies exist in a portion (e.g., quarter, half, etc.) of the emergency area 119. In such a case, the emergency portal 102 may be used to change the emergency area and/or choose not to receive the live A/V data from the A/V devices located in that portion of the emergency area 119. Further, in some aspects of the present embodiments, one emergency area 119 may be split or separated into two or more emergency areas. For instance, one fire emergency area may be split into two or more if the fire grows in different directions. The emergency portal 102 may then be used to update the emergency area 119 and/or to define additional emergency areas.

The emergency area 119 may be updated based on motion detection, image processing, and/or some other detection techniques, as described above. When such an update occurs, the networked devices 101 may perform the above-described operations of identifying the A/V devices surrounding the updated emergency area. The emergency area 119 may also be updated based on reports that are received from sources different than the A/V devices 106-113 (e.g., from reports received from the emergency responder(s) 104, people within or in the vicinity of the emergency area 119, news media, etc.).

Having described the system 100A, an example operation will now be described by reference to steps 115-140 that are illustrated in FIG. 1A. In step 115, the client devices 103 may be used by the associated users to preauthorize the A/V devices 106-113 to share live A/V data with one or more authorities. In the example of FIG. 1A, a user may use a client device 103 to specify that two of the user's three A/V devices should be preauthorized. Thereafter, the authorization instruction may be sent from the client device to the networked device(s) 101. The preauthorization occurs prior to the reported emergency 150.

With reference to step 120 of FIG. 1A, an active emergency 150 may be reported to the emergency portal 102. The emergency portal 102 may receive the initial information about an active emergency 150 from any source such as news media, a person making a report, a signal received thorough a monitoring device associated with the emergency portal, a signal received from an A/V device in the emergency area, a signal received from the backend devices 101, etc.

For instance, a person may have spotted a crime and called the emergency operator, and the emergency operator has notified the law enforcement agency. Alternatively, an A/V device (that may or may not be preauthorized to share the A/V data) and/or the networked devices 101 may have detected the emergency by analyzing the A/V data, and may have reported and/or provided the A/V data to the emergency portal 102 associated with the law enforcement agency. The law enforcement agency may then dispatch the emergency responder(s) 104 (e.g., police officers, ambulance, etc.) to the reported location of the crime 150. Meanwhile, an authority user of the emergency portal 102 may input data regarding the location of the emergency 150.

In some aspects of the present embodiments, in step 120, the authority user may also identify the emergency area 119 around the reported location 150 of the emergency using the emergency portal 102. After identifying the emergency area 119, the emergency portal 102 may then send request(s) for receiving the live A/V data to the networked devices 101 (e.g., with the location of the reported emergency 150, emergency area 119, etc.).

In some of the present embodiments, when an emergency (e.g., a fire) breaks out, an A/V device that records the A/V data of the emergency may send the A/V data in step 120 to the networked devices 101. The A/V device and/or the networked devices 101 may identify the emergency (e.g., by analyzing the A/V data received from the A/V device). The networked devices 101 may then, automatically, identify and activate other A/V devices (e.g., the A/V devices with preauthorization to share the live A/V data) in the vicinity of the A/V device that recorded the A/V data of the emergency. The networked devices 101 may then provide the live streams from these A/V devices to the emergency portal 102.

In some of the present embodiments, the emergency portal 102 may use the live A/V data received from the A/V devices to identify the exact location of an emergency (e.g., the area that is currently burning in a fire, an area where a crime is taking place, etc.). The emergency portal may share the live A/V data with emergency responders such as, for example, firefighters, water dropping aircraft, evacuation helicopters, ambulances, police, etc. The emergency portal may also communicate with general public, for example, to issue a mandatory evacuation, to issue an emergency alert, to update the emergency status, etc.

Step 125 of FIG. 1A illustrates that the A/V devices 106-113 may be located at different areas or locations in the geographical area 146. As shown, a first group of A/V devices (106, 112, and 113) are located near the outer perimeters of the geographical area 146, while a second group of other A/V devices (107-111) are clustered near the middle of the geographical area 146. Further, in step 125, the second group of the A/V devices 107-111 may sense, detect, and/or perform other data processes (e.g., computer vision, video image processing, audio processing) to identify the reported active emergency 150, capture live A/V data, and/or share the live A/V data with the networked device(s) 101. This may be performed in order for the networked devices 101 to send notifications to the client devices 103 to request authorization to share the live A/V data.

With reference to step 130 of FIG. 1A, the networked device(s) 101 may identify the A/V devices 107-111 within the emergency area 119. This step may be performed to send authorization requests to the client devices 103 that may not have preauthorized sharing of the live A/V data. For instance, for each set of one or more A/V devices 107-111 that is not preauthorized in the emergency area 119, the network devices 101 may need to notify one or more users for authorization confirmation to share the live A/V data captured with the set of A/V devices with the emergency portal 102. In some aspects of the present embodiments, the identification of the A/V devices by the networked device(s) 101 may also be performed to share live A/V data with the client devices 103. As shown by step 130 of FIG. 1A, the networked device(s) 101 may report to the client devices 103 that there is a reported emergency 150 near the users' A/V devices 107-111, and any data captured with the users' A/V devices may be sent or streamed to the users' client devices 103.

In step 135 of FIG. 1A, for each A/V device (107-111) that is not preauthorized, a set of one or more client devices 103 may be notified by the networked devices 101. This may be performed for the networked device(s) 101 to alert the users that there is an active emergency to request for authorization, and/or to transmit any captured live A/V data to the users' client devices 103.

With further reference to step 135 of FIG. 1A, a notification may appear on each client device 103 that is associated with a set of one or more A/V devices 107-111 within the emergency area 119 that is not preauthorized to share live data with the emergency portal 102. Once the users of the client devices 103 provide input (permission) to share live A/V data, the instructions may be sent from the client devices 103 to the networked device(s) 101.

In some of the present embodiments, an A/V device may normally send A/V data to the networked device(s) 101 when an event (e.g., a motion event) is detected by the A/V device. However, the A/V device may also be instructed (e.g., by the user of a client device 103 associated with the A/V device) to send the live A/V data, regardless of whether or not there is an event detected by the A/V device. In some aspects of the present embodiments, when a user of a client device 103 authorizes sharing of the live A/V data from one or more A/V devices associated with the client device 103, the networked device(s) 101 may instruct the one or more A/V devices to continuously or periodically (or manually and upon a request from the portal 102 and for a period specified by the portal 102) send the live A/V data to the networked device(s) 101, regardless of whether or not an event is detected by the A/V devices. This may allow live monitoring of the emergency event by human operators and/or performing computer vision, image processing, and/ or audio processing of the live A/V data by the networked device(s) 101 and/or the emergency portal 102.

As shown in step 140 of FIG. 1A, the emergency portal 102 may already be receiving any captured live A/V data from the preauthorized A/V devices (107-111) within the emergency area 119. For each A/V device (107-111) that is not preauthorized, the emergency portal 102 may receive the live A/V data from the A/V device if that A/V device is capturing the reported emergency 150 and only after the client device(s) associated with the A/V devices send authorization to the networked device(s) 101 to share the live A/V data with the emergency portal 102.

With further reference to step 140 of FIG. 1A, the user of the emergency portal 102 may choose to end the active emergency. Thereafter, the networked device(s) 101 may receive instructions from the emergency portal 102 and stop sharing of the live A/V data with the emergency portal 102. In some aspects of present embodiments, the A/V devices 107-113 may capture A/V data and send them to the networked devices 101 as a part of their routine operations in order for the networked devices to send notifications and A/V data to the client devices 103. That is, when an emergency ends, the networked devices 101 may simply stop sharing the A/V data with the emergency portal 102, but the A/V devices 107-113 and the networked devices 101 continue their routine operations.

Further, in step 140 of FIG. 1A, the emergency area 119 may change in size, shape, location, etc. The emergency area 119 may also multiply as described above. In such cases, the networked device(s) 101 may be notified by the emergency portal 102 regarding the change. The networked device(s) 101, in some aspects of the present embodiments, may send authorization requests to additional A/V devices, may start sharing the A/V data from additional A/V devices in the new portions of the emergency area 119 associated with the client devices 103 that have preauthorized or have sent authorization to share the live A/V data, and/or may stop sharing the live A/V data from the A/V devices that are no longer in the emergency area 119. Lastly, in step 140 of FIG. 1A, the networked device(s) 101 may notify the client devices 103 that the active emergency event 150 has ended. If the networked device(s) 101 had previously sent instructions to one or more A/V devices to continuously or periodically send the live A/V data regardless of whether or not an event is detected by the one or more A/V devices, the networked device(s) 101 may send instructions to the one or more A/V devices to stop sending the live A/V data when no event is detected by the one or more A/V devices.

Figure 1B:
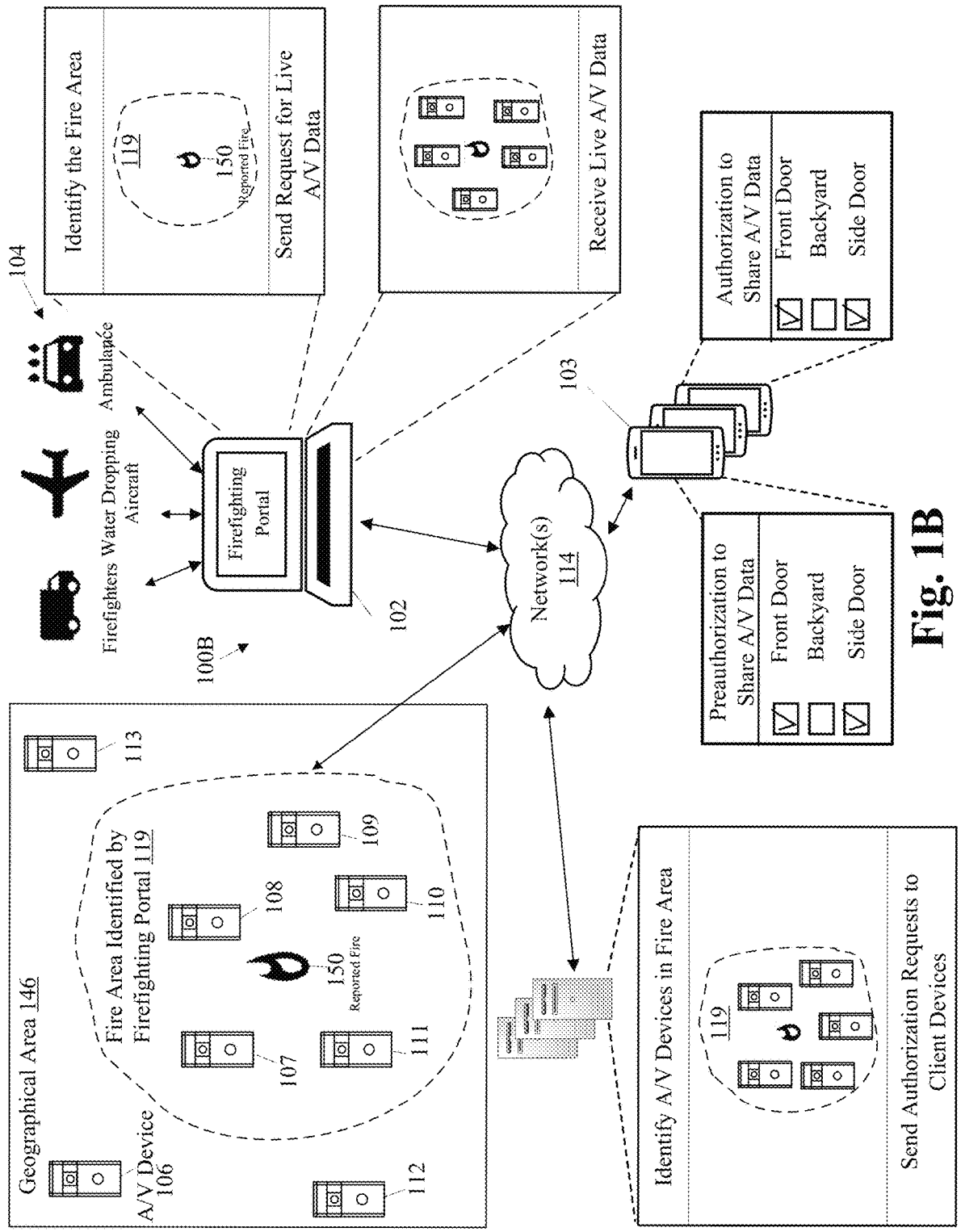
FIG. 1B is a functional diagram illustrating an embodiment of a system for recording A/V data of an active fire and sharing that A/V data with a firefighting authority, in real-time, according to various aspects of the present disclosure.

FIG. 1B is a functional diagram illustrating an embodiment of a system 100B for recording A/V data of an active fire and sharing that A/V data with a firefighting authority, in real-time, according to various aspects of the present disclosure. In the example described above by reference to FIG. 1A, the active event may be a reported emergency. FIG. 1B is similar to FIG. 1A, except that the reported emergency 150 is fire. With reference to FIGS. 1A and 1B, the primary differences are the following: the reported emergency 150 relates to a fire emergency, the emergency portal 102 has been replaced with a firefighting portal, and the emergency responders 104 have been changed to fire emergency responders (e.g., firefighters, water dropping aircraft, ambulance, etc.).

Another aspect of the present embodiments includes the realization that, an A/V device or a sensor in a security/alarm system may detect an intrusion to a premises and may generate a signal to inform a networked device, such as a backend server or a security hub device, of an alarm condition. The networked device (or an operator using the networked device) may then take different actions that may include informing a law enforcement agency (e.g., a police department) of the alarm condition. A problem that the law enforcement agency may face is that the law enforcement agency may not know whether the alarm condition is real or false. For example, there may be an intruder inside the premises, the intruder may or may not be armed, or the alarm condition may be false (e.g., the alarm may be triggered by a failed sensor, a child, an animal, a person who is authorized to be in the premises but has been unable to disarm the alarm system, etc.).

Some of the present embodiments solve the aforementioned problem by receiving preauthorization from a user associated with the premises to share the live A/V data from one or more A/V devices in the premises with the law enforcement agencies during an alarm condition. The networked device may then provide the live A/V data to a law enforcement agency's portal for the duration of the alarm condition. The networked device may stop providing the live A/V data to the law enforcement agency when the networked device receives a signal indicating the end of the alarm condition (e.g., when a person enters a password into a security hub in the premises or into a client device associated with the security/alarm system, when the law enforcement agency verifies that the alarm condition no longer exists, etc.).

FIG. 1C is a functional diagram illustrating an embodiment of a system 100C for capturing live A/V data by one or more A/V devices during an alarm condition and sharing the A/V data with a law enforcement agency for the duration of the alarm condition, according to various aspects of the present disclosure. The system 100C may provide an interface or portal for law enforcement agency's responders 178 to swiftly respond to an alarm activated by a security/alarm system associated with a premises 170. The law enforcement agency may be a police department, a sheriff's department, etc. With reference to FIG. 1C, the system 100C may include one or more client devices 103, one or more A/V devices 171-174, one or more security devices such as security/alarm sensors 175-176, one or more networked devices 101, and one or more emergency portals 177 that are connected to each other by one or more networks 114. For simplicity, only one emergency portal 177 is shown in FIG. 1C.

The security alarm sensors 176-177 may include, for example, at least one of a door sensor, a window sensor, a contact sensor, glass break sensor, a motion sensor, and/or other sensors that may provide the user/owner of a security/alarm system a notification of a security event at his or her property, for example by generating an alarm signal. The alarm signal may be sent to the networked devices 101 through the network(s) 114.

The A/V devices 171-174 may be installed inside a building structure 170 (e.g., the A/V devices 173 and 174) or installed on the outside of the building structure 170 (e.g., the A/V devices 171 and 172). The A/V devices may be used to capture A/V data. In some of the present embodiments, the A/V devices may be able to generate a security alarm. Each of the A/V devices 171-174 may include a camera, a microphone, a speaker, a wireless communication interface, etc. The A/V devices 171-174 may also include one or more motion sensors and/or motion detection software to detect motion when an object (e.g., a person, an animal, a vehicle) appears in the field(s) of view of the camera. The A/V devices 171-174 may record A/V data of the object that triggered the motion event.

The motion detection functionality may activate or trigger any authorized A/V device(s) to capture and share A/V data with a requesting party. For example, when a trespasser enters a restricted area (e.g., inside a building/residence), the motion detection sensor may detect motion in the area and may provide the user/owner of the security/alarm system a notification of a security event, for example by generating an alarm signal. The alarm signal may be sent to the networked devices 101 through the network(s) 114.

Once a security event is detected by a sensor 175-176 or by an A/V device 171-174, the sensor or the A/V device that has detected the security event may send a signal to a networked device 10, such as a security hub device and/or to a backend device 101 that is connected to the sensor or the A/V device through the network(s) 114. Depending on the security/alarm system set up and/or the location of the sensor or A/V device, the security/alarm system may either immediately declare an alarm condition or may delay declaring the alarm condition for a period of time to permit an authorized user (e.g., a homeowner) to cancel the alarm condition by entering an authorized code (also referred to as a security passcode) into a keypad of an alarm panel (e.g., a keypad on the security hub device).

In some aspects of the present embodiments, a user (or an owner) of the security/alarm system may authorize some or all A/V devices associated with the security/alarm system to automatically activate and start recording video of the area for the duration of the alarm condition. The authorized A/V devices may send the captured A/V data to the networked device(s) 101 and the networked device(s) 101 may send the captured A/V data to a law enforcement agency's portal 170. The A/V data may be sent from the A/V devices to the networked device(s) 101 and/or from the networked device(s) 101 to the law enforcement agency's portal 170 as streamed A/V data or as a A/V data file. The A/V data may be reviewed by law enforcement agency' personnel in real time to determine whether the law enforcement agency's responders have to be dispatched to the premises.

An example operation will now be described by reference to steps 180-183 illustrated in FIG. 1C. In step 180, the client devices 103 may be used by the associated users to preauthorize the A/V devices 171-174 to share live A/V data for the duration of an alarm with one or more law enforcement agencies. In the example of FIG. 1C, a user may use a client device 103 to specify (as shown by the preauthorization display 188) that two of the four user's A/V devices (in this example, the front door and front wall A/V devices) should be preauthorized. The authorization instruction may be sent from the client device to the networked device(s) 101. In some aspects of the present embodiments, the client device 103 may provide an option 186 for the user to authorize all A/V devices of a security/alarm system (e.g., all A/V devices associated with a premises) to activate and share live A/V data with one or more law enforcement agencies.

With reference to step 181 of FIG. 1C, the sensor 176 may detect a security event and may generate (when the security/alarm system for the premises 170 is armed) an alarm signal. For example, the sensor 176 may be a glass break sensor and an intruder 184 may have broken a glass on the window 185. Alternatively, the sensor 176 may be a window sensor and the intruder 184 may have attempted to open the window 185. The sensor 176 may send the alarm signal to the networked device(s) 101.

With reference to step 182 of FIG. 1C, the networked device(s) 101 may identify the authorized A/V devices associated with the security/alarm system of the premises 170. The networked device(s) 101 may then send (e.g., by streaming) the live A/V data captured by the authorized A/V devices to the law enforcement agency's portal 177.

With reference to step 183 of FIG. 1C, the law enforcement agency's portal 177 may display the live A/V data captured by one or more A/V devices for the duration of the alarm condition. In the example of FIG. 1C, the law enforcement agency's portal 177 may display (as shown by 189) the live A/V data from the front doorbell A/V device 175. The law enforcement agency's portal 177 may also display (as shown by 190) the live A/V data from the front wall camera A/V device 172. A person using the law enforcement agency's portal 177 may review the live A/V data from 189-190 and may determine whether or not the alarm condition require the law enforcement agency's responders 178 (e.g., a police vehicle) to be dispatched to the premises 170.

The networked device(s) 101, in step 182, may receive the alarm signal from the sensor 176 and may determine that none of the A/V devices 171-174 of the security/alarm system are authorized to share the live A/V data with the law enforcement agency's portal 177. As shown by step 184, in some aspects of the present embodiments, the networked device(s) 101 may send a request to one or more client devices 103 associated with the security/alarm system for authorization to share the live A/V data from the A/V devices of the security/alarm system with the law enforcement agency's portal 177. The client devices 103 may display a user interface 192 and may receive authorization to share the live A/V data with the law enforcement agency's portal 177 during the alarm condition. The networked device(s) 101 may then share the live A/V data with the law enforcement agency's portal 177 as described above with reference to step 183.

The networked device(s) 101 may get a signal indicating that the alarm condition is cleared. For example, a user associated with the security/alarm system may have entered a password through a security hub device's keypad (not shown) or a client device 103 to clear the alarm condition. Alternatively, a person reviewing the A/V data at the law enforcement agency's portal 177 or a law enforcement agency's responder 178 may determine that the alarm condition has cleared. The law enforcement agency's portal 177 may send a signal to the networked device(s) 101 to indicate that the alarm condition is cleared. The networked device(s) 101 may then stop sharing the live A/V data with the law enforcement agency's portal 177 and may send a signal to the authorized A/V devices 171-174 to stop capturing the live A/V data. The A/V devices may then continue their normal operation, for example, by capturing the live A/V data when a moving object is detected in one or more motion zones in the field of view of the A/V devices' camera.

Another aspect of the present embodiments includes the realization that, A/V devices may include motion sensors and/or motion detection software and send A/V data to one or more networked device when motion is detected within a zone around the A/V device. The A/V devices may not send the A/V data to the networked devices when no motion is detected in the field of view of the A/V device's camera. Therefore, during an earthquake, the A/V devices in the earthquake area may not capture and/or send the A/V data to the networked device.

Some of the present embodiments solve the aforementioned problem by including a gyro sensor in an A/V device. The gyro sensor may sense shaking during an earthquake and may send a signal to a processing unit of the A/V device indicating that an earthquake may have started. The processing unit may halt the normal operation of the A/V device and place the A/V device in a disaster mode or earthquake mode. The processing unit may send a signal to activate the A/V devices' camera to capture live A/V data during the earthquake. The processing unit may receive the A/V data from the camera and may send the A/V data to one or more networked devices and/or may store the A/V data in the A/V device's memory.

When the gyro sensor senses that the shaking has stopped, the gyro sensor may send a signal to the processing unit indicating that the earthquake may have stopped. In response, the processing unit may halt the disaster (or earthquake) mode and return the A/V device to the normal operation mode. The processing unit may send a signal to the camera to stop capturing A/V data for the disaster (or earthquake) mode.

Figure 1D:
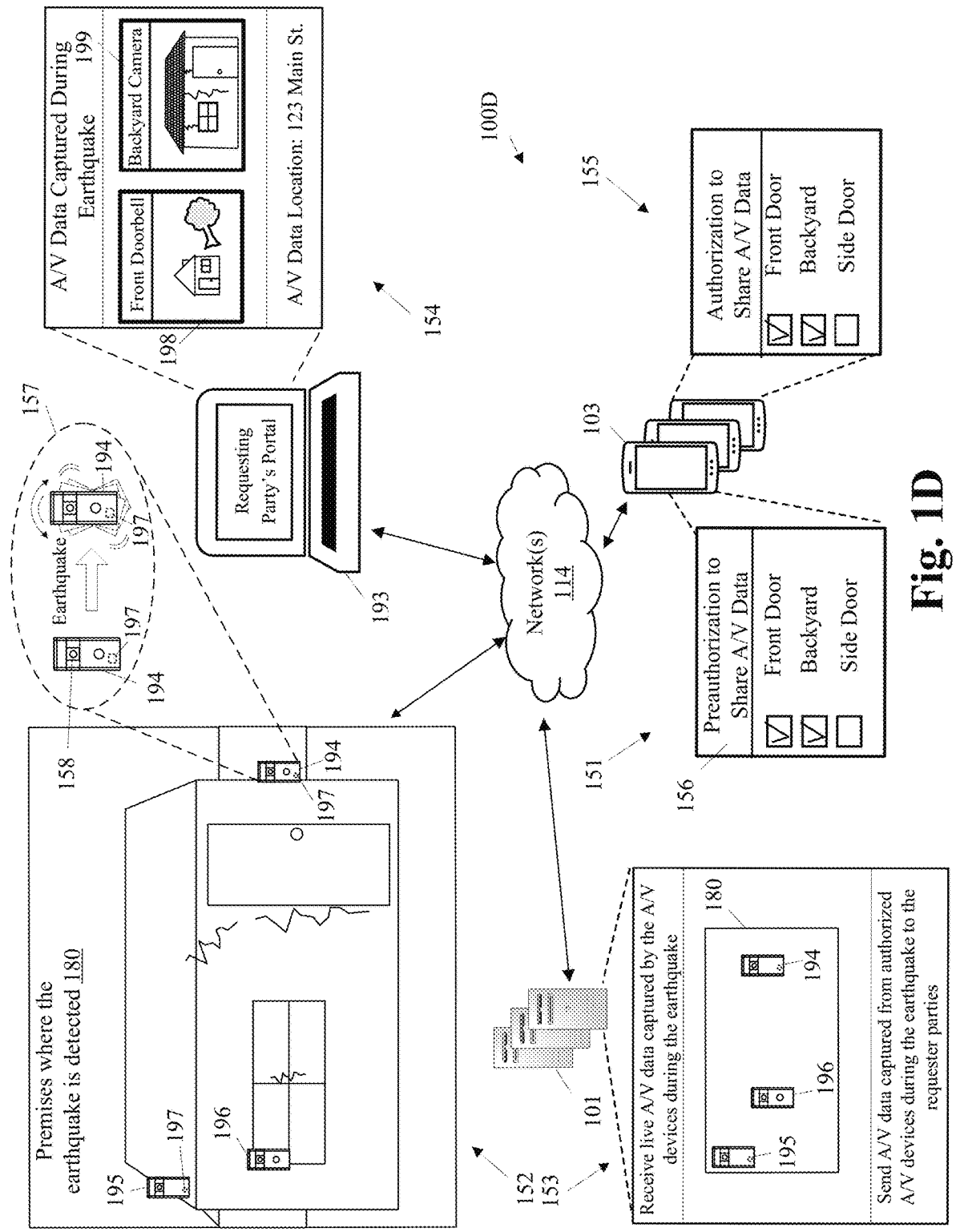
FIG. 1D is a functional diagram illustrating an embodiment of a system for recording live A/V data from one or more A/V devices during an earthquake and sharing the A/V data with an authorized requester, according to various aspects of the present disclosure.

FIG. 1D is a functional diagram illustrating an embodiment of a system 100D for recording live A/V data from one or more A/V devices during an earthquake and sharing the A/V data with an authorized requester, according to various aspects of the present disclosure. The system 100D may provide an interface or portal for a requesting party such as a news channel, a weather channel, a government agency, etc.

With reference to FIG. 1D, the system 100D may include one or more client devices 103, one or more A/V devices 193-195, one or more networked devices 101, and one or more requesting party's portals 196 that are connected to each other by one or more networks 114. For simplicity, only one requesting portal 196 is shown in FIG. 1D. In some of the present embodiments, one or more of the A/V devices 193-195 may include a gyro sensor (or gyroscope) 196 that may detect shaking during an earthquake. In other embodiments, one or more of the A/V devices 193-195 may include other types of inertial sensors (e.g., an accelerometer) that may be used to detect the occurrence of an earthquake. Although the term gyro sensor (or gyroscope) is used in several examples in this specification, the present embodiments are equally applicable to other types of inertial sensors. Different types of inertial sensors that may be used in an A/V device in different embodiments are described below with reference to FIGS. 3 and 4.

FIG. 1D, as shown includes five operational steps 151-155. In step 151, the client devices 103 may be used by the associated users to preauthorize the A/V devices that may have a gyro sensor 197 (e.g., the A/V devices 194-195) to capture live A/V data during an earthquake and share the A/V data with one or more requesting parties. In some of the present embodiments, an A/V device that includes a gyro sensor may automatically activate its camera (and microphones) during an earthquake and capture live A/V data. In these embodiments, the preauthorization in step 151 and the authorization at step 154 are used by the networked device(s) 101 to determine whether to share the A/V data captured during earthquake with requesting parties. When there are no preauthorization and/or authorization to share the A/V data captured during the earthquake, the networked device(s) 101 may only provide the A/V data captured during the earthquake with the client devices 103 that are associated with the A/V devices 194-195 (e.g., by streaming the A/V data) to the client devices 103 either during the earthquake and/or after the earthquake upon a request received from one of the client devices 103.

In the example of FIG. 1D, a user may use a client device 103 to specify (as shown by the preauthorization display 156) that two of the three user's A/V devices (in this example, the front door and backyard A/V devices) should be preauthorized. The authorization instruction may be sent from the client device to the networked device(s) 101.

With reference to step 152 of FIG. 1D, the gyro sensor 196 in the A/V devices 194-195 may sense shaking during an earthquake (e.g., as shown by the enlarged view 157 of the A/V device 194). The gyro sensor 197 in the A/V device 194 and may send a signal to a processing unit (not shown) of the A/V device 194 indicating that an earthquake may have started. The processing unit may halt the normal operation of the A/V device 194 and may place the A/V device 194 in an earthquake mode (or disaster mode). The processing unit may send a signal to activate the A/V devices' camera 158 to capture live A/V data during the earthquake. The processing unit may receive the A/V data from the camera 158 and may send the A/V data to one or more networked devices 101 and/or may store the A/V data in the A/V device's memory.

With reference to step 153 of FIG. 1D, the networked device(s) 101 may identify the authorized A/V devices associated with the security/alarm system of the premises 170. The networked device(s) 101 may then send (e.g., by streaming) the A/V data captured during the earthquake by the authorized A/V devices 194-195 to the requesting party's portal 193 during and/or after the earthquake. The networked device(s) 101 may also send (e.g., by streaming) the A/V data captured during the earthquake by the A/V devices 194-195 to one or more client devices 103 associated with the A/V devices 194-195 during and/or after the earthquake as a normal part of the networked device(s) 101 operation, regardless of whether or not preauthorization for sending the A/V data exists (e.g., because the client devices may belong to a person, such as an owner of the premises and receive the A/V data captured by the A/V devices in the premises as the normal operation of the security/alarm system of the premises).

With reference to step 154 of FIG. 1D, the requesting party's portal 193 may display (as shown by 198, 199) the A/V data captured during the earthquake by one or more A/V devices. In some of the present embodiments, the networked device(s) 101 may determine (in step 153) that none of the A/V devices 194-195 of the security/alarm system that include gyro sensors 197 are authorized to share the A/V data captured during the earthquake with the requesting party's portal 193. As shown by step 155, in some of the present embodiments, the networked device(s) 101 may send a request to one or more client devices 103 associated with the security/alarm system for authorization to share the A/V data captured during the earthquake with the requesting party's portal 193. The client devices 103 may display a user interface 159 and may receive authorization to share the A/V data captured during the earthquake with the requesting party's portal 193. The networked device(s) 101 may then share the A/V data captured during the earthquake with the requesting party's portal 193 as described above with reference to step 154. In some aspects of the present embodiments, the requesting party's portal 193 may be associated with a news channel, a weather channel, etc., and as a part of the preauthorization and/or authorization, the networked device(s) 101 and/or the requesting party's portal 193 may provide the A/V data captured during the earthquake by one or more A/V devices 194-195 with the news channel, the weather channel, etc., associated with the requesting party's portal 193.

In several of the examples described above, the active event is an emergency event. However, the active event may be any event that requires outside party authorization. As an example, the active event may be a sporting event, musical event, or some other event. Thus, it is to be understood that the active event may be any live event and not just an emergency event. The authorizing party may be any party that captures, tracks, and requests live event data from available authorized A/V devices.

Figure 2:
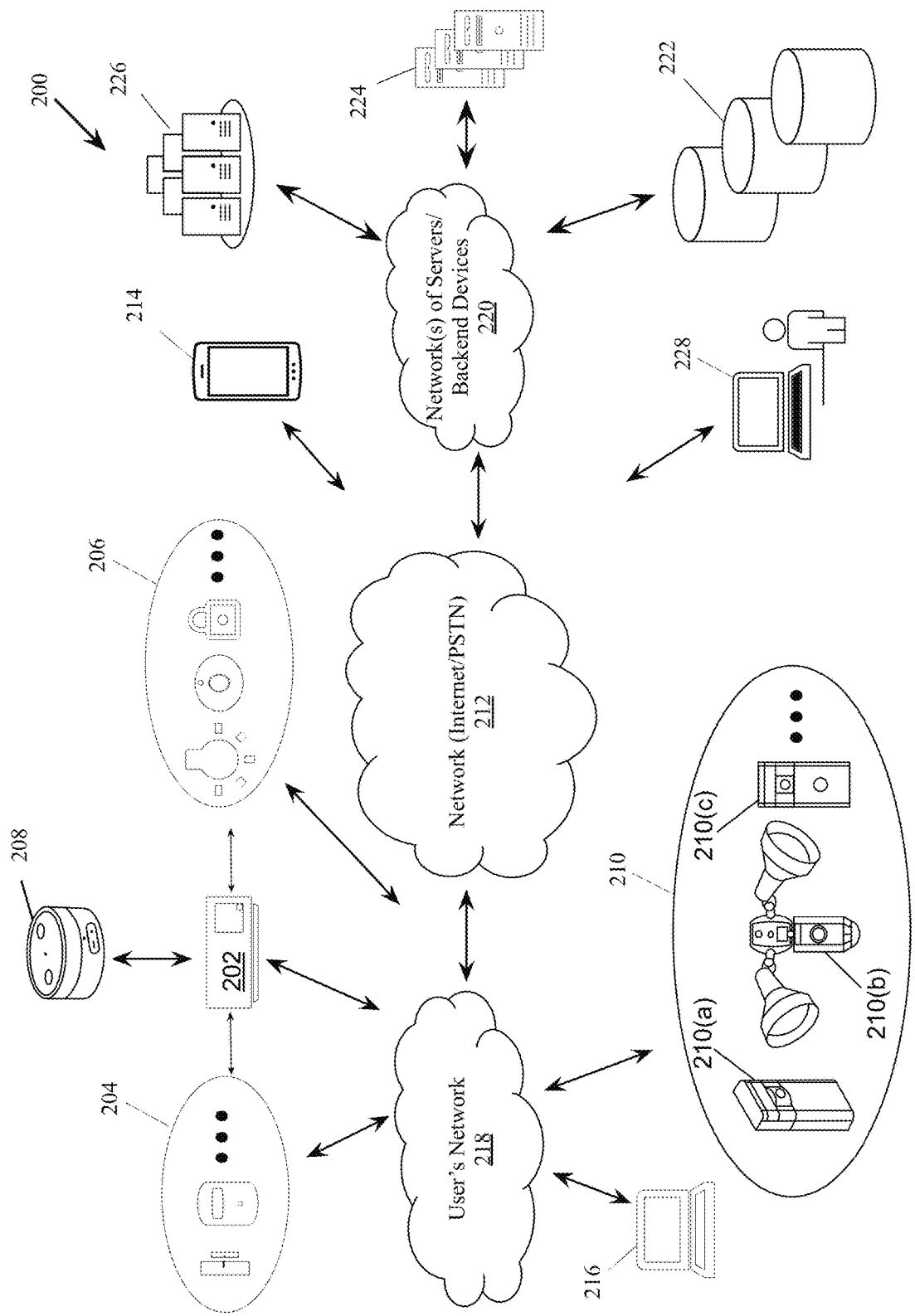
FIG. 2 is a functional block diagram illustrating a system for communicating in a network, according to various aspects of the present disclosure.

FIG. 2 is a functional block diagram illustrating a system 200 for communicating in a network, according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the A/V devices 106-113 of FIGS. 1A, 1B). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device(s) 103 of FIGS. 1A, 1B). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The network device(s) 101 of FIGS. 1A, 1B may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
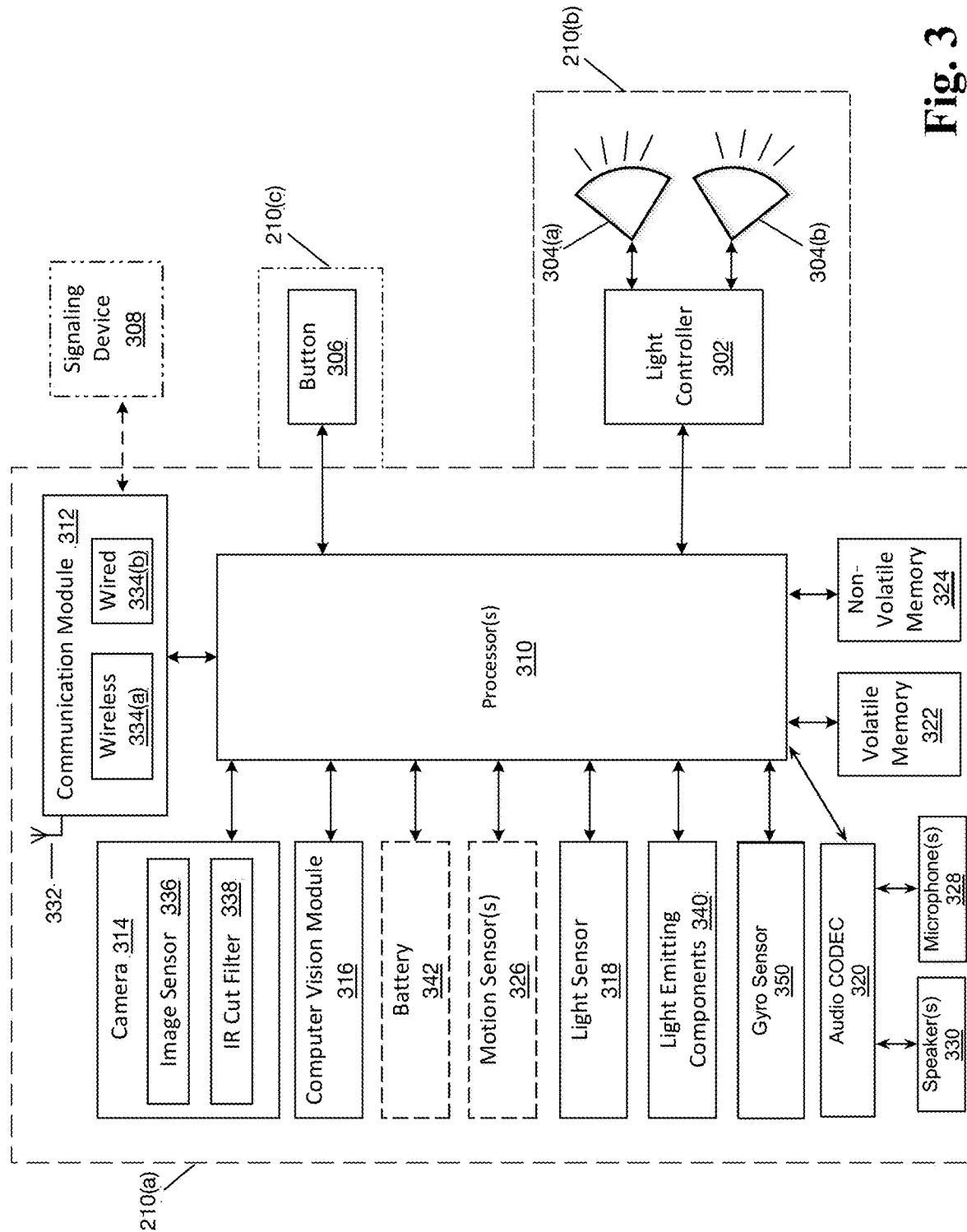
FIG. 3 is a functional block diagram of an A/V recording and communication device, according to various aspects of the present disclosure.

FIG. 3 is a functional block diagram for an audio/video (A/V) device, according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(*a*) and wired 334(*b*) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(*c*) is pressed, the communication module 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(*a*), 304(*b*) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(*a*), 304(*b*). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(*c*), the A/V device 210 may include the button 306. In embodiments where the button 306 is a mechanical button (e.g., has a range of movement), the button 306 may make contact with a button actuator located within the video doorbell 210(*c*) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(*c*), such as transmitting an output signal, using the communication module 312, to the signaling device 308 to cause the signaling device 308 to output a sound (e.g., via the wired 334(*b*) connection to the signaling device 308 and/or a wireless 334(*a*) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

With further reference to FIG. 3, the recording and communication A/V device 210 may comprise a gyro sensor 350. A gyro sensor (or a gyroscope) is a device that measures rotational motion. Some of the present embodiments may include a microelectromechanical system (MEMS) gyro sensor that is a miniaturized gyroscope. When a MEMS gyro sensor is rotated, a small resonating mass shifts as the angular velocity changes. The movement of the resonating mass is converted into an electrical signal that may be read by a processing unit. Other embodiments may include other types of gyro sensors and/or other inertial sensors, such as an accelerometer, that may be used to detect an earthquake. Other types of gyro sensor that some of the present embodiments may include, may be, without limitation, a tuning fork gyro sensor, a vibrating-wheel gyro sensor, a wine glass resonator gyro sensor, a Foucault pendulum gyros sensors, etc. A MEMS accelerometer, that may be included in the A/V devices in some of the present embodiments, may be able to measure the displacement of electrostatic charges on the surfaces of two electrodes. An acceleration impacts a mass within the accelerometer die and create a voltage difference that can be measured.

With reference to FIG. 3, the processing unit 310 of the A/V device 210(*a*) may receive a signal from the gyro sensor 350 when the gyro sensor detects shaking of the structure (e.g., a wall, a door, a window) on which the gyro sensor is installed. The gyro sensor 350 may, for example, generate an interrupt signal that may transfer the processing unit 310 out of the normal operation mode into an earthquake mode. In some the present embodiments, the gyro sensor may send the signal that the start of a shaking movement only when the gyro sensor detects a shaking movement that may be the result of an earthquake.

Figure 4:
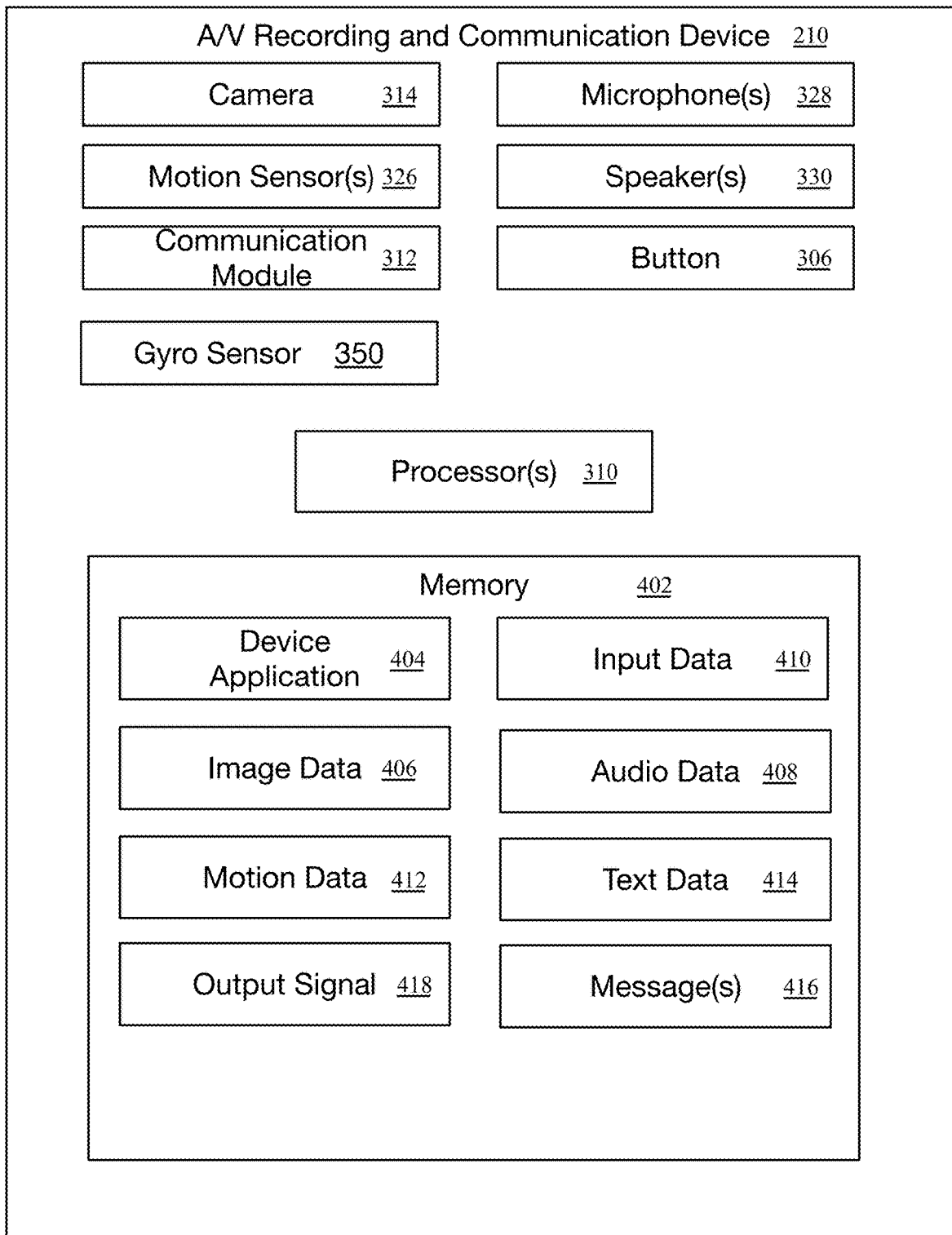
FIG. 4 is a functional block diagram illustrating one example embodiment of an A/V recording and communication device, according to various aspects of the present disclosure.

FIG. 4 is another functional block diagram illustrating an embodiment of the A/V device 210, according to various aspects of the present disclosure. In some embodiments, the A/V device 210 may represent, and further include one or more of the components from, the A/V recording and communication doorbell 210(*c*), the A/V recording and communication security camera 210(*a*), and/or the floodlight controller 210(*b*). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the A/V device 210 may include a gyro sensor 350 and/or other inertial sensors such as an accelerometer. The gyro sensor may detect vibrations caused by an earthquake and may send a signal to the processor(s) 310. The device application 404 may configure the processor(s) 310 to activate the camera 314 and the microphone(s) 328 to capture A/V data during the earthquake.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210.

Figure 5:
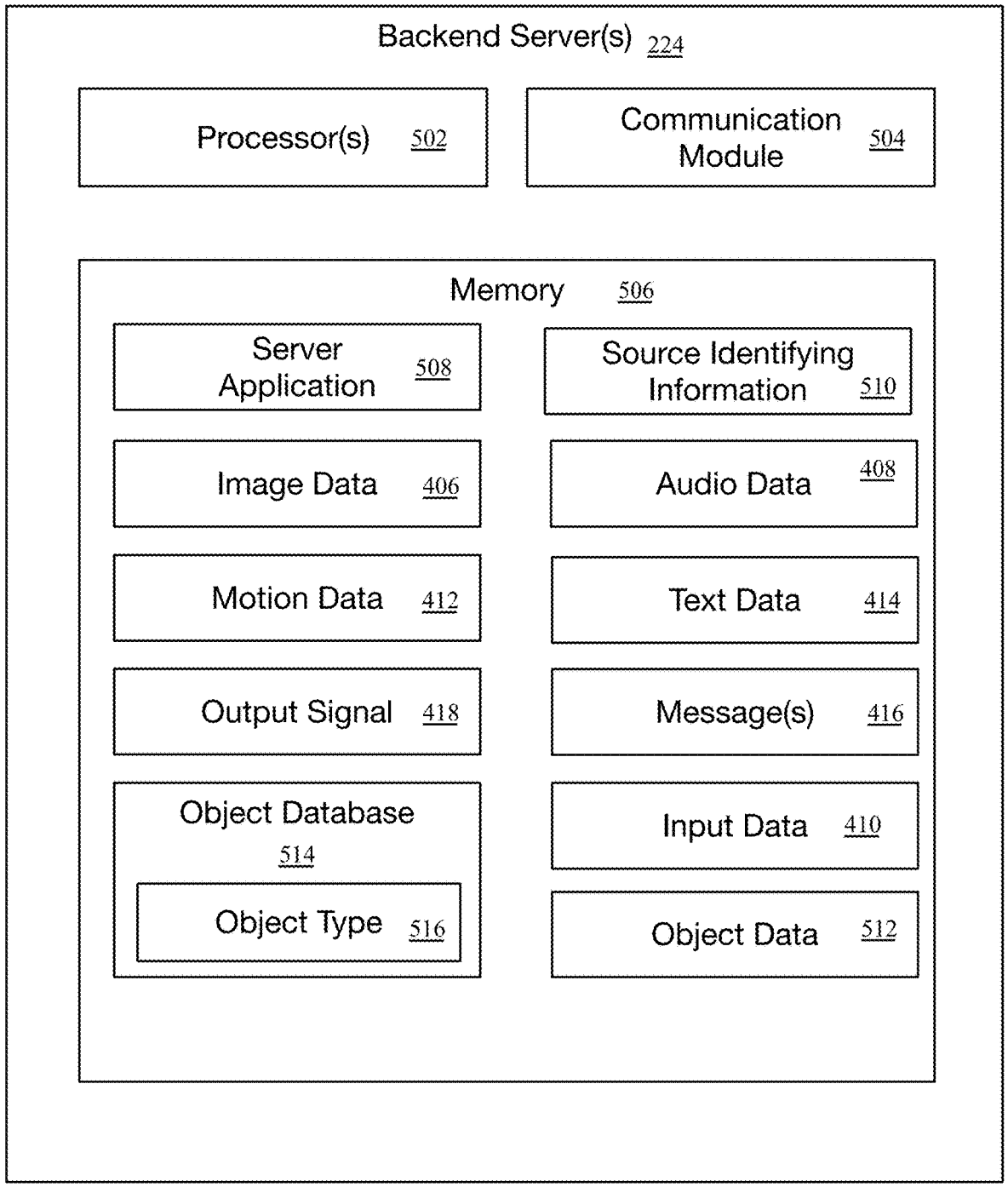
FIG. 5 is a functional block diagram illustrating one example embodiment of a backend device, according to various aspects of the present disclosure.

FIG. 5 is a functional block diagram illustrating one embodiment of the backend server 224, according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, a device controlled by the security monitoring service 228, the A/V devices 230, and/or the client devices 232).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6:
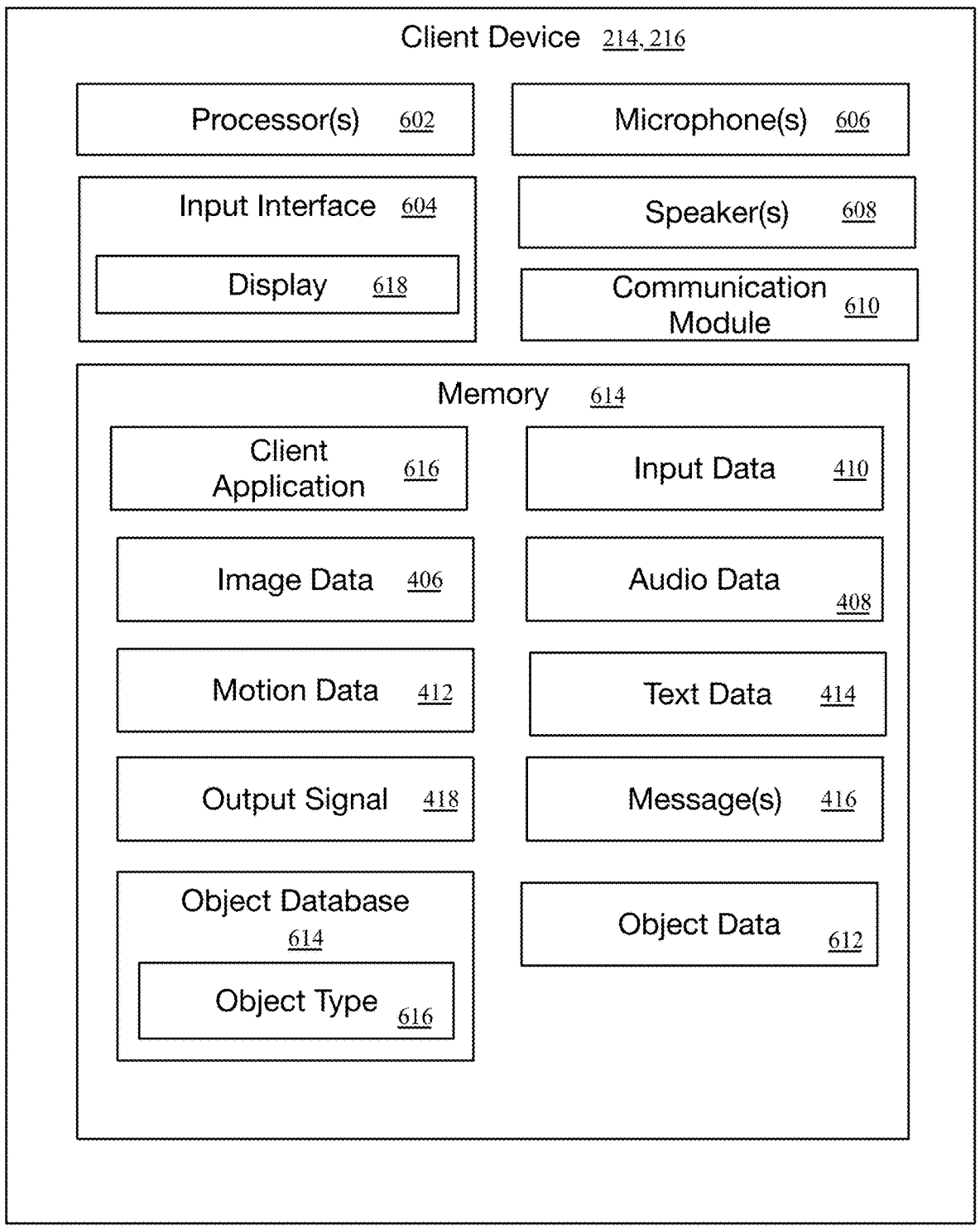
FIG. 6 is a functional block diagram illustrating one example embodiment of a client device, according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., the display area 1020 of the client device 103 in FIG. 10). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., as shown in step 105 in FIG. 10). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

Figure 7:
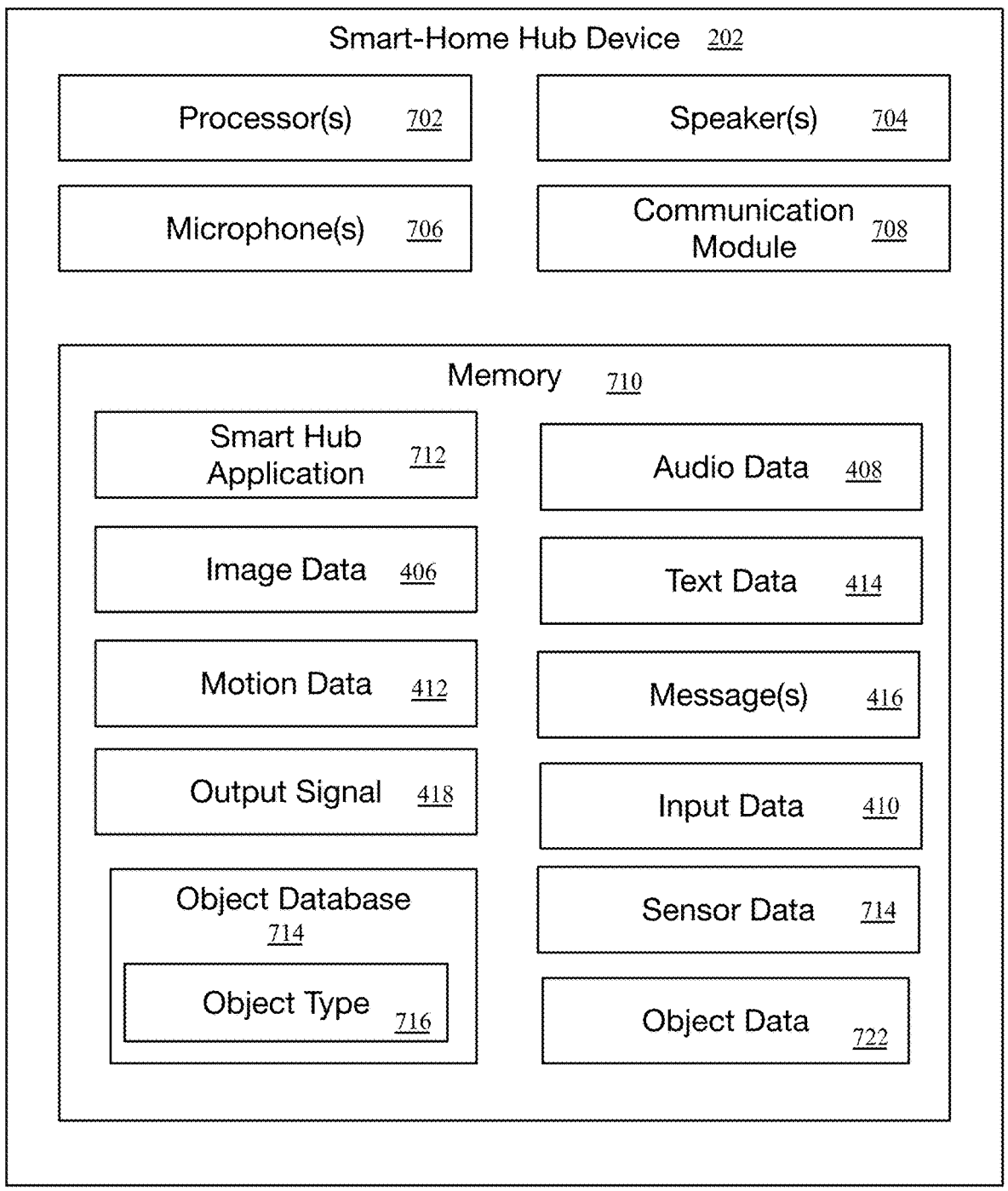
FIG. 7 is a functional block diagram illustrating one example embodiment of a smart-home hub device, according to various aspects of the present disclosure.

FIG. 7 is a functional block diagram illustrating an embodiment of the smart-home hub device 202 (alternatively referred to herein as the "hub device 202"), according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the backend server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the backend server 224, and/or an additional electronic device (e.g., a second A/V device 210, the automation device(s) 206, the sensor(s) 204, etc.).

As described herein, at least some of the processes of the A/V device 210, the backend server 224, and/or the client device 214, 216 may be executed by the hub device 202.

Each of the processes described herein, including the processes 800, 900, 1100, 1300, 2000, and 2200 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
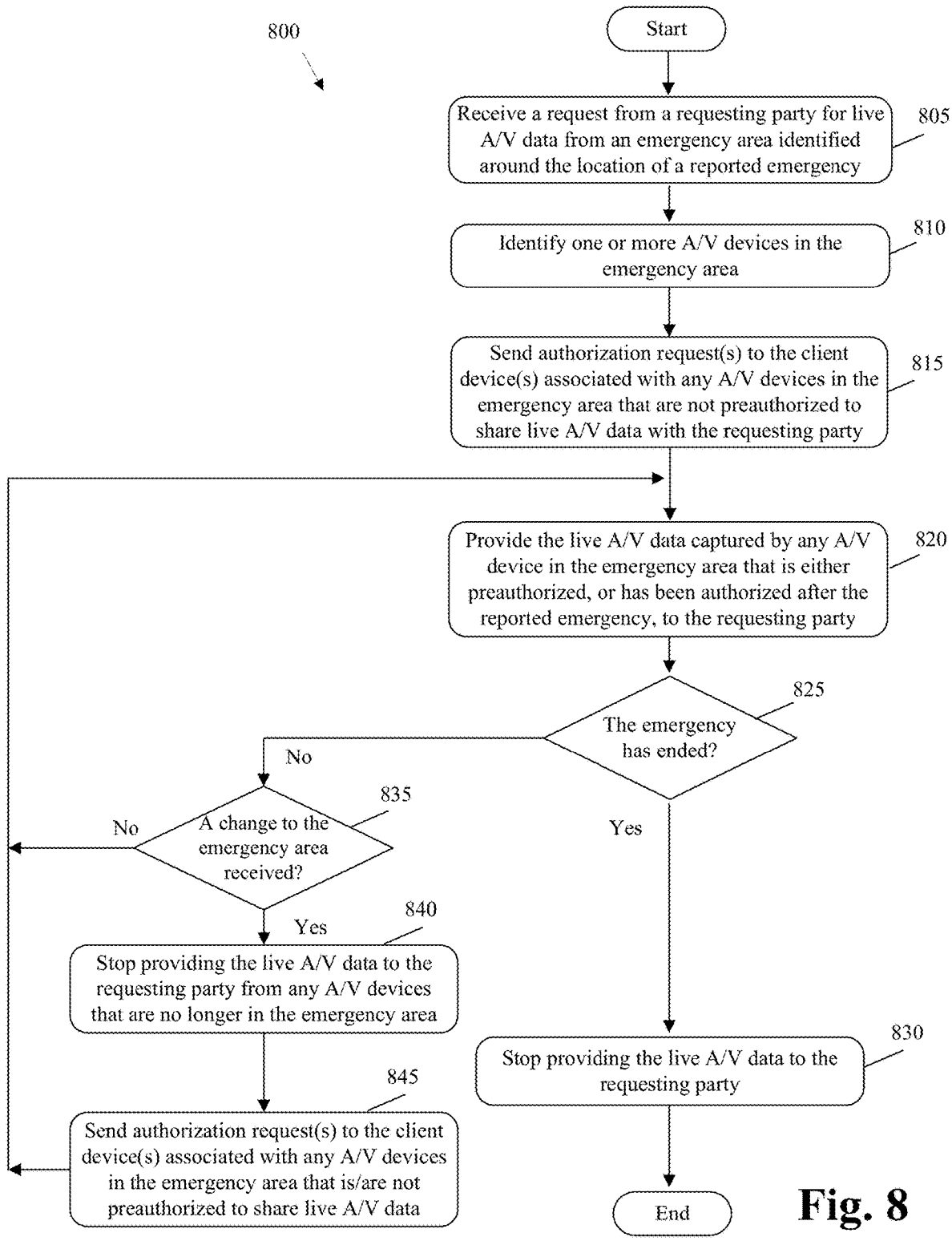
FIG. 8 is a flowchart illustrating an example process for sharing live A/V data from one or more A/V devices with a requesting party, according to various aspects of the present disclosure.

FIG. 8 is a flowchart illustrating an example process 800 for sharing live A/V data from one or more A/V devices with an authorized party, according to various aspects of the present disclosure. In some of the present embodiments, the process 800 may be performed by one or more processing elements of the networked device(s) 101 (FIGS. 1A and 1B).

With reference to FIG. 8, the process 800 may receive (at block 805) a request from a requesting party to provide live A/V data recorded by the A/V devices within an area of interest (referred herein as the emergency area) identified around the location of a reported emergency. The reported emergency may include fire, crime, public safety threat, medical, natural disaster (e.g., earthquake, hurricane, tornado, flood, mudslide, avalanche, volcanic eruption), etc. The requesting party may include an authorized party such as a fire department, a state agency, a federal agency, a police department, a sheriff's department, etc. For example, the process 800 may receive a request from the emergency portal 102 (FIG. 1A) to receive live A/V data from the A/V devices within the emergency area 119 that is identified by the emergency portal 102. The emergency area 119 may be specified by the boundaries of the emergency area, street names, building names, city names, neighborhood names, GCS data, physical addresses, etc.

With further reference to FIG. 8, the process 800 may identify (at block 810) one or more A/V devices in the emergency area. For instance, the process 800 may identify whether there are any available preauthorized or non-preauthorized A/V devices that are within the emergency area. In certain cases, there may be no available A/V devices in the emergency area. In other cases, there may be one or more available A/V devices in the emergency area. With reference to FIG. 1A, the process 800 may identify (at block 810) the A/V devices 107-111 as the A/V devices that are located within the emergency area 119.

With continued reference to FIG. 8, the process 800 may send (at block 815) authorization request(s) to the client devices associated with any A/V devices in the emergency area that are not preauthorized to share the live A/V data with the requesting party. For example, the process 800 may send authorization request(s) to one or more of the A/V devices 107-111 that are within the emergency area 119. If there are no non-authorized A/V devices within the area of interest, the process 800 may not need to send instructions to any A/V device to support or assist the requesting party. However, as part of its routine operation, the process 800 may still communicate with the A/V devices that are within and out of the area of interest to perform its normal operating routine (e.g., to provide support for the client devices 103).

With continued reference to FIG. 8, the process 800 may provide (at block 820) any live A/V data captured by any A/V devices in the emergency area that is either preauthorized, or has been authorized after the reported emergency, to the requesting party. The process 800 may then determine (at block 825) if the emergency has ended. For instance, with reference to FIG. 1A, an active emergency may be declared over by human operator(s) that are monitoring the emergency with the emergency portal 102. The emergency portal 102 may then send a signal to the networked devices 101 that the active emergency is over. In some of the present embodiments, an active emergency may end automatically. For example, in one aspect of the present embodiments, when none of the A/V devices that provide live view of an emergency event, detects (and/or analyzes) events that are related to the emergency (e.g., the fire) any more, the process 800 may determine that the emergency has ended.

With further reference to FIG. 8, if the determination is made (at block 825) that the emergency has ended, the process 800 may stop (at block 830) providing the live A/V data to the requesting party. The process 800 may then end. For instance, as shown in FIG. 1A, when an emergency 150 ends, the networked devices 101 may terminate sending the live A/V data from authorized A/V devices 107-111 to the emergency portal 102. In some aspects of the present embodiments, the process 800 may stop providing the live A/V data in response to receiving an instruction/command from the requesting party (e.g., the portal 102).

With continued reference to FIG. 8, when the process 800 determines (at block 825) that the active emergency has not ended, the process 800 may determine (at block 835) whether a change to the emergency area is received. If no change to the emergency area is received (at block 835), the process 800 may return to block 820, which was described above. However, if a change to the emergency area is received (at block 835), the process 800 may stop (at block 840) providing the live A/V data to the requesting party from any A/V devices that are no longer in the emergency area. For instance, a change to an emergency area may happen when an active emergency has moved out of the area of detection ("detection area") of one or more of the authorized A/V devices. As indicated above, in some aspects of the present embodiments, the change to the emergency area may be received by human operator(s) that are monitoring the emergency with the emergency portal(s) 102 (FIG. 1A). Also, as indicated above, in some aspects of the present embodiments, the change to the emergency area may be determined by analyzing the live A/V data using computer vision, image processing, and/or audio processing.

With continued reference to FIG. 8, the process 800 may send (at block 845) authorization request(s) to the client device(s) associated with any A/V devices in the changed emergency area that is/are not preauthorized to share live A/V data. The process may then return to block 820, which was described above.

The specific operations of the process 800 may not be performed in the exact order shown and described. Furthermore, the specific operations described with reference to FIG. 8 may not be performed in one continuous series of operations, in some aspects of the present disclosure, and different specific operations may be performed in different embodiments. For instance, in some aspects of the present embodiments, the process 800 may provide (at block 820) the live A/V data from the A/V devices within the emergency area that are preauthorized prior to sending (at block 815) the authorization request(s) to the client device(s) associated with any A/V devices in the emergency area that are not preauthorized to share the live A/V data with the requesting authority.

In addition, in some of the present embodiments, one of the A/V devices 116-113 (FIGS. 1A, 1B) may capture the A/V data of an emergency, send the A/V data to a networked device(s) 101, and the networked device(s) 101 may automatically identify authorized A/V devices in the same area and activate them to capture the live A/V data of the emergency. In these embodiments, the process 800 may automatically identify the emergency area (at block 805) instead of, or in addition to, receiving a request from the requesting party for the live A/V data.

Figure 9:
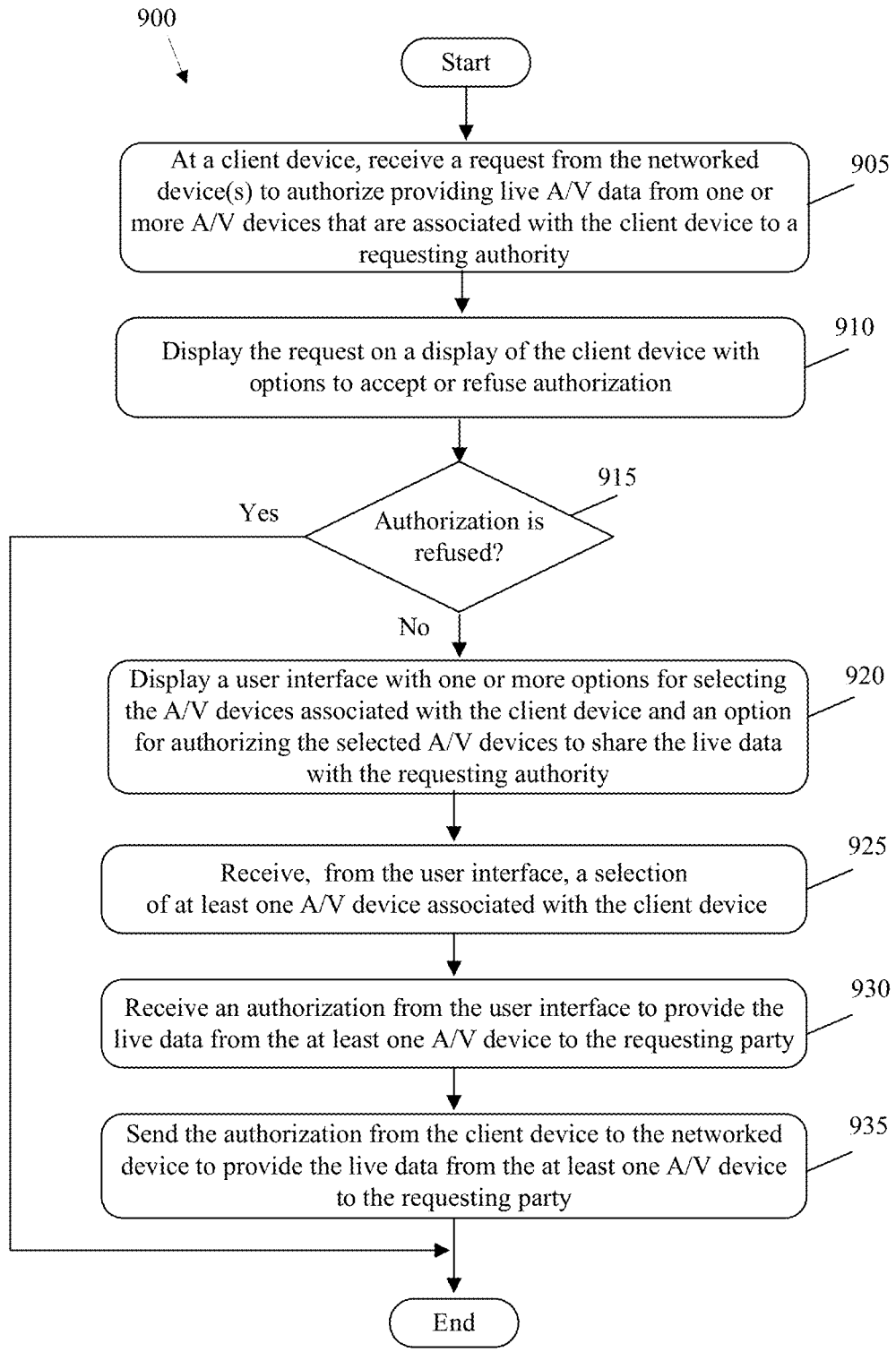
FIG. 9 is a flowchart illustrating an example process for authorizing client devices with the networked devices after an emergency is reported, according to various aspects of the present disclosure.

FIG. 9 is a flowchart illustrating an example process 900 for authorizing client devices with the networked devices after an emergency is reported, according to various aspects of the present disclosure. In some of the present embodiments, the process 900 may be performed by one or more processing elements of the client device(s) 103 (FIGS. 1A and 1B).

With reference to FIG. 9, the process 900 may receive (at block 905) a request from a networked device in order to authorize providing live A/V data from one or more A/V devices associated with the client device to a requesting authority. For example, the process 900 may receive a request at a client device 103 (FIG. 1A) to authorize sharing the live A/V data from one or more A/V devices 106-113 that are associated with the client device 103 with the emergency portal 102. With further reference to FIG. 9, the process 900 may then display (at 910) the request on a display of the client device with options to accept or refuse the authorization.

Figure 10:
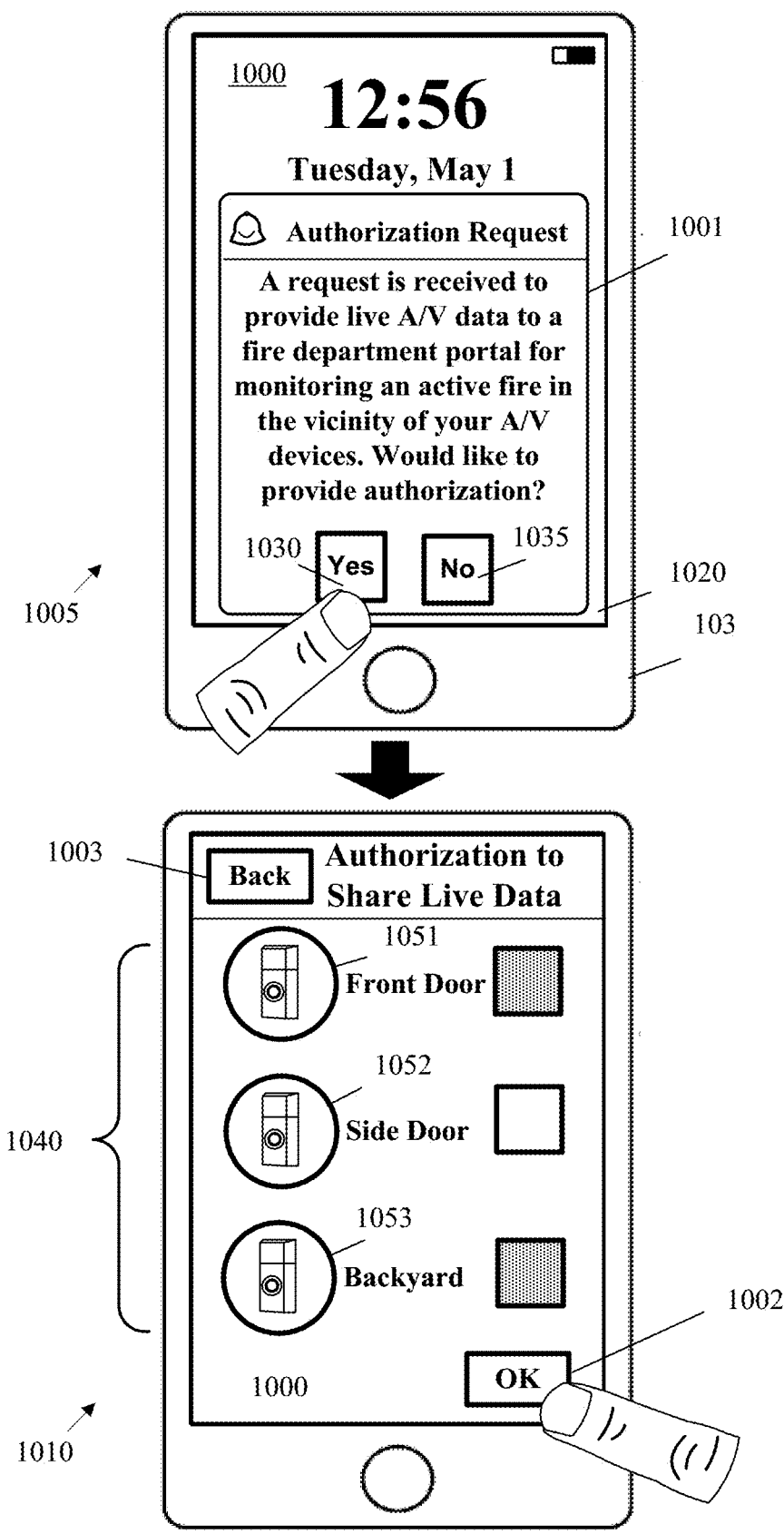
FIG. 10 is a schematic front view of a client device that provides a user interface for authorizing one or more A/V devices associated with the client device to share the live A/V data with one or more authorities, according to various aspects of the present disclosure.

FIG. 10 is a schematic front view of a client device 103 that provides a user interface 1000 for authorizing one or more A/V devices associated with the client device to share the live A/V data with one or more authorities, according to various aspects of the present disclosure. FIG. 10 is shown in two steps 1005 and 1010. With reference to FIG. 10, the request to authorize sharing of the A/V data may be displayed on the display 1020 of the client device 103 as a pop-up notification 1001. In the example notification 1001 of FIG. 10, the notification may include a notice inquiring the client device's user if the user would like to authorize one or more of the user's A/V devices. The notification 1001 may include an option 1030 to accept providing the authorization request and an option 1035 to refuse providing the authorization.

With further reference to FIG. 9, the process 900 may then determine (at block 915) whether the request for authorization is refused. For example, the process 900 may determine whether a user selection of the option 1035 to refuse the authorization is received from the user interface 1000. When the process 900 determines (at block 915) that the request for authorization is refused, the process 900 may end.

With reference to FIG. 9, when the process 900 determines (at block 915) that the request for authorization is not refused, the process 900 may display (at block 920) one or more options for selecting the A/V devices associated with the client device and an option to authorize the selected A/V devices to share live A/V data with the requesting authority.

With reference to FIG. 10, the process may determine (at block 915) that the request for authorization is not refused when a user selection for the option 1030 is received from the user interface 1000. As shown in step 1010 of FIG. 10, the user interface 1000 may display a list 1040 of the A/V devices that are associated with the client device 103 and may allow the user to select one or more A/V devices to share the live A/V data with the requesting party. For instance, if a user has three A/V devices 1051-1053, one A/V device 1051 on the front door, a second A/V device 1052 on the backyard, and a third A/V device 1053 on the side door, the user may use the user interface 1000 to select one or more of the A/V devices for authorization. The list 1040 of the A/V devices in some of the present embodiments may be scrollable and representations of more devices may be displayed by scrolling the list 1040 up or down.

With further reference to FIG. 9, the process 900 may receive (at block 925), from the user interface, a selection of at least one A/V device associated with the client device. With reference to FIG. 10, if the user has three A/V devices 1051-1053, the user may use the user interface 1000 to select one or more of the A/V devices for authorization. In the example of FIG. 10, the user has selected the A/V devices 1051 and 1053.

With reference to FIG. 9, the process 900 may then receive (at block 930) an authorization from the user interface to provide the live data from the selected A/V device to the requesting authority. For instance, as shown in FIG. 10, the user of the client device 103 has chosen to share A/V data from two of the user's three A/V devices (in this example, A/V devices 1051 and 1053 from the A/V devices 1051-1053). The user may then select a user interface option (e.g., OK button 1002) to accept the authorization. Optionally the user may select a separate user interface item (e.g., the back button 1003) to cancel authorization or to return to a previous user interface page. With further reference to FIG. 9, the process 900 may then send (at block 935) the authorization to the networked device(s). Once the authorization is sent (at block 935) to the networked device(s), the process 900 may end.

Figure 11:
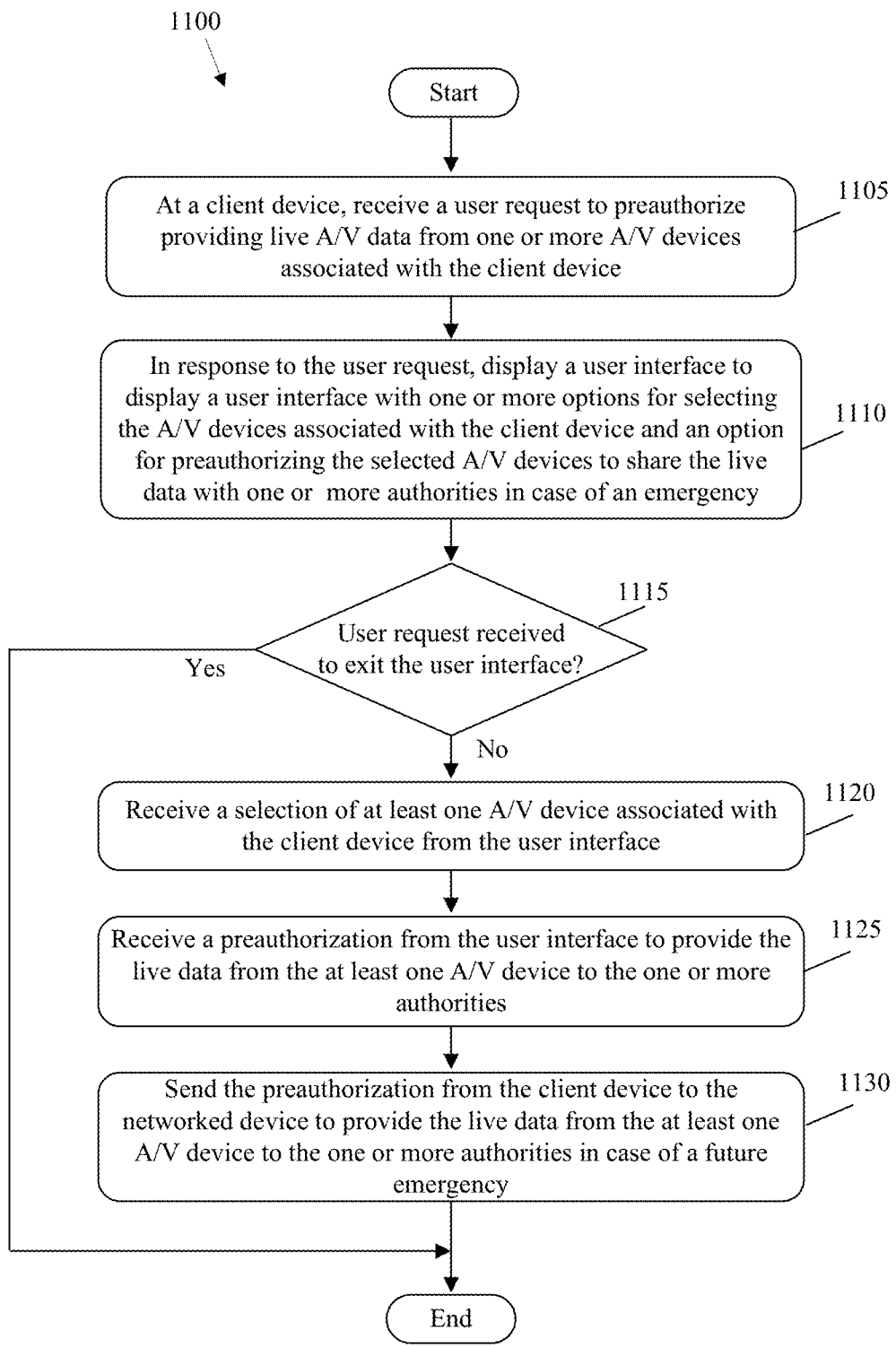
FIG. 11 is a flowchart illustrating an example process for preauthorizing one or more A/V devices associated with a client device to share live A/V data with one or more authorities in case of a future emergency, according to various aspects of the present disclosure.

FIG. 11 is a flowchart illustrating an example process 1100 for preauthorizing one or more A/V devices associated with a client device to share live A/V data with one or more authorities in case of a future emergency, according to various aspects of the present disclosure. In some of the present embodiments, the process 1100 may be performed by one or more processing elements of a client device 103 (FIGS. 1A and 1B). With reference to FIG. 11, the process 1100 may receive (at block 1105) a request to preauthorize the user's A/V devices with one or more authorities. In some aspects of the present embodiments, the process 1100 may be performed in order to provide live A/V data from one or more A/V devices associated with the client device during a potential active emergency. In some aspects of the present embodiments, the request for preauthorization may be received (at block 1105) by the process 1100 from the networked device(s) 101 (FIGS. 1A, 1B). The networked device(s) 101 may send the request to the client devices 103 as part of the set up (e.g., when the application associated with the management of the A/V devices is set up on the client device) and/or as a response to a request from an authority (e.g., a request from the emergency portal 102 (FIG. 1A) for preauthorization to share the live A/V data in case of an emergency). When the request for preauthorization is received at the client device 103 from the networked device(s) 101, a request similar to the request 1001 in the step 1005 (FIG. 10) is displayed asking the user to access or refuse preauthorizing one or more A/V devices associated with the client device to share live A/V data with one or more authorities in case of an emergency.

Figure 12:
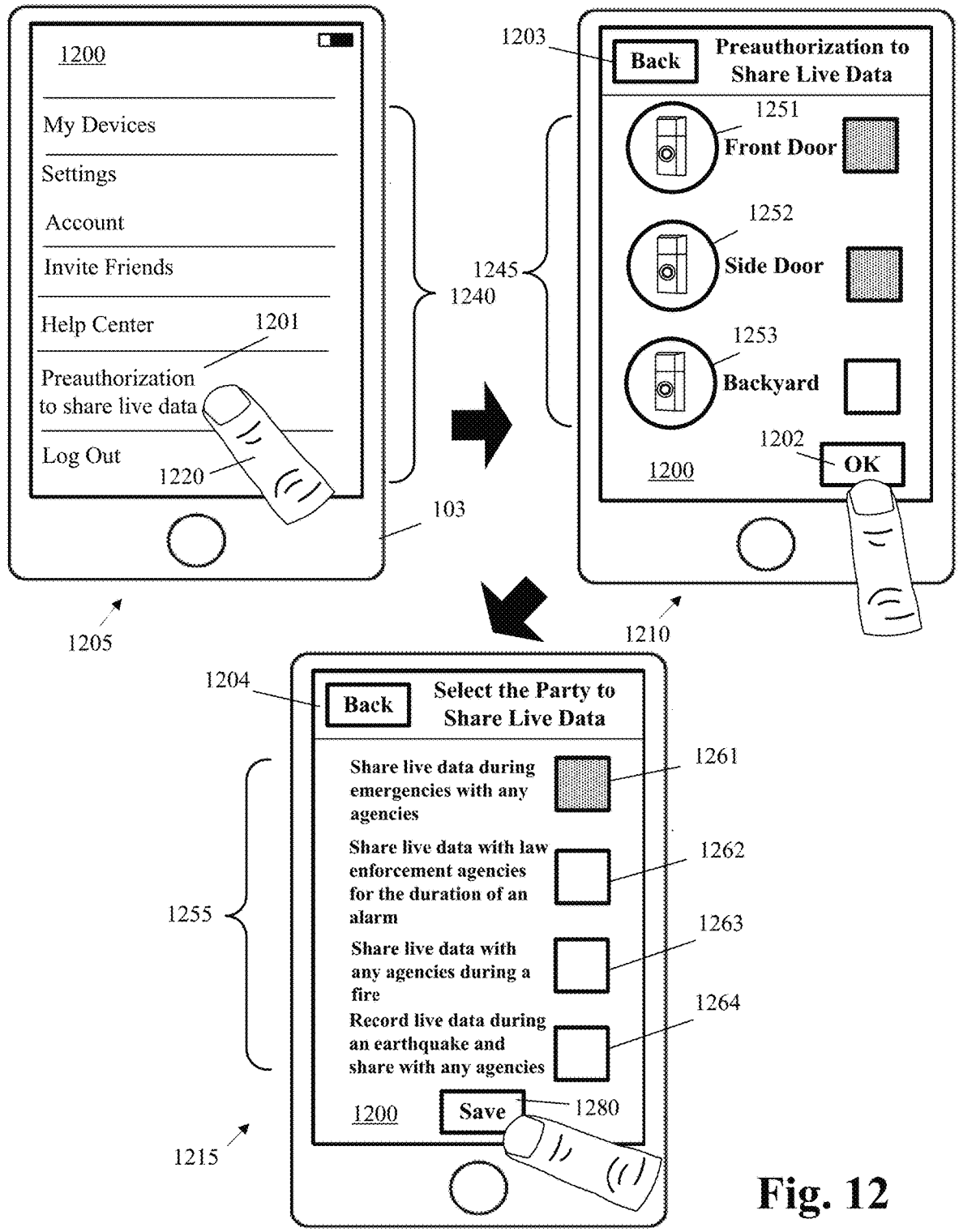
FIG. 12 is a schematic front view of a client device that provides a user interface to allow a user to preauthorize one or more A/V devices associated with the client device to share the live A/V data with one or more authorities in case of a future emergency, according to various aspects of the present disclosure.

In other aspects of the present embodiments, the request for preauthorization may be received (at block 1105) by the process 1100 when a user of the client device selects an option to preauthorize one or more A/V devices associated with the client device to share the live A/V data recorded by the A/V devices with one or more authorities. FIG. 12 is a schematic front view of a client device 103 that provides a user interface 1200 to allow a user to preauthorize one or more A/V devices associated with the client device to share the live A/V data with one or more authorities in case of an emergency, according to various aspects of the present disclosure.

FIG. 12, as shown, includes in three operational steps 1205-1215. In the step 1205, a user interface 1200 is provided that displays a list 1240 of several options including an option 1201 for preauthorization to share live data. With reference to FIG. 11, the process 1100 may determine (at block 1105) that a request to preauthorize the user's A/V devices with one or more authorities is received when a user selection of the option 1201 is received (as shown by 1220) from the user interface 1200.

In response to receiving the request, the process 1100 may display (at block 1110) a user interface with one or more options for selecting the A/V devices associated with the client device and an option for preauthorizing the selected A/V devices to share live A/V data with one or more authorities in case of a future emergency.

With reference to step 1210 in FIG. 12, the user interface 1200 may display a list 1245 of the A/V devices associated with the client device 103 and may allow the user to select one or more A/V devices to share the live A/V data with one or more authorities in case of an emergency. For example, if a user has three A/V devices 1251-1253, the user may use the user interface 1200 to select one or more of the A/V devices for preauthorization. The list 1245 of the A/V devices in some of the present embodiments may be scrollable and representations of more devices may be displayed by scrolling the list 1245 up or down.

With continued reference to FIG. 11, the process 1100 may then determine (at block 1115) whether a user request to cancel A/V device preauthorization is received (e.g., when the back button 1203 of FIG. 12 is selected). When the process 1100 receives (at block 1115) a user selection to cancel preauthorization, the process 1100 may end. Otherwise, the process 1100 may receive (at block 1120), from the user interface, a selection of at least one A/V device associated with the client device. With reference to FIG. 12, when has several A/V devices 1251-1253, the user may use the user interface 1200 to select one or more of the A/V devices for authorization. The list 1245 of the A/V devices, in some of the present embodiments, may be scrollable and more A/V devices may be displayed by scrolling the list 1245 up or down. In the example of FIG. 12, the user has selected the A/V devices 1251 and 1252.

With further reference to FIG. 12, the user may select an option (e.g., when the OK button 1202 is selected) to confirm the selection of the A/V devices. As shown in step 1215, the user interface 1200 may display a list 1255 of one or more authorized parties (e.g., fire departments, state agencies, federal agencies, law enforcement agencies such as police or sheriff's departments, emergency responders, etc.) to receive the A/V data captured by the A/V devices selected in step 1210. In the example of FIG. 12, the user may select, without limitations, one or more of the options 1261-1264 to authorize sharing of the live A/V data during emergencies with any agencies (option 1261), sharing of the live A/V data with law enforcement agencies for the duration of an alarm (option 1262), sharing of the live A/V data with any agencies during a fire (option 1263), record the live data during an earthquake and share with any agencies (option 1264), etc.

The list 1255 of the authorized parties, in some of the present embodiments, may be scrollable and options to select more parties for sharing the A/V data during different emergencies may be displayed by scrolling the list 1255 up or down. For example, in some embodiments, the user interface 1200 may display an option (not shown) for sharing live A/V data captured by one or more A/V devices 1251-1253 with law enforcement agencies when the image of a person of interest (e.g., identified in a law enforcement bulletin) matches with the image of a person captured by an A/V device 1251-1253. Details of sharing of the live A/V data of a person of interest captured by one or more preauthorized A/V devices 1251-1253 with law enforcement agencies are described below with reference to FIG. 20.

As shown in the example of FIG. 12, the user interface 1200 may provide different options for selecting a particular agency to receive live A/V data during a particular type of emergency (e.g., as shown by option 1262), selecting any agencies to receive live A/V data during a particular type of emergency (e.g., as shown by option 1263), selecting any agencies to receive live A/V data during any type of emergencies (e.g., as shown by option 1261), recording the live A/V data during a particular type of emergency and share the live data with any agencies (e.g., as shown by option 1264), etc. Furthermore, as described below with reference to FIG. 20, in some aspects of the present embodiments, when the user selects option 1262, the user may automatically provide authorization to share A/V data from all A/V devices associated with a premises (e.g., A/V devices 1251-1253) regardless of which A/V device is selected in step 1210. Sharing the live A/V data from all A/V devices at a premises with a law enforcement agency may facilitate locating of potential intruders throughout the premises. In these embodiments, a text associated with option 1262 may, e.g., indicate "share live data from all A/V devices with law enforcement agencies for the duration of an alarm."

With reference to FIG. 11, the process 1100 may then receive (at block 1125) a preauthorization from the user interface (e.g., when the save button 1280 of FIG. 12 is selected) in order to provide the live data from the at least one A/V device to the one or more authorities. The process 1100 may then send (at block 1130) the preauthorization signal to the networked device(s). The process 1100 may then end.

The specific operations of the process 1100 may not be performed in the exact order shown and described. Furthermore, the specific operations described with reference to FIG. 11 may not be performed in one continuous series of operations, in some aspects of the present disclosure, and different specific operations may be performed in different embodiments. For example, in some aspects of the present embodiments, the process 1100 may apply the preauthorization to every authority. For example, the process 1100 may display (either in step 1205 or 1210) the list of authorities (or examples of the authorities) that may receive the live A/V data in case of an emergency. In other aspects of the present embodiments, the process 1100 may display (e.g., at a block 1140 performed between the blocks 1105 and 1110) a list of one or more authorities for the user to select. The process 1100 may then send the preauthorization (at step 1130) to the networked device(s) indicating which authorities are authorized to share the live A/V data during emergencies.

Figure 13:
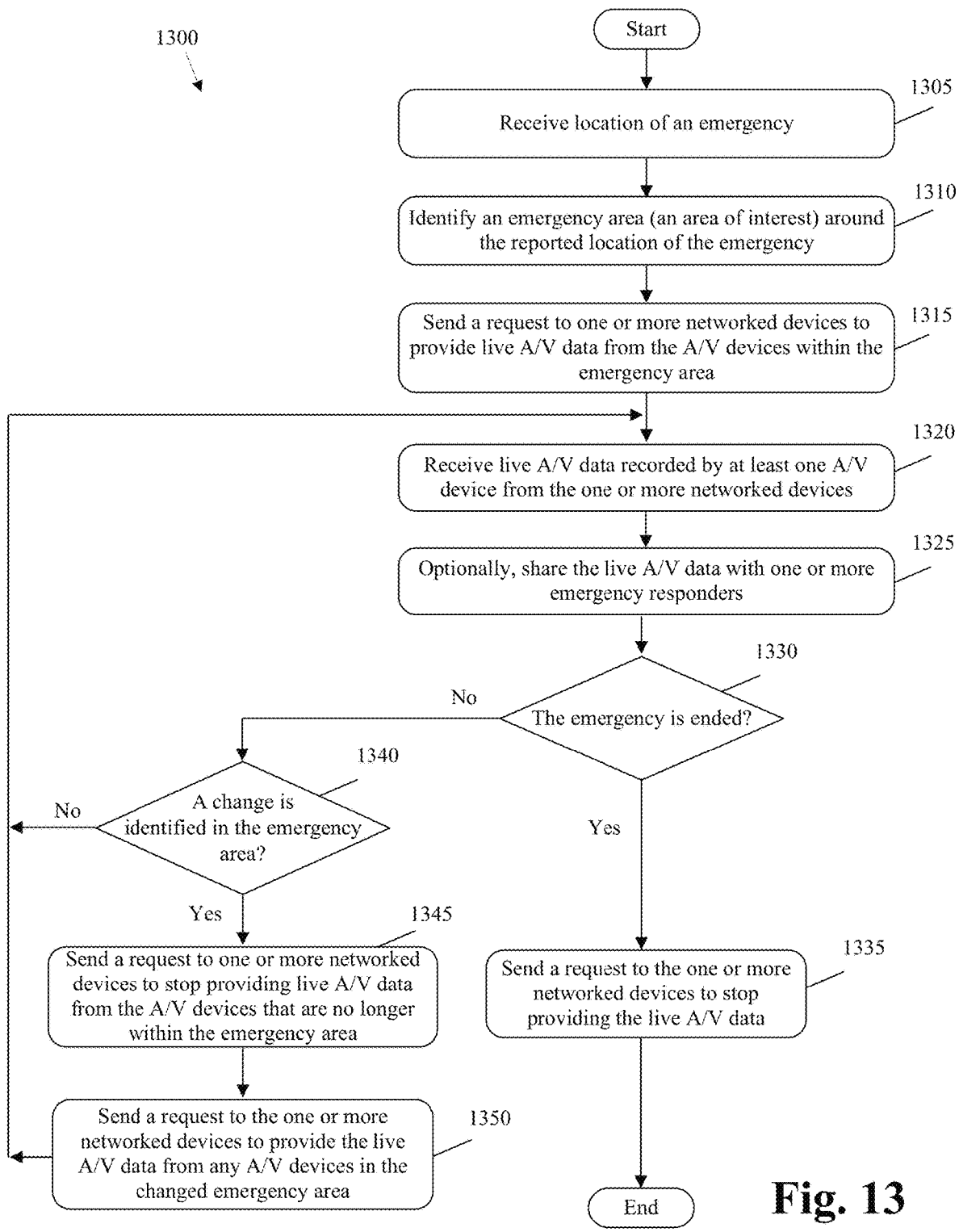
FIG. 13 is a flowchart illustrating an example process for receiving live A/V data of an area of interest from authorized A/V devices, according to various aspects of the present disclosure.

FIG. 13 is a flowchart illustrating an example process 1300 for receiving live A/V data of an area of interest from authorized A/V devices, according to various aspects of the present disclosure. In some of the present embodiments, the process 1300 may be performed by one or more processing elements of the emergency portal 102 (FIG. 1A) or the firefighting portal 102 (FIG. 1B). In some other embodiments, the process 1300 may be performed by one or more processing elements of one or more backend devices, such as the backend devices 225 (FIG. 2). In yet some other embodiments, part of the process 1300 may be performed by an emergency portal and part of the process may be performed by the backend devices.

With reference to FIG. 13, the process 1300 may receive (at block 1305) a location of an emergency. For example, the process 1300 may receive (at block 1305) the location of the emergency 150 (with reference to FIG. 1A) from a person, the networked device(s) 101, and/or the A/V devices, based on the analysis of the A/V data recorded by an A/V device at or near the location of the emergency 150. The A/V device might have been preauthorized to share the A/V data with one or more authorities.

With further reference to FIG. 13, the process 1300 may then identify (at block 1310) an emergency area around the reported location of the emergency. For example, the process 1300 may identify the emergency area 119 as an area of interest around the reported emergency (FIG. 1A) or the reported fire 150 (FIG. 1B). An operator at the emergency portal 102 may draw a shape (e.g., circle, polygon, square, arbitrary shape, etc.) that identifies the emergency area 119 as an area of interest on a map. In some aspects of the present embodiments, the area of interest may have been predefined (e.g., based on boundaries of the neighborhoods, cities, counties, states, etc.). The area of interest, in some of the present embodiments, may also be defined dynamically, based on, at least in part, the seriousness of the emergency (e.g., the bigger the area of fire recorded by the A/V devices, the more serious the fire, and the bigger the area of interest), the population (e.g., the more populated the area in which the emergency is detected, the bigger the area of interest), etc. Several examples of specifying the area of interest will be further elaborated below by reference to FIGS. 15 and 16.

With further reference to FIG. 13, the process 1300 may send (at block 1315) a request to one or more networked devices to provide live A/V data from authorized A/V devices within the emergency area. For example, the emergency portal 102 (FIG. 1A) or the firefighting portal 102 (FIG. 1B) may send a request to the networked device(s) 101 to provide live A/V data from the A/V devices that are within the emergency area 119. In some embodiments in which the process 1300 is performed by the networked devices, the process may send the request directly to the A/V devices. In some of the present embodiments, the process 1300 may directly send a request to one or more A/V devices to activate and deactivate these devices in order to receive or stop receiving live A/V from the one or more A/V devices.

With reference to FIG. 13, the process 1300 may then receive (at block 1320) the live A/V data recorded by authorized A/V device(s) from the networked device(s). For example, the emergency portal 102 (FIG. 1A) or the firefighting portal 102 (FIG. 1B) may receive, from the networked device(s) 101 the live A/V data recorded by one or more authorized A/V devices 107-111 (with reference to FIG. 1A) within the emergency area 119.

With further reference to FIG. 13, the process 1300 may, optionally, share (at block 1325) the live A/V data with one or more emergency responders. For instance, in some aspects of the present embodiments, the responders 104 (FIGS. 1A, 1B) may log into the emergency portal 102 and/or may receive the live A/V data from the emergency portal. For example, in case of a fire emergency (FIG. 1B) the live A/V data may be shared (if the client devices 103 have authorized the sharing) with responders 104. The responders may include, but are not limited to, firefighters on the ground, aerial firefighting teams, such as water dropping aircraft, ambulances, neighborhood watch groups, search teams, rescue teams, police departments, government agencies, government emergency response teams, civil emergency response teams, news outlets, disaster management authorities, federal agencies, state and local agencies, etc.

With continued reference to FIG. 13, the process 1300 may determine (at block 1330) if the emergency has ended. When the process 1300 determines (at block 1330) that the emergency has ended, the process 1300 may send (at block 1335) one or more request(s) to the one or more networked devices to stop providing live A/V data to the requesting party. For example, the process 1300 may send the request(s) from the emergency portal (FIGS. 1A, 1B) to the networked device(s) 101 to stop providing the live A/V data from the A/V devices 107-111 in the emergency area 119. The process 1300 may then end.

With continued reference to FIG. 13, when the process 1300 determines (at block 1330) that the emergency has not ended, the process 1300 may determine (at block 1340) whether there is a change to the location of the emergency area. When the process 1300 determines (at block 1340) that there is no change to the location of the emergency area, the process may proceed to block 1320, which was described above. When the process 1300 determines (at block 1340) that there is a change to the location of the emergency area, the process 1300 may send (at block 1345) a request to the one or more networked devices to stop providing live A/V data from the A/V devices that are no longer within the location of the initial emergency area. For instance, as discussed above by reference to FIG. 8, a change to an emergency area may happen when an active emergency has moved out of the area of detection ("detection area") of one or more of the authorized A/V devices.

With further reference to FIG. 13, the process 1300 may send (at block 1350) a request to the one or more networked devices to provide the live A/V data from any new A/V devices in the changed emergency area. The process 1300 then returns to block 1320, which was described above.

Figure 14:
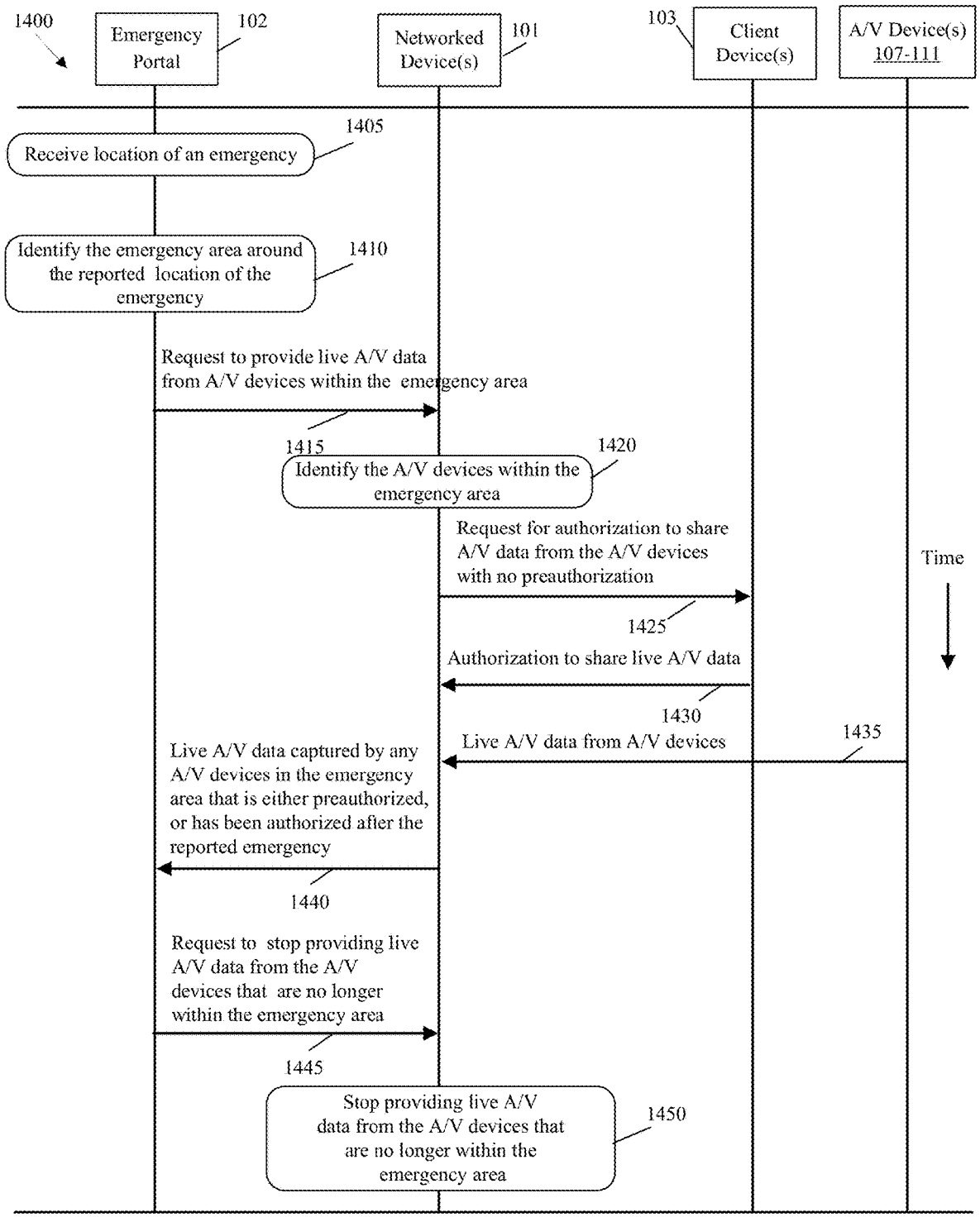
FIG. 14 is an example sequence diagram illustrating data items exchanged between devices in a communication system for providing live A/V data recorded by authorized A/V devices in an area of interest to an emergency portal, according to various aspects of the present disclosure.

FIG. 14 is an example sequence diagram 1400 illustrating data items exchanged between devices in a communication system for providing live A/V data recorded by authorized A/V devices in an area of interest to an emergency portal, according to various aspects of the present disclosure. The figure illustrates that the emergency portal 102 (FIG. 1A) may exchange messages with network device(s) 101 to receive live A/V data recorded by the A/V devices 107-111 with an emergency area 119 around a reported location 150 of an emergency.

With reference to FIG. 14, the emergency portal 102 (at block 1405) may receive location of an emergency. For example, the emergency portal 102 (FIG. 1A) may receive the location of the emergency 150. With further reference to FIG. 14, the emergency portal 102 may then identify (at block 1410) the emergency area around the reported location of the emergency. For instance, the emery portal 102 may be used to draw a shape (e.g., circle, polygon, square, arbitrary shape, etc.) that identifies the emergency area on a map. Several examples of specifying the area of interest will be further elaborated below by reference to FIGS. 15 and 16.

With further reference to FIG. 14, the emergency portal 102 may send (at step 1415) request(s) to the networked devices 101 to provide live A/V data from authorized A/V devices within the emergency area. When an emergency area is identified, the networked devices 101 may identify (at block 1420) the A/V devices within the emergency area. The Networked device(s) 101 may then send (at step 1425) a request for authorization to the client device(s) 103 (i) that are associated with the A/V devices within the emergency area, and (ii) that do not have preauthorization to share the live data. Upon sending the authorization request(s), the client device(s) 103 may accept or deny the request(s). With reference to FIG. 14, when a client device 103 accepts an authorization, the client device may send (at step 1430) an authorization to share the live A/V data from one or more A/V devices associated with the client device to the networked device(s) 101. The authorization may include the identification of the A/V devices that are selected (e.g., as described by reference to step 1010 (FIG. 10).

With further reference to FIG. 14, the networked device(s) 101 may receive (at step 1435) live A/V data from one or more A/V devices. The networked device(s) may then provide (at step 1440) the live A/V data recorded by the authorized A/V devices to the emergency portal 102. The authorized A/V devices may include the A/V devices for which the associated client device(s) have either provided preauthorization or real-time authorization after the start of the emergency. At any time, the networked device(s) 101 may provide or stop providing the live A/V data from the A/V devices when either the emergency area changes and/or the client device(s) 103 add or remove A/V devices from the pool of authorized A/V devices.

With further reference to FIG. 14, the emergency portal 102 may send (at step 1445) request(s) to the networked device(s) 101 to stop providing the live A/V data from one or more A/V devices that are no longer within the emergency area to the networked device(s) 101 and/or in if the emergency no longer exists. The networked device(s) 101 may then terminate (at block 1450) providing the live A/V data from one or more authorized A/V devices to the emergency portal 102.

Figure 15:
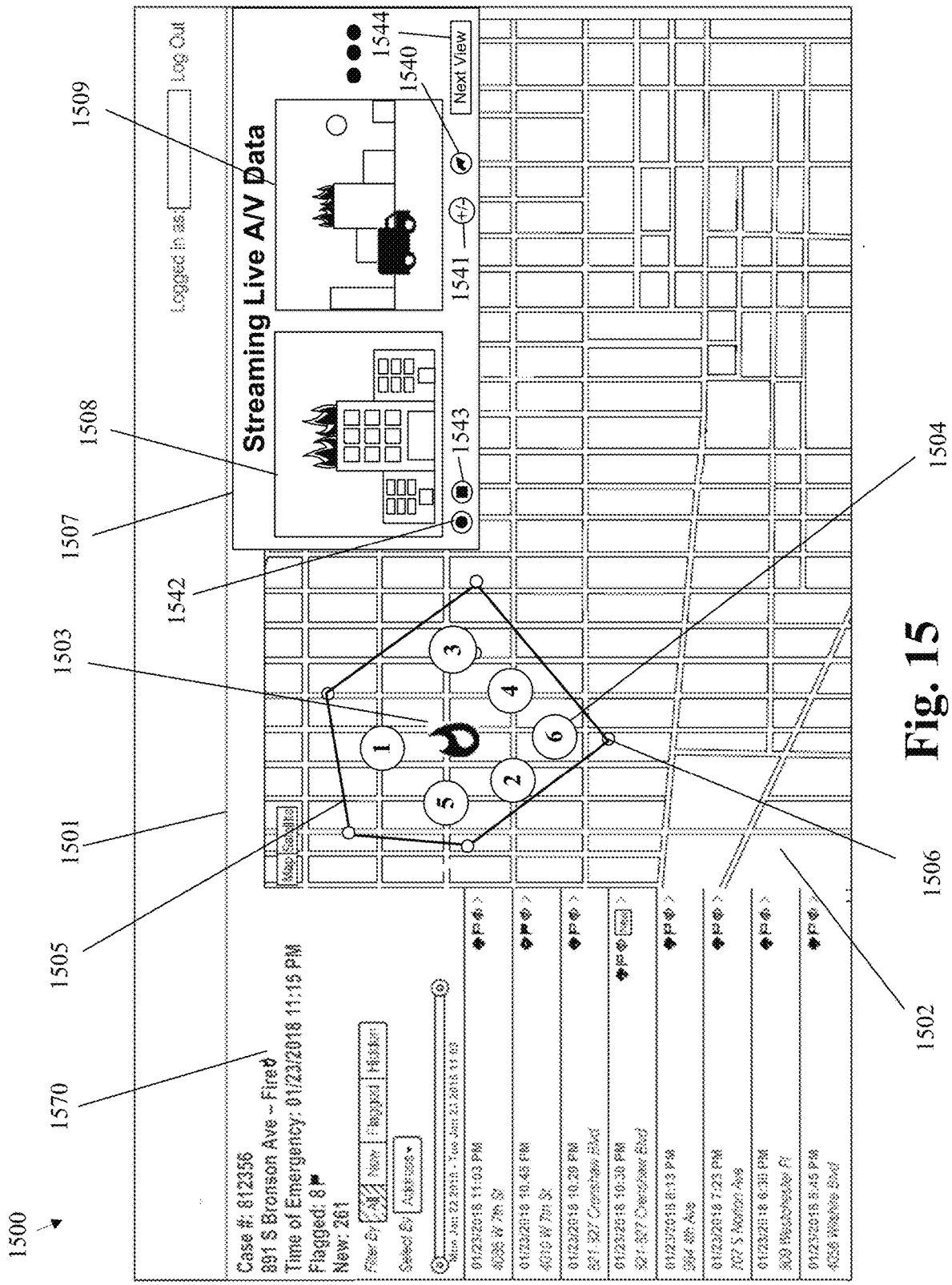
FIG. 15 is a graphical user interface associated with a process for enabling an authorized party to request live A/V data from the A/V devices located within an emergency area, according to various aspects of the present disclosure.

FIG. 15 is a graphical user interface (GUI 1500) associated with a process for enabling an authorized party to request live A/V data from the A/V devices located within an emergency area, according to various aspects of the present disclosure. The process, or program, may be embodied in code executable by one or more processors of an emergency portal 102 (FIG. 1A) or a firefighting portal 102 (FIG. 1B). The requesting party may, for example, login through a user portal at a website using a client device. The requesting party's client device may include, for example, a personal computer, such as a desktop computer, a laptop computer, a tablet, etc. The requesting party's client device may further comprise, for example, a mobile telephone (may also be referred to as a cellular telephone), such as a smart phone, a personal digital assistant (PDA), or another communication device.

In some aspects of the present embodiments, when a location for an emergency is specified, the GUI 1500 may display a map 1501 of the area 1502 around the reported location (e.g., an address). For example, with reference to FIG. 1B, the area around the address may be the geographical area 146 (with reference to FIG. 1A). With reference to FIG. 15, in addition to navigating the map 1501 to the geographical area 1502, the map may display a first icon 1503. The first icon 1503 may represent different types of active emergency events. For instance, the first icon 1503 may represent a fire emergency, a medical emergency, a law enforcement emergency, or some other live emergency event. Furthermore, the map 1500 may display one or more second different icons 1504. In some aspects of the present disclosure, each second icon 1504 may represent an authorized A/V device near the location of the reported emergency.

In some aspects of the present embodiments, an operator (e.g., an authorized user) using the GUI 1500 may specify an area 1505 (e.g., an active emergency area or an area of interest) from which to gather the live A/V data. As stated above, this may be performed by indicating the emergency area 1505 on the map 1501. The GUI 1500 may provide identification of the location(s) of any available A/V device(s) in the emergency area 1505 around the reported emergency location 1503. With reference to FIG. 15, the GUI 1500 may indicate that there are six A/V devices 1504 within the emergency area 1505 that are authorized to share their recorded A/V data.

In some aspects of the present embodiments, the operator may specify the emergency area 1505 from which video footage will be gathered in any of a variety of ways. For example, the operator may draw a polygon of any shape and size on the map 1501 of the GUI 1500 by specifying locations of vertices 1506 of the polygon, such as by touching the locations of the vertices 1506, if the requester's client device includes a touchscreen, or by using a pointing device, such as a mouse or a trackball, and an onscreen pointer to specify the locations of the vertices 1506. In certain embodiments, the shape specified by the requester may not have any vertices 1506. For example, the shape may be a circle. Alternatively, the shape may be a curvilinear shape that includes both lines and curves. The operator, in some of these embodiments, may specify an area of interest by providing a radius around the address (e.g., indicated on the map 1501 by the first icon 1503) that the requester has entered.

When the emergency area 1505 has been specified on the map 1501 and when there are authorized A/V devices within the reported location of the live emergency, the GUI 1500 may receive live A/V data recorded by the authorized A/V devices from the networked deice(s) (e.g., the networked device(s) 101 in FIGS. 1A, 1B).

With reference to FIG. 15, the GUI 1500 may provide one or more A/V display areas to stream the live A/V data. In the example of FIG. 15, there are two A/V data streams 1508 and 1509 of a burning building. One video stream 1508 may originate from an authorized A/V device in front of the building, while the other video stream 1509 may originate from an authorized A/V device in the back of the building.

The GUI 1500 may present additional information 1570, such as a case number, the address where the emergency started, the type of incident (such a fire emergency), the date and time of the incident, etc. The additional information 1570 may also include information about one or more past emergency events.

In some aspects of the present embodiments, the area of interest 1505 may have been predefined (e.g., based on boundaries of the neighborhoods, cities, counties, states, etc.). The area of interest 1505, in some of the present embodiments, may also be defined dynamically, based on, at least in part, the seriousness of the emergency (e.g., the bigger the area of fire recorded by the A/V devices, the more serious the fire, and the bigger the area of interest), the population (e.g., the more populated the area in which the emergency is detected, the bigger the area of interest), etc.

In some of the present embodiments, the GUI 1500 may provide a tool for selecting one or more A/V devices 1504 (e.g., by a pointing device such as a mouse or by a touch action on a touchscreen) and sending a request to one or more A/V devices (either directly or through the networked devices 101 of FIGS. 1A-1B) to activate and deactivate these devices in order to receive or stop receiving live A/V from the one or more A/V devices at the GUI 1500. In some of the present embodiments, the GUI 1500 may include one or more selectable items for sending a request to receive live A/V data from authorized A/V devices in the area of interest 1505 (e.g., using the selectable item 1540); sending a request to activate or deactivate one or more selected A/V devices 1504 (e.g., using the selectable item 1541); recording a live stream 1508-1509 (e.g., using the selectable item 1542); stopping recording the live stream (e.g., using the selectable item 1543); and displaying the next view from an A/V device in the area of interest 1505 (e.g., using the selectable item 1544).

Figure 16:
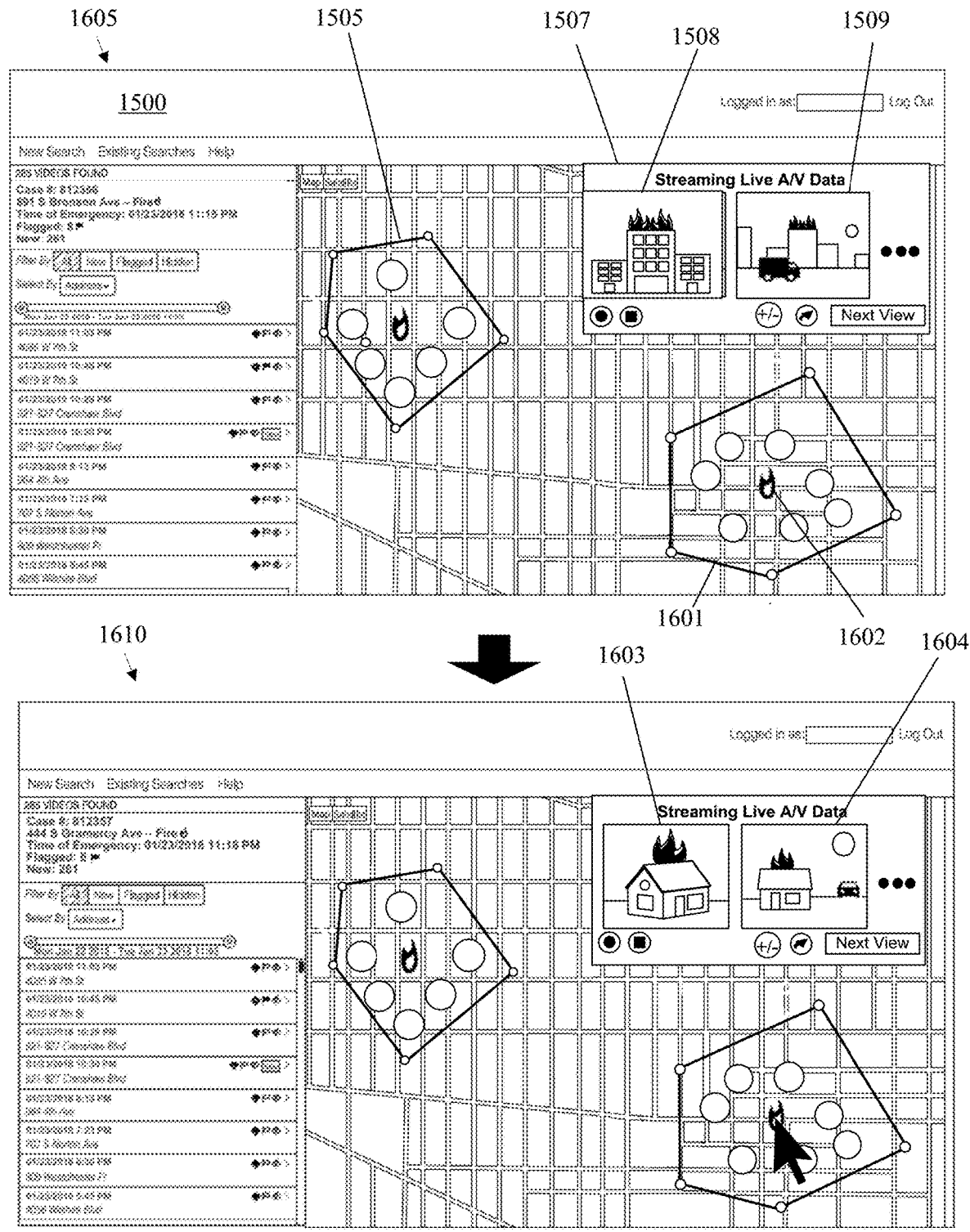
FIG. 16 is a schematic front view of an electronic device that provides a graphical user interface for switching between multiple emergency areas, according to various aspects of the present disclosure.

FIG. 16 is a graphical user interface (GUI 1600) for switching between multiple emergency areas, according to various aspects of the present disclosure. FIG. 16 includes two operational states 1605 and 1610 of the GUI 1500 are shown in the example.

The first state 1605 is identical to FIG. 15. However, a second emergency area 1601 with a reported live event 1602 has been specified. The person that inputs the live event data may not be the same operator using the GUI 1500, but another operator (e.g., another representative of the authorized party) using another GUI (not shown) on a separate electronic device. Hence, there may be one or more people that may be able to log onto the live A/V data portal system (e.g., the emergency portal).

With reference to FIG. 16, in the second state 1610, the operator may select the icon 1602, which may represent the second reported active emergency, in the mapped area. The selection may cause the GUI 1500 to display streaming live A/V data of the second incident 1603 and 1604 in the display area 1507.

In addition to switching between different active emergency events, the GUI 1500 may be used to update the emergency area 119 (with reference to FIG. 1A). Examples of different updates may include changing the size and moving the emergency area (1505 or 1601). For example, there may be a case where an emergency ends in a portion (e.g., quarter, half, etc.) of the emergency area. In such a case, the GUI may be used to choose not to receive live A/V data from that portion of the emergency area.

Further, in some aspects of the present embodiments, one emergency area may be split or separated in two or more emergency areas. For instance, one fire emergency area may be split into two or more if the fire grows in different directions. As indicated above, the emergency area 119 (FIGS. 1A, 1B) may be updated based on one or more other factors, including analyzing of the live A/V data and performing computer vision, motion detection, image processing, and/or some other detection technique. When such an update occurs, the networked devices 101 (FIGS. 1A, 1B) may perform the above-described operations of identifying A/V devices surrounding the updated emergency area. In several of the examples described above, the live A/V data is presented on an emergency portal. Several examples of presenting live A/V data on a client device will now be described below by reference to FIGS. 17-19.

Figure 17:
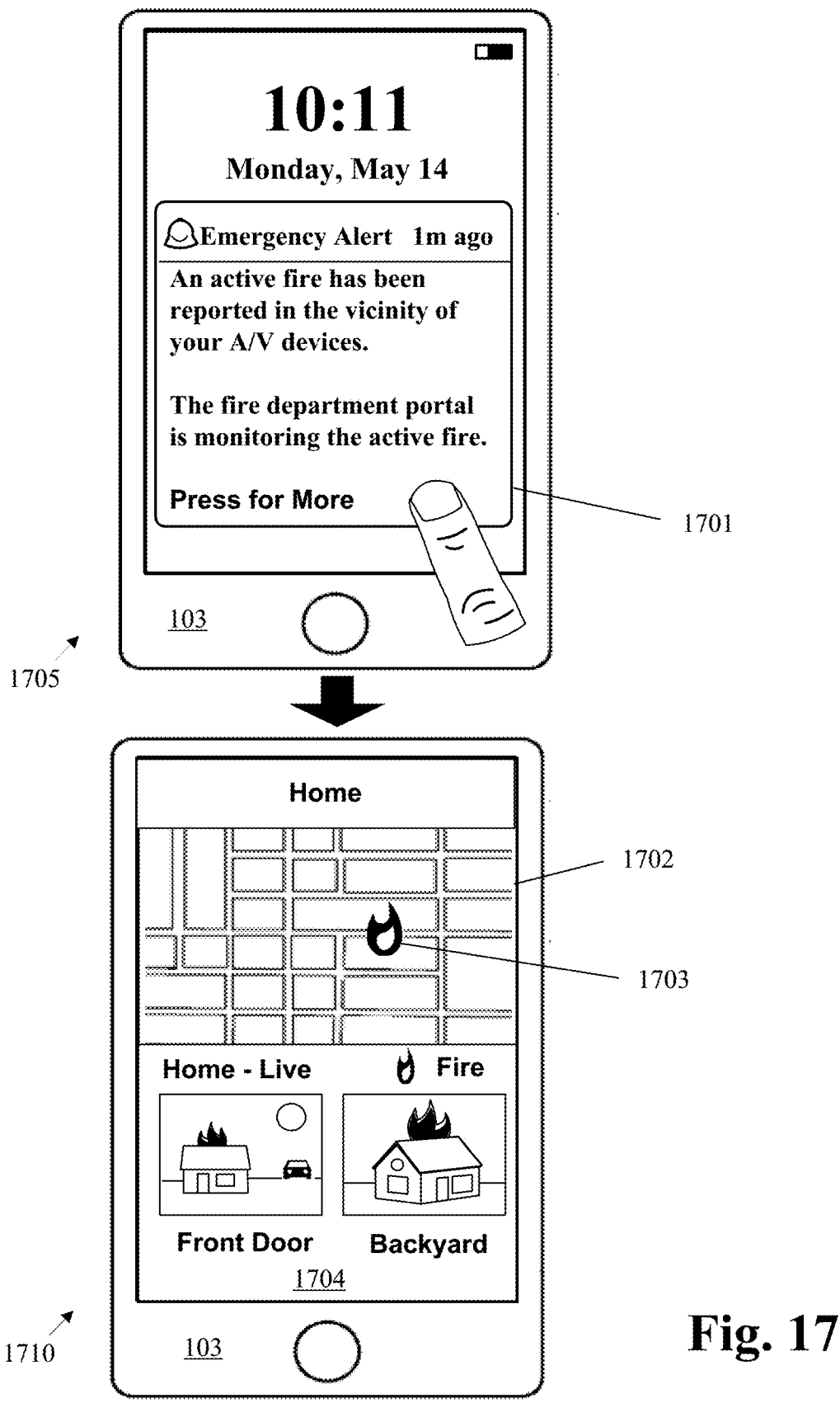
FIG. 17 is a schematic front view of a client device that illustrates an example of presenting live A/V data of preauthorized A/V devices on the display of a client device, according to various aspects of the present disclosure.

FIG. 17 is a schematic front view of a client device that illustrates an example of presenting live A/V data of preauthorized A/V devices on the display of a client device 103, according to various aspects of the present disclosure. Two steps 1705 and 1710 are illustrated in the figure.

With reference to FIG. 17, in the first step 1705, when an emergency is reported within the detection area of one of the user's A/V devices, the user may receive a notification. In the example of FIG. 17, the notification is a pop-up notification 1701 that informs the user that an active fire has been reported in the vicinity of the user's A/V devices. Since the user has preauthorized those A/V devices, in the illustrated example, the notification also informs the user that the fire department portal is aware of the active fire and is monitoring the active fire.

With further reference to FIG. 17, in step 1705, the user selects the notification by tapping the user's finger over the notification 1701. The selection of the notification causes a live view of the scene of the emergency to be presented in live view display area 1704. The live view display area 1704 is similar to the one described above by reference to FIG. 15. For instance, in the example of FIG. 17, the live view display area 1704 presents two live streams captured with the user's A/V devices.

Furthermore, in the illustrated example, the live view display area 1704 may present other data related to the emergency, including date and time of emergency report and the type of emergency. In some aspects of the present embodiments, the live view display area 1704 may be displayed with a map 1702. The map 1702 may show an indication 1703 of the location of the reported emergency. The map 1702 and the indication 1703 are similar to the ones described above by reference to FIG. 15.

Figure 18:
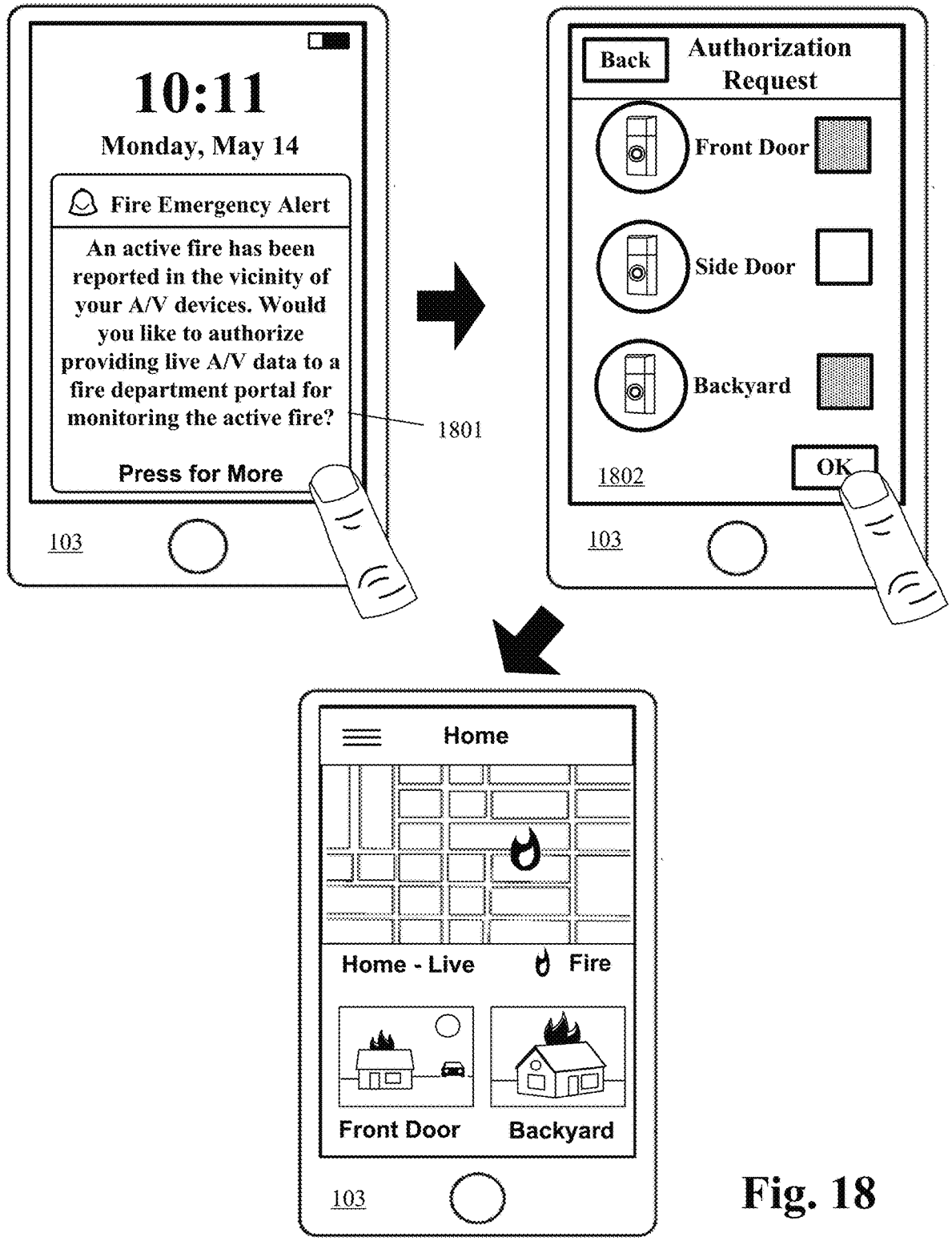
FIG. 18 is a schematic front view of a client device that illustrates an example of presenting live A/V data of non-preauthorized A/V devices on the client device, according to various aspects of the present disclosure.

FIG. 18 is a schematic front view of a client device that illustrates an example of presenting live A/V data of non-preauthorized A/V devices on the client device 103, according to various aspects of the present disclosure. FIG. 18 is similar to FIG. 17. However, instead of preauthorization, FIG. 18 relates to real-time authorization. As shown, the notification 1801 may inform the user that there is an active emergency within the vicinity of one or more of the user's A/V devices. The notification 1801 also may inquire the user if the user would wish to authorize providing live A/V data to a fire department portal for monitoring the active emergency. Once the user selects the notification 1801, the user may be presented with a user interface 1802 to choose one or more A/V devices to share with the fire department portal. The user interface 1802 may be similar to the one described above by reference to FIG. 10. With the user interface 1802, the user may choose one or more of the user's A/V devices to share with the emergency portal.

Figure 19:
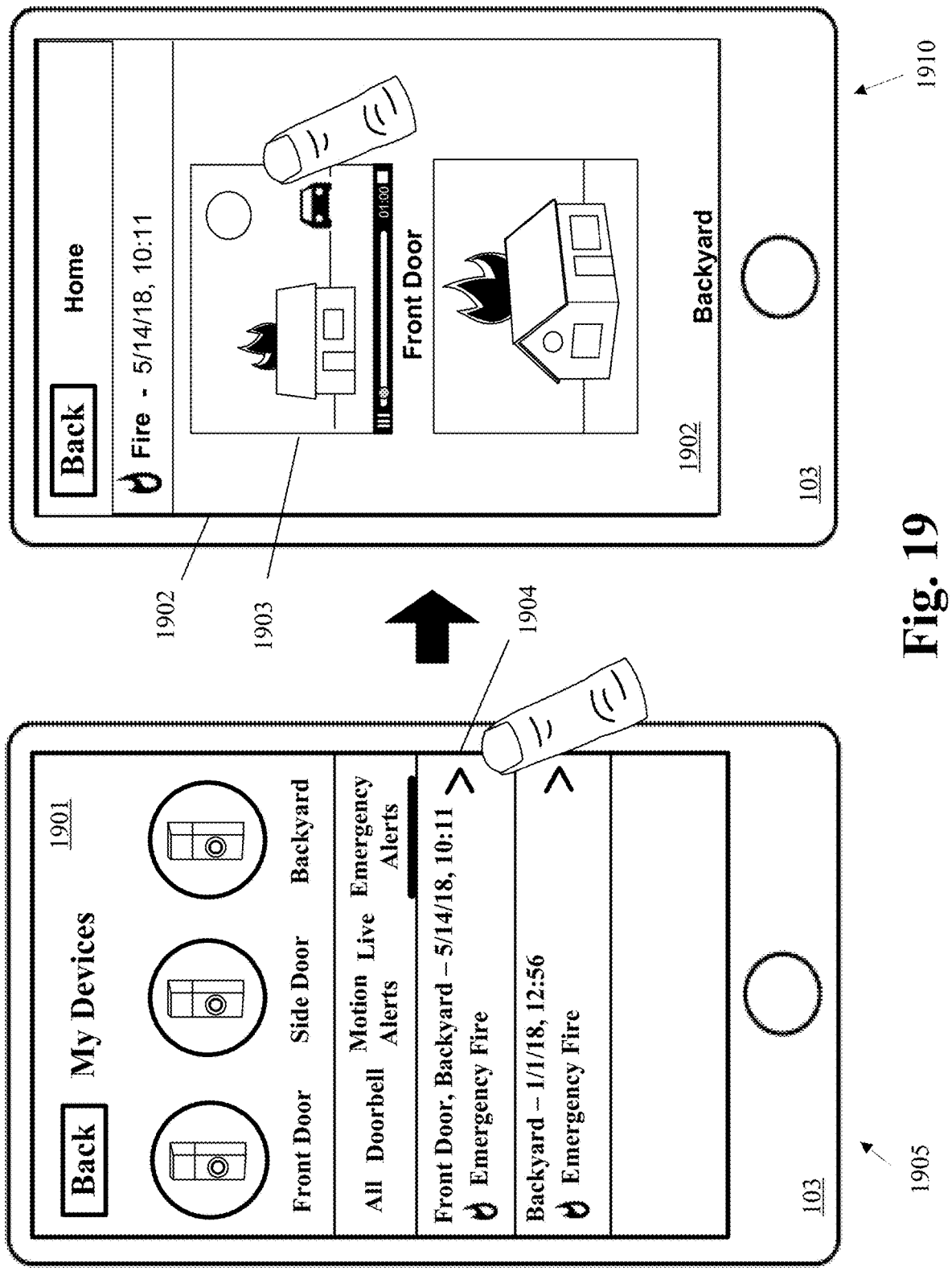
FIG. 19 is a schematic front view of a client device that illustrates an example of presenting past emergencies on the client device, according to various aspects of the present disclosure.

As indicated above, in some aspects of the present embodiments, the client device 103 may allow the user to view not only live emergencies that the user's A/V device(s) is capturing but past emergencies as well. FIG. 19 is a schematic front view of a client device that illustrates an example of presenting past emergencies on the client device 103, according to various aspects of the present disclosure. Two states 1905 and 1910 of the client device 103 are illustrated in the figure.

With reference to FIG. 19, in the first step 1905, the client device's screen displays a user interface menu 1901 to access saved emergency A/V clips. As shown, the user interface menu 1901 may list past emergencies captured with one or more of the user's A/V devices. Each item on the list may be displayed with data relating to the past emergencies. For instance, the list may indicate the date and time of the reported emergency, the type of emergency, an identification of one or more A/V devices that captured that A/V clip(s). In some aspects of the present embodiments, the user interface menu 1901 may present other items, such as list of the user's A/V devices, UI interface controls to navigate to different menu options (e.g., to view all past A/V clips, motion alert clips, the current live feed one or more of the user's A/V devices, etc.).

With further reference to FIG. 19, in the first step 1905, the client device's screen may display a user interface menu 1904 for accessing saved A/V data relating to past emergency events. The user may select a menu item 1904 to display an A/V data playback screen 1902. In step 1905, the user may select a representation 1903 (e.g., thumbnail representation) of an A/V data. The selection of the representation may cause the A/V data to be streamed from the networked device(s) 101 (FIG. 1A) and be played on the playback screen 1902. In some aspects of the present embodiments, the client device 103 does not locally store A/V clips. Instead, the client device 103 may access A/V clips through the networked device(s).

One aspect of the present embodiments includes the realization that, an A/V device or a sensor in a security/alarm system may detect an intrusion to a premises and may generate a signal to inform a networked device, such as a backend server or a security hub device, of an alarm condition. The networked device (or an operator using the networked device) may then take different actions that may include informing a law enforcement agency (e.g., a police department) of the alarm condition. A problem that the law enforcement agency may face is that the law enforcement agency may not know whether the alarm condition is real or false. For example, there may be an intruder inside the premises, the intruder may or may not be armed, or the alarm condition may be false (e.g., the alarm may be triggered by a failed sensor, a child, an animal, a person who is authorized to be in the premises but has been unable to disarm the alarm system, etc.).

The present embodiments solve the aforementioned problem by receiving preauthorization from a user associated with the premises to share the live A/V data from one or more A/V devices in the premises with the law enforcement agencies during an alarm condition. The networked device may then provide the live A/V data to a law enforcement agency's portal for the duration of the alarm condition. The networked device may stop providing the live A/V data to the law enforcement agency when the networked device receives a signal indicating the end of the alarm condition (e.g., when a person enters a password into a security hub in the premises or into a client device associated with the security/alarm system, when the law enforcement agency verifies that the alarm condition no longer exists, etc.).

Figure 20:
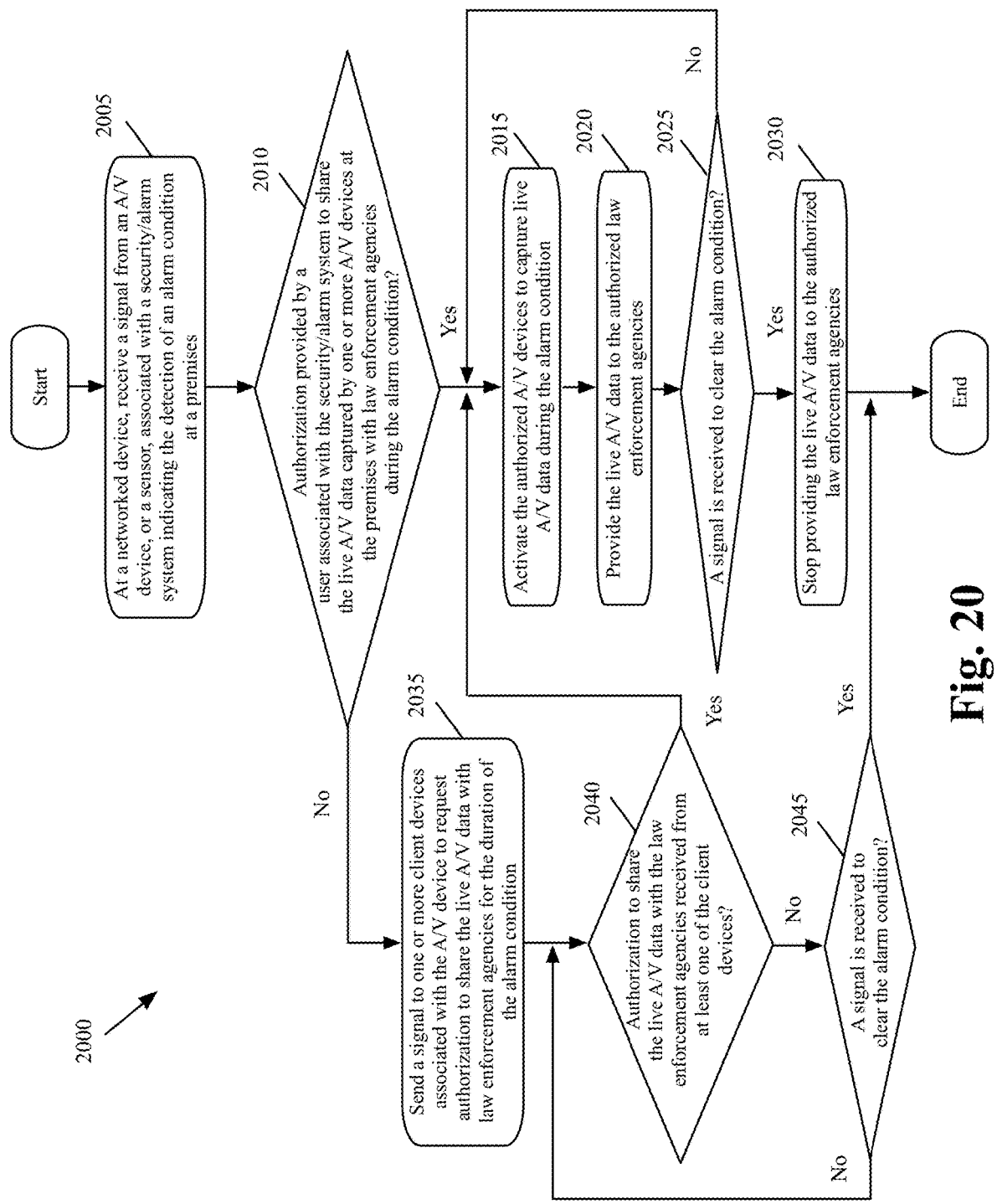
FIG. 20 is a flowchart illustrating an example process for providing live A/V data captured by authorized A/V devices to law enforcement agencies during the pendency of an alarm condition, according to various aspects of the present disclosure.

FIG. 20 is a flowchart illustrating an example process 2000 for providing live A/V data captured by authorized A/V devices to law enforcement agencies during the pendency of an alarm condition, according to various aspects of the present disclosure. In some of the present embodiments, the process 2000 may be performed by one or more processing elements of a networked device 101 (e.g., a security hub device 202 (FIG. 2) or a backend device 220 (FIG. 2)).

With reference to FIG. 20, the process 2000 may receive (at block 2005) a signal at a networked device from an A/V device, or a sensor, associated with a security/alarm system indicating an alarm condition at a premises. For example, an A/V device 171-174 (FIG. 1D) or a security device 175-176 (e.g., a door sensor, a window sensor, a contact sensor, a glass break sensor, a motion sensor, and/or other sensors) that may provide a signal to notify the detection of a security event at a premises.

With reference to FIG. 20, the process 2000 may then determine (at block 2010) whether authorization is provided by a user associated with the security/alarm system to share the live A/V data captured by one or more A/V devices at the premises with law enforcement agencies during the alarm condition. With reference to step 1215 of FIG. 12, a user associated with the security/alarm system may have previously selected the option 1262 to share live data with law enforcement agencies for the duration of an alarm condition. As described above with reference to FIG. 12, in some aspects of the present embodiments, the selection of the option 1262 may cause the live data from the A/V devices that are selected in step 1210 (e.g., the A/V devices 1251 and 1252) to be shared with the law enforcement agencies for the duration of an alarm condition. In other aspects of the present embodiments, the selection of the option 1262 may cause the live data from all A/V device in the premises (e.g., the A/V devices 1251-1253) to be shared with the law enforcement agency for the duration of an alarm condition, regardless of which A/V device was selected in step 1210.

With further reference to FIG. 20, when the process 2000 determines (at block 2010) that the authorization to share the live A/V data is not provided, the process 2000 may proceed to block 2035, which is described below. Otherwise, the process 2000 may activate (at block 2015) the authorized A/V devices to capture live A/V data during the alarm condition. The process 2000 may then provide (at block 2020) the live A/V data to the authorized law enforcement agencies.

The process 2000 may then determine (at block 2025) whether a signal is received to clear the alarm condition. For example, the process 2000 may receive a signal from a security hub device or a client device indicating that a user associated with the security/alarm system may have entered a password through the security hub device or the client device to clear the alarm condition. Alternatively, the law enforcement agency may determine (e.g., upon sending law enforcement agents to the premises or upon reviewing the live A/V data provided at block 2020) that the alarm condition has cleared. The law enforcement agency may send a signal to the networked device (e.g., through a law enforcement agency's portal 177 of FIG. 1D) to indicate that the alarm condition is cleared.

When the process 2000 determines (at block 2025) that a signal is not received to clear the alarm condition, the process may proceed to block 2015, which was described above. Otherwise, when the process 2000 determines (at block 2025) that a signal is received to clear the alarm condition, the process may stop (at block 2030) providing the live A/V data to the authorized law enforcement agencies. The process 2000 may then end.

When the process 2000 determines (at block 2010) that authorization is not provided to share the live A/V data captured by one or more A/V devices at the premises with the law enforcement agencies during the alarm condition, the process 2000 may send (at block 2035) a signal to one or more client devices associated with the A/V device to request authorization to share the live A/V data with law enforcement agencies for the duration of the alarm condition. For example, the process 2000 may send a signal to the client devices to cause a message similar to message 1001 of FIG. 11 to be displayed on the display of the client devices. The message may indicate that an alarm condition is detected at the premises and may ask the user to select one or more A/V devices (or alternatively all A/V devices) in the premises to share live A/V data with the law enforcement agencies during the alarm condition.

The process 2000 may then determine (at block 2040) whether authorization to share the live A/V data with the law enforcement agencies is received from at least one of the client devices. When the process 2000 determines (at block 2040) that authorization to share the live A/V data with the law enforcement agencies is received from at least one of the client devices, the process 2000 may proceed to block 2015, which was described above. Otherwise, the process 2000 may determine (at block 2045) whether a signal is received to clear the alarm condition. When the process 2000 determines (at block 2045) that a signal is not received to clear the alarm condition, the process 2000 may proceed to block 2040, which was described above. Otherwise, the process 2000 may end.

The specific operations of the process 2000 may not be performed in the exact order shown and described. Furthermore, the specific operations described with reference to FIG. 20 may not be performed in one continuous series of operations, in some aspects of the present disclosure, and different specific operations may be performed in different embodiments. In addition, in some aspects of the present embodiments, the process 2000 may only provide the live A/V data the law enforcement agencies if there is a preauthorization for providing the live A/V data to the law enforcement agencies during an alarm condition. In these embodiments, the process 2000 may skip blocks 2035-2045.

In addition, in some embodiments, instead of receiving (at block 2005) a signal from an A/V device (or a sensor associated with a security/alarm system), the process 2000 may receive a signal from a computing device (e.g., a server) associated with a law enforcement agency indicating a public safety threat. For example, in some of the present embodiments, an emergency situation may be declared by law enforcement agencies when a person (e.g., a felon) escapes a law enforcement's custody (e.g., from a state or federal correctional facility). A computing device (e.g., a server) associated with a law enforcement agency may then send a signal (e.g., a bulletin sent to the networked devices 101 of FIG. 1A) that may include one or more images of a person of interest and identify the person of interest as a public safety threat. The law enforcement agency may also identify the whereabout (e.g., a city, a neighborhood, etc.) of the person of interest. In some embodiments where one or more A/V devices are preauthorized to share the presence of a person of interest with law enforcement agency during a public safety threat (e.g., as described above with reference to FIGS. 11 and 12), the networked devices 101 and/or the A/V devices 103 of FIG. 1A may perform computer vision and/or image processing to match the face of a person captured by one or more preauthorized A/V devices 103 with the image of the person of interest identified by the law enforcement agency.

Once a match is identified, the process 2000 may inform (at block 2020) the law enforcement agencies (e.g., as metadata associated with the shared live A/V data) of the presence of the person of interest in the image(s) captured by the preauthorized A/V device(s). In some of the present embodiments, the process 2000 may send (at block 2020), in addition to the A/V data that includes the image(s) of the person of interest, additional information, such as the exact location and/or the vicinity of the A/V devices that captured the image(s), the direction of movement of the person, etc., to the law enforcement agencies. The process 2000 may stop matching the face of persons captured by the preauthorized A/V devices 103 with the image of the person of interest identified by the law enforcement agency once a law enforcement agency sends a signal indicating the end of the public safety threat (e.g., caused by an escapee).

Figure 21:
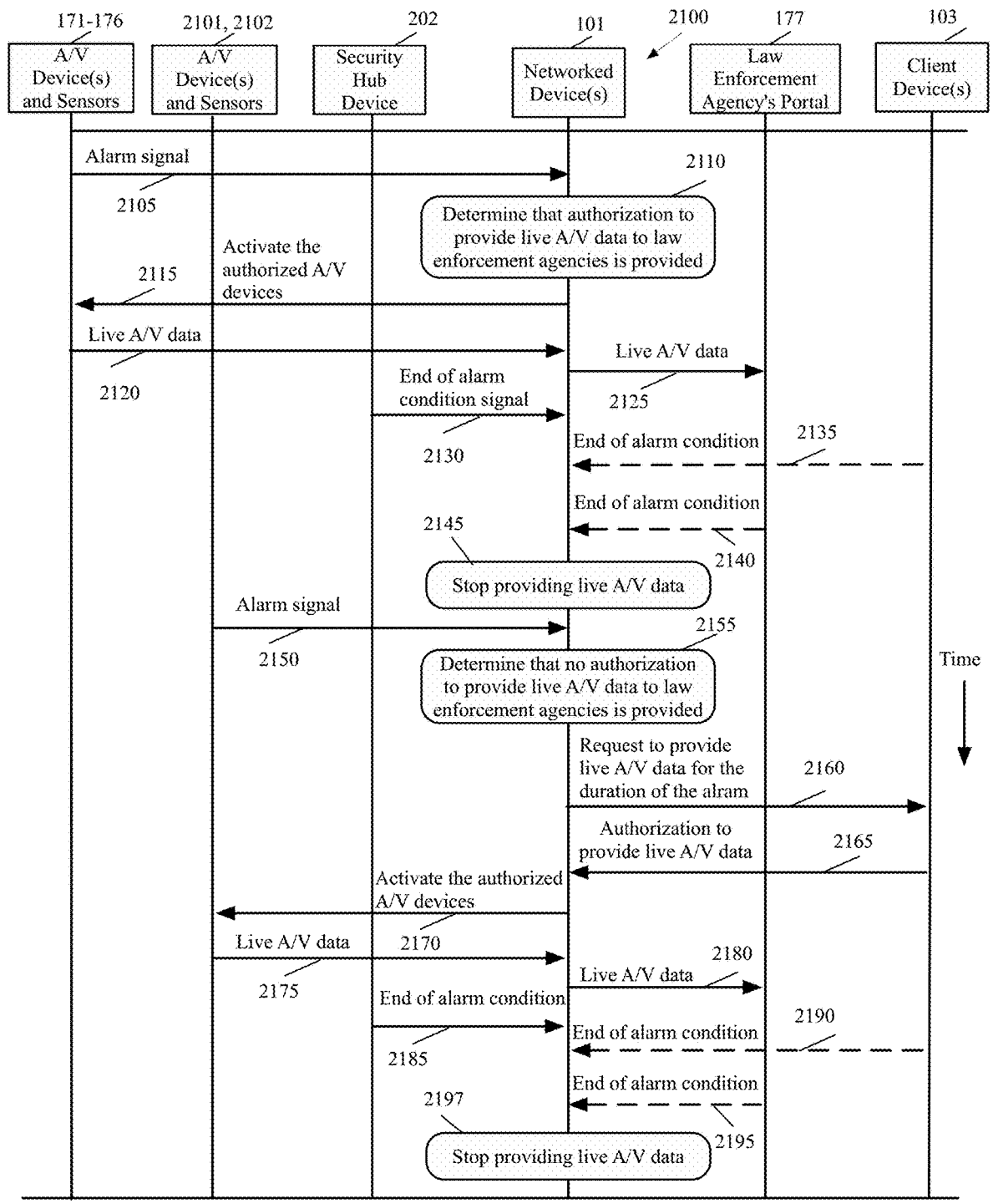
FIG. 21 is an example sequence diagram illustrating data items exchanged between devices in a communication system for providing live A/V data recorded by authorized A/V devices to law enforcement agencies during the pendency of an alarm condition, according to various aspects of the present disclosure.

FIG. 21 is an example sequence diagram 2100 illustrating data items exchanged between devices in a communication system for providing live A/V data recorded by authorized A/V devices to law enforcement agencies during the pendency of an alarm condition, according to various aspects of the present disclosure. The figure illustrates that the A/V devices 171-174 (FIG. 1D) or the security/alarm sensors 175-176 (FIG. 1D) may send (at step 2105) an alarm signal to the networked device(s) 101. For example, the A/V devices 171-174 or the security/alarm sensors 175-176 may detect a motion, may determine that a door or a window is opened, may determine that a glass is broken in a premises, etc. In some of the present embodiments, when some of the A/V devices (e.g. a video doorbell) or sensors (e.g., a front door contact sensor) are triggered, an alarm signal may be generated only after a predetermined delay in order to provide enough time for a person who is legitimately entering the premises to enter a code and disable the alarm. In contrast, some of the A/V devices or sensors (e.g., a glass break sensor, an exterior window contact sensor, etc.) may immediately generate an alarm signal, depending on the current status of the security/alarm system (e.g., when the security/alarm system's alarm is activated, and the occupants of the premises are not inside).

With further reference to FIG. 21, the networked device(s) 101 may determine (at block 2110) that the authorization to provide the live A/V data to the law enforcement agencies has been provided (e.g., by a user associated with the security/alarm system as described above with reference to FIG. 12). The networked device(s) 101 may then send (at step 2115) a signal to the authorized A/V devices 171-174 to activate the corresponding cameras and to provide live A/V data.

In some of the present embodiments, the A/V devices 171-174 may provide live A/V data to the networked device(s) 101 as a part of their normal functions, for example, when an A/V device detects motion. The signal sent (at step 2115) may, therefore, be used by the networked device(s) 101 to ensure that the live A/V data is received from all authorized A/V devices even when the A/V devices 171-174 may not be activated as a part of their normal operation. The authorized A/V devices 171-174 may then provide (at step 2120) the live A/V data to the networked device(s) 101). The networked device(s) 101 may then provide (at block 2125) the live A/V data to the law enforcement agency's portal 177. The law enforcement agency portal 177 may be, for example, a police department's portal (or a sheriff's department's portal) with similar functionality as descried above with reference to the emergency portal 1202 (FIG. 1A). As described above with reference to FIGS. 12 and 20, in some aspects of the present embodiments, the live A/V data may be provided to the law enforcement agency from a selected subset of A/V devices (e.g., the A/V devices 1251-1252 in FIG. 12). In other aspects of the present embodiments, the live A/V data may be provided to the law enforcement agency from all A/V devices associated with a premises' security and alarm system.

With further reference to FIG. 21, the networked device(s) 101 may receive (at steps 2130, and/or 2135) an end of alarm condition signal from the security hub device 202 (FIG. 2) and/or a client devices 103, for example when a user associated with the security/alarm system enters a code to clear the alarm condition after the alarm signal was generated by an A/V device 171-174 or a security/alarm sensor 175-176. Alternatively, the networked device(s) 101 may receive (at step 2140) an end of alarm condition signal from the law enforcement agency's portal 177, for example, when the law enforcement agency determines that the alarm condition is cleared. The networked device(s) 101 may then stop (at block 2145) providing the live A/V data to the law enforcement agency's portal 177 after receiving (at steps 2130, 2135, and/or 2140) the end of alarm condition signal.

With continued reference to FIG. 21, the A/V devices 2101 and/or the security/alarm sensors 2102 may send (at step 2150) an alarm signal to the networked device(s) 220. The A/V devices 2101 and the security/alarm sensors 2102 may respectively be similar to the A/V devices 171-174 and the security/alarm sensors 175-176, which may be installed at a different premises.

With further reference to FIG. 21, the networked device(s) 101 may determine (at block 2155) that no authorization to provide the live A/V data to the law enforcement agencies has been provided by a user associated with the security/alarm system. The networked device(s) 101 may then send (at step 2160) a request to provide live A/V data for the duration of the alarm to one or more client devices 103 associated with the A/V devices 2101.

The networked device(s) 101 may then receive (at step 2165) authorization to provide the live A/V data from at least one of the client devices 103 associated with the A/V devices 2101. The networked device(s) 101 may then send (at step 2170) a signal to the authorized A/V devices 2101 to activate the corresponding cameras and provide live A/V data. The authorized A/V devices 2101 may then provide (at step 2175) live A/V data to the networked device(s) 101. The networked device(s) 101 may then provide (at step 2180) the live A/V data to the law enforcement agency's portal 177.

With further reference to FIG. 21, the networked device(s) 101 may receive (at steps 2185, and/or 2190) an end of alarm condition signal from the security hub device 202 and/or a client device 103, for example when a user associated with the security/alarm system enters a code to clear the alarm condition after the alarm signal was generated by an A/V device 2101 or a security/alarm sensor 2102. Alternatively, the networked device(s) 101 may receive (at step 2195) an end of alarm condition signal from the law enforcement agency's portal 177, for example, when the law enforcement agency determines that the alarm condition is cleared. The networked device(s) 101 may then stop (at block 2197) providing the live A/V data to the law enforcement agency's portal 177 after receiving (at steps 2185, 2190, and/or 2195) the end of alarm condition signal.

Another aspect of the present embodiments includes the realization that, A/V devices may include motion sensors and/or motion detection software and send A/V data to one or more networked device when motion is detected within a zone around the A/V device. The A/V devices may not send the A/V data to the networked devices when no motion is detected in the field of view of the A/V device's camera. Therefore, during an earthquake, the A/V devices in the earthquake area may not capture and/or send the A/V data to the networked device.

Some of the present embodiments solve the aforementioned problem by including a gyro sensor in an A/V device. The gyro sensor may sense shaking during an earthquake and may send a signal to a processing unit of the A/V device indicating that an earthquake may have started. The processing unit may halt the normal operation of the A/V device and may place the A/V device in an earthquake mode (or disaster mode). The processing unit may send a signal to activate the A/V device's camera to capture live A/V data during the earthquake. The processing unit may receive the A/V data from the camera and may send the A/V data to one or more networked devices and/or may store the A/V data in the A/V device's memory.

When the gyro sensor senses that the shaking has stopped, the gyro sensor may send a signal to the processing unit indicating that the earthquake may have stopped. In response, the processing unit may leave the earthquake mode and may return the A/V device to the normal operation mode. The processing unit may send a signal to the camera to stop capturing A/V data for the earthquake mode.

Figure 22:
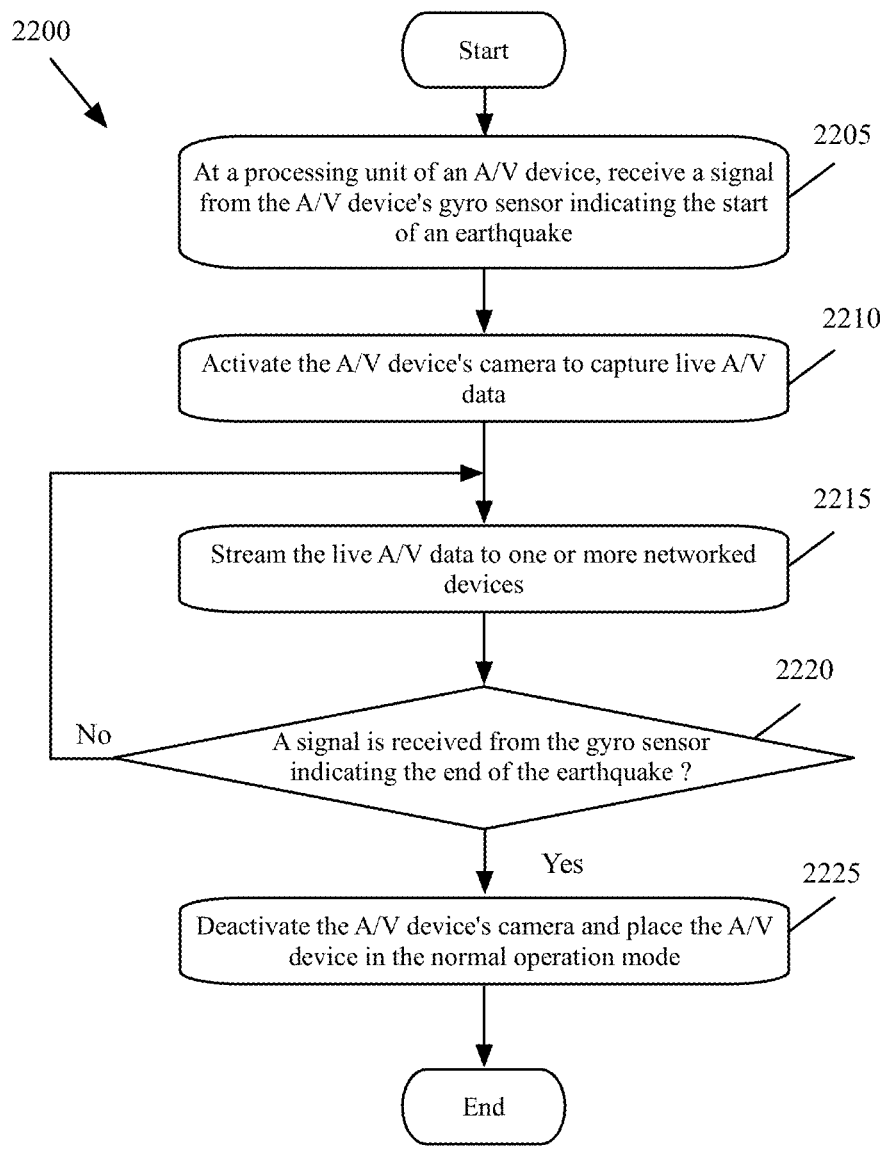
FIG. 22 is a flowchart illustrating an example process for capturing A/V data during an earthquake and sending the captured A/V data to one or more networked devices, according to various aspects of the present disclosure.

FIG. 22 is a flowchart illustrating an example process 2200 for capturing A/V data during an earthquake and sending the captured A/V data to one or more networked devices, according to various aspects of the present disclosure. In some of the present embodiments, the process 2200 may be performed by a processing unit of an A/V device such as the A/V devices 194, 195 of FIG. 1D.

With reference to FIG. 22, the process 2200 may receive (at block 2205) a signal at the processing unit of the A/V device, from the A/V device's gyro sensor, indicating the start of a shaking movement detected by the gyro sensor that may be due to the start of an earthquake. A gyro sensor (or a gyroscope) is a device that measures rotational motion. Some of the present embodiments may include a MEMS gyro sensor that is a miniaturized gyroscope. When a MEMS gyro sensor is rotated, a small resonating mass shifts as the angular velocity changes. The movement of the resonating mass is converted into an electrical signal that may be read by a processing unit.

With reference to FIG. 3, the processing unit 310 of the A/V device 210(a) may receive a signal from the gyro sensor 350 when the gyro sensor detects shaking of the structure (e.g., a wall, a door, a window) on which the gyro sensor is installed. The gyro sensor 350 may, for example, generate an interrupt signal that may transfer the processing unit 310 out of the normal operation mode into an earthquake mode. In some the present embodiments, the gyro sensor may be configured to send the signal at the start of a shaking movement only when the gyro sensor detects a shaking movement that may be the result of an earthquake.

With reference to FIG. 22, the process 2200 may activate (at block 2210) the A/V device's camera to capture live A/V data while the gyro sensor is sensing shaking that may indicate an earthquake. In some of the present embodiments, the process 2200 may take the A/V from the A/V device's normal operation mode into the earthquake mode. In an A/V device's normal operation mode, the A/V device may send captured A/V data to a networked device when the A/V device is requested to provide live data or when the A/V device detects a moving object within a predefined motion zone around the A/V device. In the earthquake mode, the A/V device may send the A/V data to the networked device for the duration of the earthquake.

With continued reference to FIG. 22, the process 2200 may stream (at block 2215) the live A/V data to one or more networked devices (e.g., the networked devices 101 of FIG. 1D). Alternatively, the A/V device may store the A/V data in the A/V device's memory 322, 324 (FIG. 3) during the earthquake and may send the recorded A/V data to the networked devices 101 after the end of the earthquake. In some of the present embodiments, the process 2200 may send the A/V data to the networked devices through the A/V device's communication module 312 as an A/V data stream (e.g., a video stream). The process 2200 may then determines (at block 2220) whether a signal is received from the gyro sensor indicating the end of the earthquake. The gyro sensor 350 may, for example, generate an interrupt signal when the gyro sensor no longer detects a shaking movement that may be the result of the earthquake.

With further reference to FIG. 22, in response to receiving the signal indicating the end of the earthquake from the gyro sensor, the process 2200 may deactivate (at block 2225) the A/V device's camera and place the A/V device in the normal mode of operation. The process 200 may then end.

The specific operations of the process 2200 may not be performed in the exact order shown and described. Furthermore, the specific operations described with reference to FIG. 22 may not be performed in one continuous series of operations, in some aspects of the present disclosure, and different specific operations may be performed in different embodiments. For example, in some aspects of the present embodiments, the process 2200 may store (at block 2215) the A/V data received from the camera during an earthquake instead of streaming the A/V data to the networked devices. In these embodiments, the process 2200 may stream the A/V data or send the stored A/V data as a file to the networked devices at a later time (e.g., after the earthquake has stopped and a connection is established with the networked devices).

In addition, the A/V device's camera may be already active (e.g., capturing A/V data because a moving object was detected by the A/V device) at the time of the earthquake. The activation of the A/V device's camera by the process 2200 (at block 2210) may, therefore, include keeping the A/V device's camera active for the during of the earthquake even after there are no moving objects detected by the A/V device.

In some of the present embodiments, when the networked device(s) 101 (FIG. 1D) receive the A/V data captured during the earthquake, the networked device(s) 101 may determine whether a user associated with the A/V devise has authorized sharing of the captured A/V data with one or more requesting parties (e.g. as described with reference to steps 151 and/or 155 of FIG. 1D). For example, the client devices 103, in some of the present embodiments, may provide a user interface similar to the user interface 1200 (FIG. 12) and may perform a process similar to the process 1100 to receive preauthorization for sharing the A/V data captured during an earthquake with a requesting party's portal 193. The client devices 103 in some of the present embodiments may provide a user interface similar to the user interface 1000 (FIG. 10) and may perform a process similar to the process 900 (FIG. 9) to receive authorization after an earthquake for sharing the A/V data captured during an earthquake with a requesting party's portal 193.

The networked device(s) 101 may send (e.g., by streaming) the A/V data captured during the earthquake to the requesting party's portal 193. the requesting party's portal 193, may share the A/V data (depending on the authorization) with one or more affiliate organizations such as news channels, weather channels, earthquake research agencies, etc.

Figure 23:
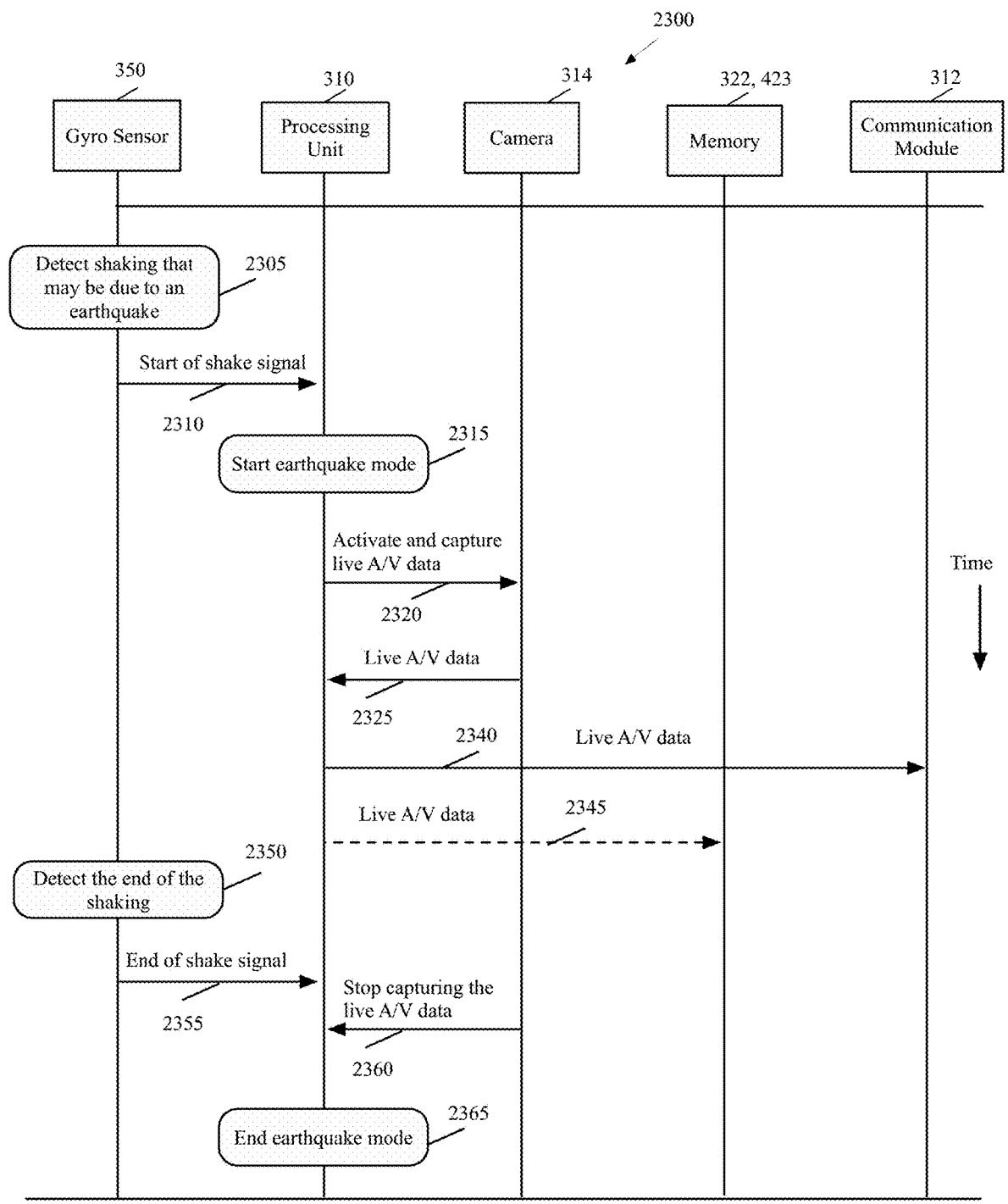
FIG. 23 is an example sequence diagram illustrating data items exchanged between different components of an A/V device for recording live A/V data during an earthquake, according to various aspects of the present disclosure.

FIG. 23 is an example sequence diagram 2300 illustrating data items exchanged between different components of an A/V device for recording live A/V data during an earthquake, according to various aspects of the present disclosure. The components of the A/V device in FIG. 23 may be similar to the components of A/V 210(*a*) described above with reference to FIG. 3.

With reference to FIG. 23, the A/V device's gyro sensor 350 may detect (at block 2305) shaking that may be due to an earthquake. The gyro sensor 350 may then send (at step 2310) a signal to the A/V device's processing unit 310 indicating the start of the shaking. For example, the gyro sensor 350 may detect shaking that is beyond a threshold and may send (at step 2310) an interrupt to the processing unit 310. In response to receiving the start of shake signal, the processing unit 310 may start (at step 2315) an earthquake (or disaster) mode. In the earthquake mode, the processing unit 310 may perform the operations described below with reference to steps 2320-2365.

With continued reference to FIG. 23, the processing unit 310 may send (at step 2320) a signal to the A/V device's camera 314 to activate the camera to capture live A/V data. The processing unit may then receive (at step 2325) the live A/V data from the A/V device's camera 314. The processing unit 310 may send (at step 2340), for example by streaming, the live A/V data through the communication module 312 to one or more networked devices 101 (FIG. 1D) and/or one or more client devices 103 (FIG. 1D). The communication module 312, in some of the present embodiments, may include a transceiver (or a receiver and a transmitter) and one or more antennas. In addition, or in lieu of sending (at step 2340) the live data to the communication module 312, the processing unit may store (at step 2345) the live A/V data in the A/V device's volatile 322 or non-volatile 324 memories. The processing unit may send the stored A/V data through the communication module 312 to the network devices and/or to the client devices at a later time, for example, after the end of the earthquake.

The gyro sensor 350 may detect (at block 2350) the end of the shaking. The gyro sensor 350 may then send (at step 2355) an end of shake signal to the processing unit 310. The processing unit may send (at step 2360) a signal to the A/V device's camera 314 to stop capturing the live A/V data of the earthquake. The processing unit may end (at block 2365) the earthquake mode. The processing unit may, for example, place the A/V device in normal mode of operation to capture A/V data of moving objects, to provide live A/V data upon a request from a client device, etc.

Figure 24:
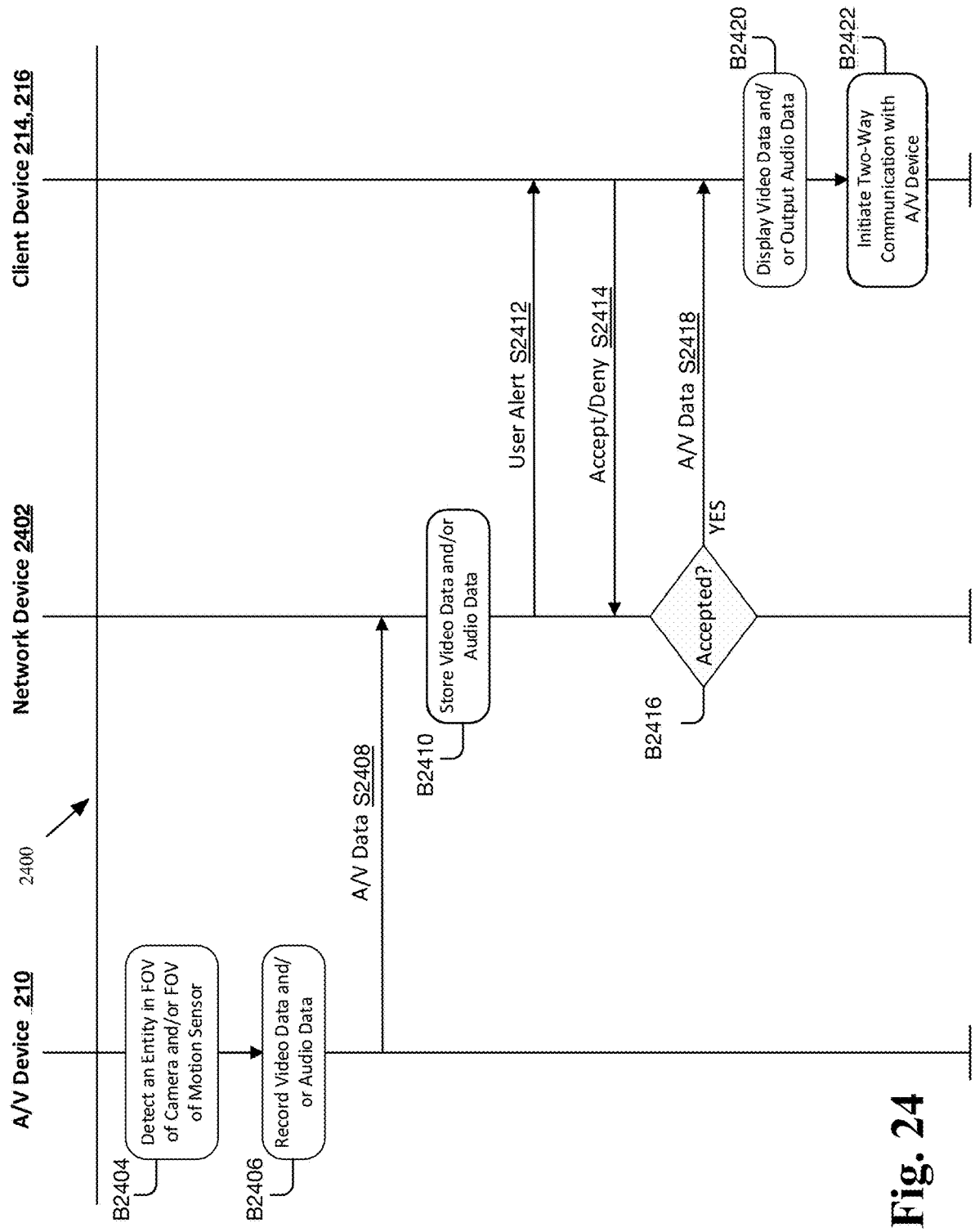
FIG. 24 is a signal diagram of a process for streaming and/or storing A/V content from an A/V recording and communication device, according to various aspects of the present disclosure.

FIG. 24 is a signal diagram of a process 2400 for streaming and storing A/V content from the A/V device 210, according to various aspects of the present disclosure. The network device 2402 may include one or more of the hub device 202, the VA device 208, and/or any of the components of the network(s) of servers/backend devices 220 (e.g., the backend server 224, the backend API 226, the storage devices 222, etc.).

The process 2400, at block B2404, detects an object in a field of view of a camera and/or a field of view of a motion sensor. For example, the A/V device 210 may detect the presence of an object within a field of view of view of the motion sensor(s) 326 (e.g., a motion sensor field of view) and/or a field of view of the camera 314 (e.g., a camera field of view). To detect motion using the motion sensor(s) 326, the data type (e.g., voltage for PIR sensors) from the output signal of the motion sensor(s) 326 may be analyzed, by the processor(s) 310 of the A/V device 210, to determine whether the output signal is indicative of motion of an object that should prompt the recording of the image data 406 and/or audio data 408 at block B2406 and signal S2408. To detect motion using the camera 314, the processor(s) 310 of the A/V device 210 may analyze the image data 406 by performing, for example, a frame by frame comparison of a change in pixels, to determine whether the image data 406 is indicative of motion of an object that should prompt the recording and transmission of image data 406 and/or audio data 408 at block B2406 and signal S2408.

The process 2400, at block B2406, records video data and/or audio data. For example, the processor(s) 310 of the A/V device 210 may cause the camera 314 to begin generating the image data 406 and/or the microphone(s) 328 to being recording the audio data 408.

The process 2400, at signal S2408, transmits the video data and/or the audio data to a network device 2402. For example, the processor(s) 310 of the A/V device 210, using the communication module 312, may transmit the image data 406 and/or the audio data 408 to the network device 2402. In response, the network device 2402 may receive, by respective processor(s) and using respective communication module(s), the image data 406 and/or the audio data 408. In some embodiments, the image data 406 and/or the audio data 408 is transmitted to the hub device 202 and/or the VA device 208, and the hub device 202 and/or the VA device 208 may transmit (or forward) the image data 406 and/or the audio data 408 to one or more components of the network(s) of servers/backend devices 220. In either embodiment, the network device 2402 may transmit the image data 406 and/or the audio data 408 to a client device(s) 214, 216. In other embodiments, the image data 406 and/or the audio data 408 may be transmitted to the hub device 202 and/or the VA device 208, and the hub device 202 and/or the VA device 208 may transmit (or forward) the image data 406 and/or the audio data 408 to the client device(s) 214, 216. Still, in some embodiments, the image data 406 and/or the audio data 408 may be transmitted directly to the client device(s) 214, 216 from the A/V device 210.

The process 2400, at block B2410, stores the video data and/or the audio data. For example, the network device 2402 may store the image data 406 and/or the audio data 408. The image data 406 and/or the audio data 408 may be stored for future access by the user(s) of the A/V device 210 (e.g., as Cloud storage). In some embodiments, the A/V device 210 may store the image data 406 and/or the audio data 408 locally (e.g., in the memory 402). In some embodiments, the image data 406 and/or the audio data 408 may not be stored, except during buffering, compression, and/or live (or near-live) streaming of the image data 406 and/or the audio data 408 to the client device(s) 214, 216. In such embodiments, at the conclusion of a motion event (e.g., when an object is no longer in the camera field of view and/or the motion sensor field of view), the video data and/or the audio data may be deleted from the network device 2402.

The process 2400, at signal S2412, transmits a message to the client device. For example, the network device 2402 may transmit, by the respective processor(s) and using the respective communication module(s), a message 416 to the client device(s) 214, 216. In some embodiments, the message 416 may be generated and transmitted, by the processor(s) 310 and using the communication module 312, directly to the client device(s) 214, 216 from the A/V device 210. The message 416 may be a notification (e.g., a push notification, a message, (e.g., a short-message-service (SMS) message), an email, a phone call, a signal, and/or another type of message. The message 416 may be configured to provide a user of the client device(s) 214, 216 with an indication that an object is present at the A/V device 210. In some embodiments, the message 416 may be informative as to the type of motion detected and/or object present at the A/V device 210. For example, if a person, an animal, a parcel, or a vehicle is present, the message 416 may include an indication of such. As another example, if the person and/or animal detected are known to be dangerous and/or are acting suspicious (as determined using computer vision processing, image processing, behavioral analysis, third party source(s), etc.), the message 416 may include an indication of such.

The process 2400, at signal S2414, transmits an acceptance or denial of the message. For example, the client device(s) 214, 216 may transmit, by the processor(s) 702 and using the communication module 710, an acceptance or denial of the message 416. In various embodiments, acceptance of the message 416 includes an acknowledgement of receipt of the message 416 from the client device(s) 214, 216. In yet other embodiments, the acceptance includes the user interacting with (e.g., selecting through a user interface a user interface element of a modal window displayed by a display device the client device(s) 214, 216) the message 416. Furthermore, denial of the message 416 may include a variety of different actions and/or information. In one example, a denial includes a failure of the client device(s) 214, 216 to provide a response to the message 416 within an interval of time. In yet another example, the denial includes the user interacting with the message 416 by at least selecting an "ignore" user interface element of a GUI 718 of the client device(s) 214, 216. In response, the hub device 202, the VA device 208, and/or one or more components of the network(s) of servers/backend devices 220 may receive, by the respective processors and using the respective communication modules, the acceptance or denial of the message 416 from the client device(s) 214, 216.

The process 2400, at block B2416, determines whether the message was accepted or denied. For example, the network device 2402 may determine, by the respective processors, whether the message 416 was accepted or denied. In some embodiments, the processor(s) 310 of the A/V device 210, using the communication module 312, may determine whether the message 416 was accepted or denied (e.g., in embodiments where the A/V device 210 and the client device(s) 214, 216 communicate directly). When the message 416 is denied, the process 2400 may end, or another transmission type of the message may be generated (e.g., if a user denies a push notification, an SMS message may be transmitted). When the message 416 is accepted, the image data 406 and/or the audio data 408 may be transmitted to the client device(s) 214, 216 that accepted the message 416.

The process 2400, at signal S2418, transmits the video data and/or the audio data to the client device(s) 214, 216. For example, network device 2402, by the respective processor(s) and using the respective communication module(s), may transmit the image data 406 and/or the audio data 408 to the client device(s) 214, 216. In response, the client device(s) 214, 216, by the processor(s) 702 and using the communication module 710, may receive the image data 406 and/or the audio data 408. In some embodiments, the image data 406 and/or the audio data 408 may be transmitted by the processor(s) 310 of the A/V device 210, using the communication module 312, directly to the client device(s) 214, 216.

The process 2400, at block B2420, displays the video data and/or outputs the audio data. For example, the processor(s) of the client device(s) 214, 216 may cause display, on the display 716 of the client device(s) 214, 216, the image data 406 and/or may cause output, by the speaker(s) 708 of the client device(s) 214, 216, the audio data 408. In addition to displaying the image data 406 and/or outputting the audio data 408, a GUI 718 may be displayed on the client device(s) 214, 216 that may allow a user of the client device(s) 214, 216 to perform one more actions. The one or more actions may include outputting a siren, or alarm, by selecting a siren/alarm icon, changing camera settings (e.g., pan, tilt, zoom, brightness, contrast, etc.) by selecting one or more camera settings icons, activating one or more modes by selecting a mode activation icon (e.g., for activating a parcel protection mode for monitoring a package in the camera field of view), arming or disarming a security system by selecting an arm/disarm icon, unlocking a door by selecting a door lock icon, etc. In some embodiments, the GUI 718 may further include a talk icon for initiating a two-way communication session between the client device(s) 214, 216 and the A/V device 210, as described below with respect to block B2422.

The process 2400, at block B2422, initiates a two-way communication with the A/V device. For example, the processor(s) 702 of the client device(s) 214, 216, using the communication module 710, may initiate a two-way communication session with the A/V device 210. In response, the A/V device 210 and/or the network device 2402 may receive the two-way communication request from the client device(s) 214, 216. Once the two-way communication session is established, the voice/sound input at the client device(s) 214, 216, as captured by the microphone(s) 706 of the client device(s) 214, 216, may be transmitted as audio data to the A/V device 210 for output by the speaker(s) 330. Additionally, the voice/sound input at the A/V device 210, as captured by the microphone(s) 328 of the A/V device 210, may be transmitted as audio data 408 to the client device 214, 216 for output by the speaker(s) 708 of the client device(s) 214, 216.

Figure 25:
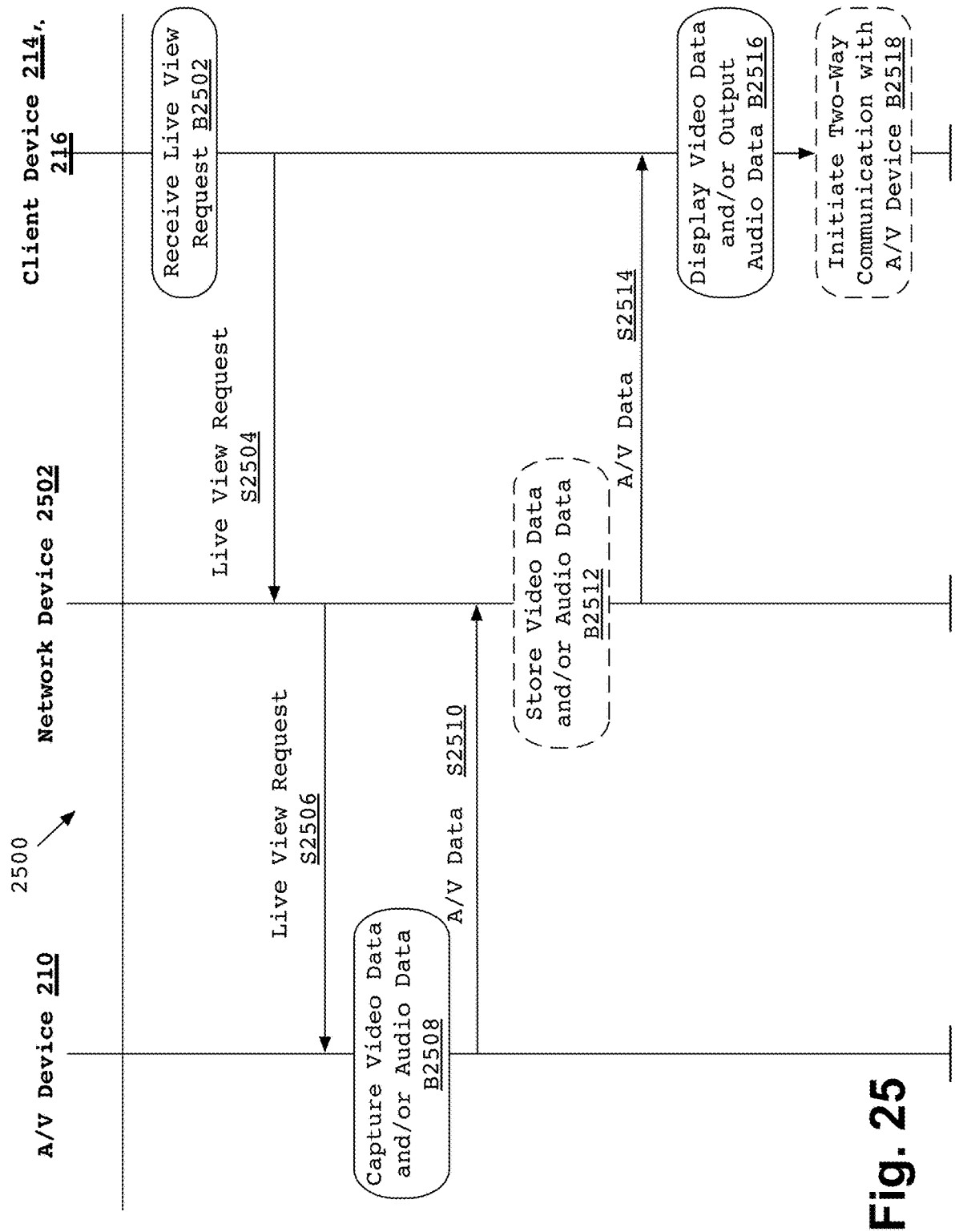
FIG. 25 is a signal diagram of a process for initiating a video-on-demand session for A/V content from an A/V recording and communication device, according to various aspects of the present disclosure.

FIG. 25 is a signal diagram of a process 2500 for initiating a video-on-demand session for A/V content from an A/V device 210, according to various aspects of the present disclosure. The network device 2502 may include one or more of the hub device 202, the VA device 208, and/or any of the components of the network(s) of servers/backend devices 220 (e.g., the backend server 224, the backend API 226, the storage devices 222, etc.).

The process 2500, at block B2502, receives a live view request. For example, the processor(s) 702 of the client device 214, 216 may receive a live view request from a user of the client device 214, 216. The live view request may include an input to user interface (e.g., the display 716, such as within a GUI 718 on the display 716, one or more physical buttons of the client device 214, 216, etc.).

The process 2500, at signal S2504, transmits a live view request. For example, the live request may be transmitted, by the processor(s) 702 and using a communication module 710 of the client device 214, 216, to the network device 2502. In response, network device 2502 may receive, by the respective processor(s) and using the respective communication module(s), the live view request. In some embodiments, the live view request may be transmitted directly to the A/V device 210 from the client device 214, 216.

The process 2500, at signal S2506, transmits the live request. For example, network device 2502 may transmit (or forward), by the respective processor(s) and using the respective communication module(s), the live view request to the A/V device 210. In response, the processor(s) 310 of the A/V device 210, using the communication module 312, may receive the live view request.

The process 2500, at block B2508, captures video data and/or audio data. For example, in response to receiving the live view request, the processor(s) 310 of the A/V device 210 may cause the camera 314 to record the image data 406 and/or the microphone(s) 328 to record the audio data 408.

The process 2500, at signal S2510, transmits the video data and/or the audio data. This process may be similar to that of signal S2408 of the process 2400, described above.

The process 2500, at block B2512, stores the video data and/or the audio data. This process may be similar to that of block B2410 of the process 2400, described above.

The process 2500, at block S2514, transmits the video data and/or the audio data to the client device. This process may be similar to that of signal S2418 of the process 2400, described above.

The process 2500, at block B2516, displays the video data and/or outputs the audio data. This process may be similar to that of block B2420 of the process 2400, described above.

The process 2500, at block B2518, initiates two-way communication with the A/V device 210. This process may be similar to that of block B2422 of the process 2400, described above.

Figure 26:
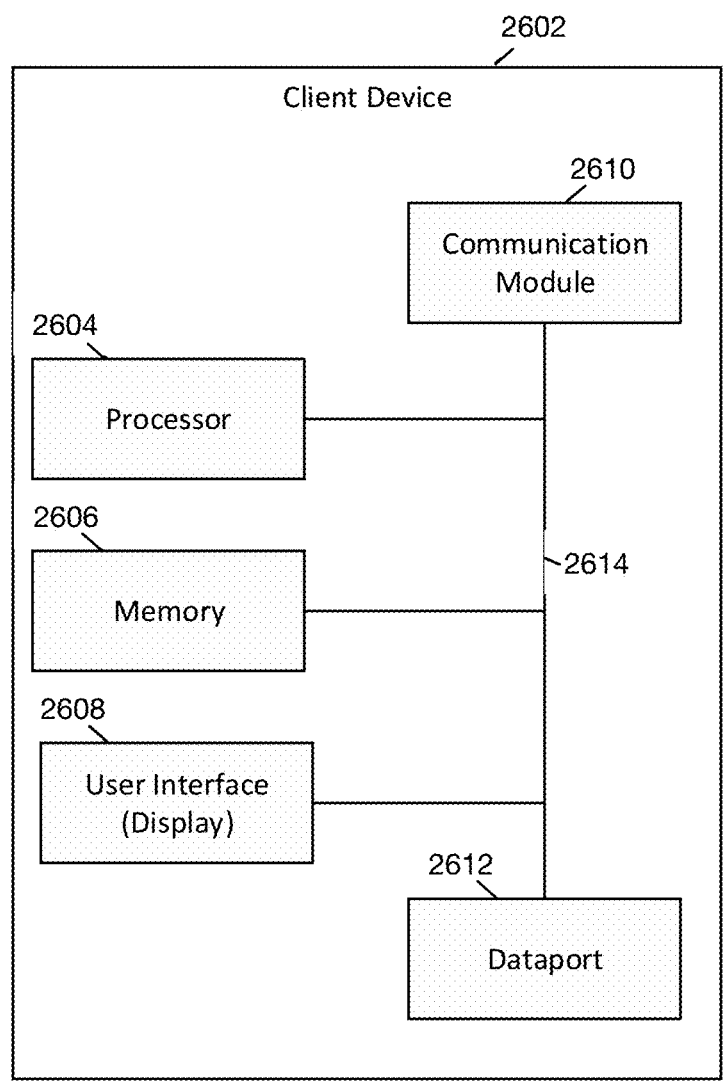
FIG. 26 is a functional block diagram of a client device on which the present embodiments may be implemented, according to various aspects of the present disclosure.

FIG. 26 is a functional block diagram of a client device 2602 on which the present embodiments may be implemented, according to various aspects of the present disclosure. The client device(s) 214, 216 described with reference to FIG. 2 may include some or all of the components and/or functionality of the client device 2602. The client device 2602 may comprise, for example, a smartphone.

With reference to FIG. 26, the client device 2602 includes a processor 2604, a memory 2606, a user interface 2608, a communication module 2610, and a dataport 2612. These components are communicatively coupled together by an interconnect bus 2614. The processor 2604 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 2606 may include both operating memory, such as random-access memory (RAM), as well as data storage, such as read-only memory (ROM), hard drives, flash memory, or any other suitable memory/storage element. The memory 2606 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 2604 and the memory 2606 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2604 may be connected to the memory 2606 via the dataport 2612.

The user interface 2608 may include any user interface or presentation elements suitable for a smartphone and/or a portable computing device, such as a keypad, a display screen, a touchscreen, a microphone, and a speaker. The communication module 2610 is configured to handle communication links between the client device 2602 and other, external devices or receivers, and to route incoming/outgoing data appropriately. For example, inbound data from the dataport 2612 may be routed through the communication module 2610 before being directed to the processor 2604, and outbound data from the processor 2604 may be routed through the communication module 2610 before being directed to the dataport 2612. The communication module 2610 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2612 may be any type of connector used for physically interfacing with a smartphone and/or a portable computing device, such as a mini-USB port or an IPHONE®/IPOD® 30-pin connector or LIGHTNING® connector. In other embodiments, the dataport 2612 may include multiple communication channels for simultaneous communication with, for example, other processors, servers, and/or client terminals.

The memory 2606 may store instructions for communicating with other systems, such as a computer. The memory 2606 may store, for example, a program (e.g., computer program code) adapted to direct the processor 2604 in accordance with the present embodiments. The instructions also may include program elements, such as an operating system. While execution of sequences of instructions in the program causes the processor 2204 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 27:
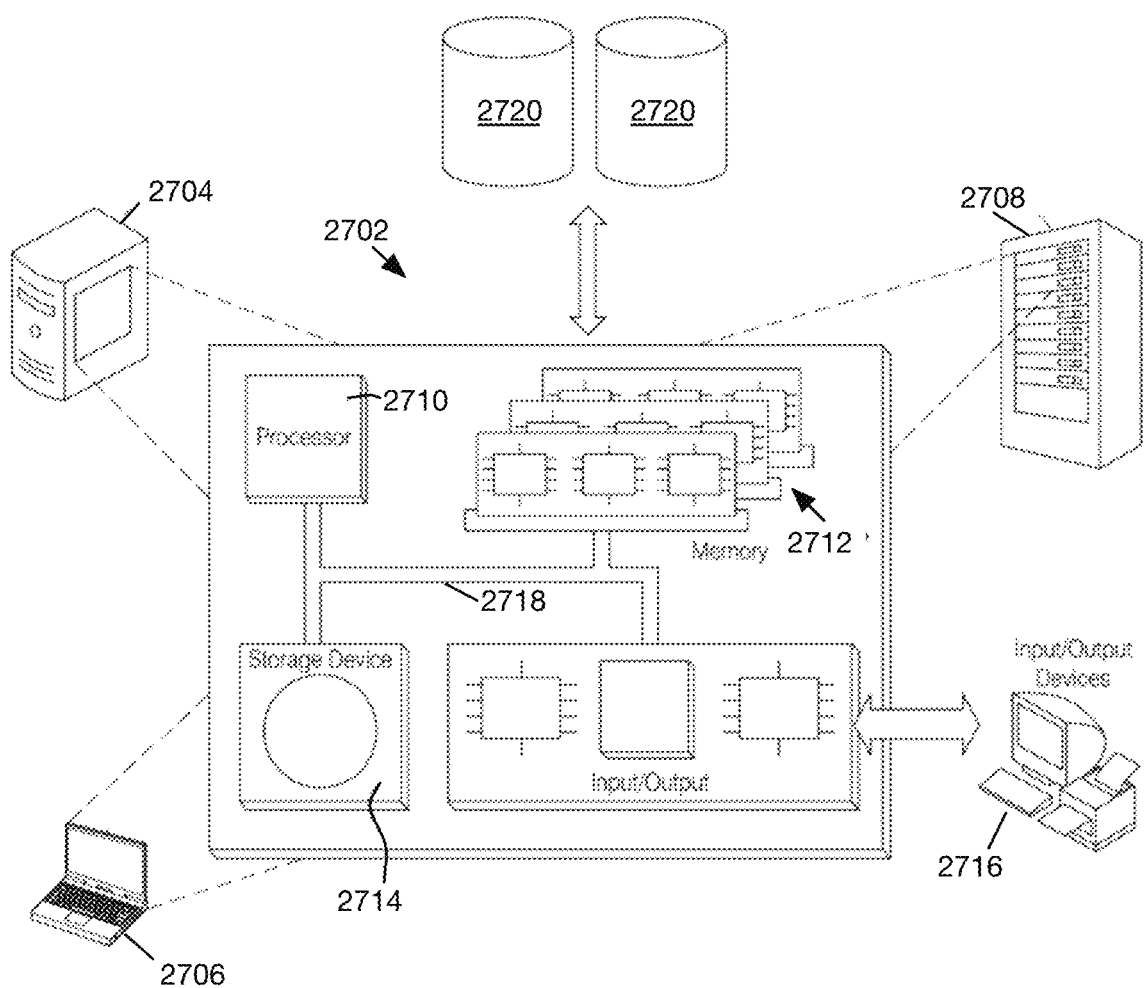
FIG. 27 is a functional block diagram of a general-purpose computing system on which the present embodiments may be implemented, according to various aspects of the present disclosure.

FIG. 27 is a functional block diagram of a general-purpose computing system on which the present embodiments may be implemented, according to various aspects of the present disclosure. The computer system 2702 may be embodied in at least one of a personal computer (also referred to as a desktop computer) 2704, a portable computer (also referred to as a laptop or notebook computer) 2706, and/or a server 2708 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2702 may execute at least some of the operations described above. The computer system 2102 may include at least one processor 2710, memory 2712, at least one storage device 2714, and input/output (I/O) devices 2716. Some or all of the components 2710, 27 12, 2714, 2716 may be interconnected via a system bus 2718. The processor 2710 may be single- or multi-threaded and may have one or more cores. The processor 2710 execute instructions, such as those stored in the memory 2712 and/or in the storage device 2714. Information may be received and output using one or more I/O devices 2716.

The memory 2712 may store information, and may be a computer-readable medium, such as volatile or non-volatile memory. The storage device(s) 2714 may provide storage for the system 2102 and, in some embodiments, may be a computer-readable medium. In various aspects, the storage device(s) 2714 may be a flash memory device, a hard disk device, an optical disk device, a tape device, or any other type of storage device.

The I/O devices 2716 may provide input/output operations for the system 2702. The I/O devices 2716 may include a keyboard, a pointing device, and/or a microphone. The I/O devices 2716 may further include a display unit for displaying graphical user interfaces, a speaker, and/or a printer. External data may be stored in one or more accessible external databases 2720.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C)

for ease of understanding, the same interpretation applies to similar phrases in these formats with any number of two or more variables.

In a first aspect, a method for monitoring an active fire comprises: receiving a request from an authorized party for live audio/video (A/V) data from a geographical area of the fire; identifying a plurality of A/V recording and communication devices in the geographical area of the fire; sending an authorization request to a plurality of client devices that each is associated with at least one of the A/V recording and communication devices, the authorization request for accessing live A/V data generated by the A/V recording and communication devices; receiving authorization from at least one of the client devices for accessing the live A/V data generated by at least one A/V recording and communication device associated with the at least one client device; and providing the live A/V data generated by the at least one A/V recording and communication device to the authorized party.

An embodiment of the first aspect further comprises: updating the geographical area of the fire using the live A/V data received from the at least one A/V recording and communication device associated with the at least one client device; and sending the updated geographical area of the fire to the authorized party.

In an embodiment of the first aspect, updating the geographical area comprises using computer vision to determine whether one or more signs of the active fire are identified in the live A/V data received from the at least one A/V recording and communication device.

In another embodiment of the first aspect, the plurality of A/V recording and communication devices is a first plurality of A/V recording and communication devices and the plurality of client devices is a first plurality of client devices, the method further comprises: based on the updated geographical area of the fire, sending a request to a second plurality of client devices that each is associated with at least one A/V recording and communication device in a second plurality of A/V recording and communication devices, the request for providing live A/V data generated by the second plurality of A/V recording and communication devices to the authorized party; receiving authorization for providing the live A/V data from at least one of the client devices in the second plurality of client devices; and providing the live A/V data generated by one or more A/V recording and communication devices associated with the at least one client device in the second plurality of the client devices to the authorized party.

Another embodiment of the first aspect further comprises: receiving a signal from the authorized party indicating an end to the active fire in at least a portion of the geographical area; and terminating providing of the live A/V data to the authorized party from a set of A/V recording and communication devices located within the at least a portion of the geographical area.

Another embodiment of the first aspect further comprises: receiving a signal from at least one A/V recording and communication device in the geographical area that no signs of active fire is detected; and terminating providing of the live A/V data to the authorized party from the at least one A/V recording and communication device that sends the signal.

In another embodiment of the first aspect, the authorization request sent to the plurality of client devices is for providing the live A/V data of the associated A/V recording and communication devices to the authorized party for a temporary duration while the fire is active.

In another embodiment of the first aspect, the authorization request provides an option to each client device to authorize accessing the live A/V data from all A/V recording and communication devices associated with the client device.

In another embodiment of the first aspect, the authorization request provides an option to each client device to authorize access to the live A/V data from a subset of the A/V recording and communication devices associated with the client device.

In another embodiment of the first aspect, the authorized party is one of a firefighting authority, a disaster management authority, a neighborhood watch group, a search and rescue team, a police department, a government agency, a government emergency response team, and a civil emergency response team.

In another embodiment of the first aspect, the authorization request is for providing the live A/V data to the authorized party and authorizing the authorized party to provide the live A/V data to at least one additional party.

In another embodiment of the first aspect, the additional party is one of a firefighting authority, a news reporting outlet, a disaster management authority, a neighborhood watch group, a search team, a rescue team, a police department, a government agency, a government emergency response team, a civil emergency response team, and an aerial firefighting team.

Another embodiment of the first aspect further comprises: using computer vision to analyze the live A/V data received from the A/V recording and communication devices associated with the at least one client device; based on the analysis, identifying a location of at least one person or one animal in need of rescue; and sending the location and an identification of the at least one person or one animal to one of the authorized party and a rescuing authority.

In another embodiment of the first aspect, the rescuing authority is one of a firefighting authority, a disaster management authority, a search and rescue team, a police department, a government agency, a government emergency response team, and a civil emergency response team.

Another embodiment of the first aspect further comprises: using computer vision to analyze the live A/V data received from the A/V recording and communication devices associated with the at least one client device; based on the analysis, determining that the active fire is approaching a location of a first A/V recoding and communication device; and sending the location of the first A/V recoding and communication device to the authorized party.

In another embodiment of the first aspect, providing the live A/V data from the at least one A/V recording and communication devices associated with the at least one of the client devices to the authorized party comprises: receiving the live A/V data from the at least one A/V recording and communication device at one or more networked devices associated with the at least one client device; and providing the live A/V data from the one or more networked devices to the authorized party.

Another embodiment of the first aspect further comprises: receiving a request from a first client device in the at least one of the client devices to stop the live A/V data to the authorized party from at least one A/V recoding and communication device associated with the first client device; and terminating the live A/V data to the authorized party from the at least one A/V recoding and communication device associated the first client device.

Another embodiment of the first aspect further comprises: prior to receiving the request from the authorized party for the live A/V data from the geographical area of the fire, receiving a signal from an A/V recording and communication device in the geographical area of the fire indicating one or more signs of an active fire detected by the A/V recording and communication device; and sending a signal to the authorized party indicating an existence of an active fire.

In another embodiment of the first aspect, receiving the authorization request from the authorized party for the live A/V data from the geographical area of the fire is in response to sending the signal to the authorized party indicating the existence of the active fire.

In a second aspect, a networked device comprises: a processing unit configured to: receive a request from an authorized party for live audio/video (A/V) data from a geographical area of the fire; identify a plurality of A/V recording and communication devices in the geographical area of the fire; send an authorization request to a plurality of client devices that each is associated with at least one of the A/V recording and communication devices, the authorization request for accessing live A/V data generated by the A/V recording and communication devices; receive authorization from at least one of the client devices for accessing the live A/V data generated by at least one A/V recording and communication device associated with the at least one client device; and provide the live A/V data generated by the at least one A/V recording and communication device to the authorized party.

In an embodiment of the second aspect, the processing unit is further configured to: update the geographical area of the fire using the live A/V data received from the at least one A/V recording and communication device associated with the at least one client device; and send the updated geographical area of the fire to the authorized party.

In another embodiment of the second aspect, updating the geographical area comprises using computer vision to determine whether one or more signs of the active fire are identified in the live A/V data received from the at least one A/V recording and communication device.

In another embodiment of the second aspect, the plurality of A/V recording and communication devices is a first plurality of A/V recording and communication devices and the plurality of client devices is a first plurality of client devices, the processing unit further configured to: send, based on the updated geographical area of the fire, a request to a second plurality of client devices that each is associated with at least one A/V recording and communication device in a second plurality of A/V recording and communication devices, the request for providing live A/V data generated by the second plurality of A/V recording and communication devices to the authorized party; receive authorization for providing the live A/V data from at least one of the client devices in the second plurality of client devices; and provide the live A/V data generated by one or more A/V recording and communication devices associated with the at least one client device in the second plurality of the client devices to the authorized party.

In another embodiment of the second aspect, the processing unit is further configured to: receive a signal from the authorized party indicating an end to the active fire in at least a portion of the geographical area; and terminate providing of the live A/V data to the authorized party from a set of A/V recording and communication devices located within the at least a portion of the geographical area.

In another embodiment of the second aspect, the processing unit is further configured to: receive a signal from at least one A/V recording and communication device in the geographical area that no signs of active fire is detected; and terminate providing of the live A/V data to the authorized party from the at least one A/V recording and communication device that sends the signal.

In another embodiment of the second aspect, the authorization request sent to the plurality of client devices is for providing the live A/V data of the associated A/V recording and communication devices to the authorized party for a temporary duration while the fire is active.

In another embodiment of the second aspect, the authorization request provides an option to each client device to authorize accessing the live A/V data from all A/V recording and communication devices associated with the client device.

In another embodiment of the second aspect, the authorization request provides an option to each client device to authorize access to the live A/V data from a subset of the A/V recording and communication devices associated with the client device.

In another embodiment of the second aspect, the authorized party is one of a firefighting authority, a disaster management authority, a neighborhood watch group, a search and rescue team, a police department, a government agency, a government emergency response team, and a civil emergency response team.

In another embodiment of the second aspect, the authorization request is for providing the live A/V data to the authorized party and authorizing the authorized party to provide the live A/V data to at least one additional party.

In another embodiment of the second aspect, the additional party is one of a firefighting authority, a news reporting outlet, a disaster management authority, a neighborhood watch group, a search team, a rescue team, a police department, a government agency, a government emergency response team, a civil emergency response team, and an aerial firefighting team.

In another embodiment of the second aspect, the processing unit is further configured to: use computer vision to analyze the live A/V data received from the A/V recording and communication devices associated with the at least one client device; identify, based on the analysis, a location of at least one person or one animal in need of rescue; and send the location and an identification of the at least one person or one animal to one of the authorized party and a rescuing authority.

In another embodiment of the second aspect, the rescuing authority is one of a firefighting authority, a disaster management authority, a search and rescue team, a police department, a government agency, a government emergency response team, and a civil emergency response team.

In another embodiment of the second aspect, the processing unit is further configured to: use computer vision to analyze the live A/V data received from the A/V recording and communication devices associated with the at least one client device; determine, based on the analysis, that the active fire is approaching a location of a first A/V recoding and communication device; and send the location of the first A/V recoding and communication device to the authorized party.

In another embodiment of the second aspect, providing the live A/V data from the at least one A/V recording and communication devices associated with the at least one of the client devices to the authorized party comprises: receiving the live A/V data from the at least one A/V recording and communication device at one or more networked devices associated with the at least one client device; and providing the live A/V data from the one or more networked devices to the authorized party.

In another embodiment of the second aspect, the processing unit further configured to: receive a request from a first client device in the at least one of the client devices to stop the live A/V data to the authorized party from at least one A/V recoding and communication device associated with the first client device; and terminate the live A/V data to the authorized party from the at least one A/V recoding and communication device associated the first client device.

In another embodiment of the second aspect, the processing unit further configured to: receive, prior to receiving the request from the authorized party for the live A/V data from the geographical area of the fire, a signal from an A/V recording and communication device in the geographical area of the fire indicating one or more signs of an active fire detected by the A/V recording and communication device; and send a signal to the authorized party indicating an existence of an active fire.

In another embodiment of the second aspect, receiving the authorization request from the authorized party for the live A/V data from the geographical area of the fire is in response to sending the signal to the authorized party indicating the existence of the active fire.

In a third aspect, a method of monitoring active fires comprises: sending a request to one or more client devices associated with one or more audio/video (A/V) recording and communication devices to provide preauthorization for providing live A/V data of the A/V recording and communication devices to an authorized party; receiving preauthorization for providing the live A/V data from at least one of the client devices; receiving a request from the authorized party for live A/V data from a geographical area of an active fire; identifying one or more A/V recording and communication devices, in the geographical area of the active fire, that have preauthorized providing the live A/V data to the authorized party; and providing the live A/V data from one or more A/V recording and communication devices associated with the at least one client device to the authorized party.

An embodiment of the third aspect comprises: updating the geographical area of the fire using the live A/V data received from the at least one A/V recording and communication device associated with the at least one client device; and sending the updated geographical area of the fire to the authorized party.

In an embodiment of the third aspect, updating the geographical area comprises using computer vision to determine whether one or more signs of the active fire are identified in the live A/V data received from the at least one A/V recording and communication device.

In another embodiment of the third aspect, the plurality of A/V recording and communication devices is a first plurality of A/V recording and communication devices and the plurality of client devices is a first plurality of client devices, the method further comprising: based on the updated geographical area of the fire, sending a request to a second plurality of client devices that each is associated with at least one A/V recording and communication device in a second plurality of A/V recording and communication devices, the request for providing live A/V data generated by the second plurality of A/V recording and communication devices to the authorized party; receiving authorization for providing the live A/V data from at least one of the client devices in the second plurality of client devices; and providing the live A/V data generated by one or more A/V recording and communication devices associated with the at least one client device in the second plurality of the client devices to the authorized party.

Another embodiment of the third aspect comprises: receiving a signal from the authorized party indicating an end to the active fire in at least a portion of the geographical area; and terminating providing of the live A/V data to the authorized party from a set of A/V recording and communication devices located within the at least a portion of the geographical area.

Another embodiment of the third aspect comprises: receiving a signal from at least one A/V recording and communication device in the geographical area that no signs of active fire is detected; and terminating providing of the live A/V data to the authorized party from the at least one A/V recording and communication device that sends the signal.

In a fourth aspect, a method of monitoring active fires, the method comprises: receiving a request from an authorized party for live A/V data from a geographical area of an active fire; identifying one or more A/V recording and communication devices, in the geographical area of the active fire, that have preauthorized providing the live A/V data to the authorized party; and providing the live A/V data from one or more A/V recording and communication devices associated with the at least one client device to the authorized party.

An embodiment of the fourth aspect comprises: prior to receiving the request from the authorized party for the live A/V data from the geographical area of the active fire, receiving a signal from an A/V recording and communication device in the geographical area of the fire indicating one or more signs of an active fire is detected by the A/V recording and communication device; and sending a signal to the authorized party indicating an existence of an active fire.

In an embodiment of the fourth aspect, receiving the request from the authorized party for the live A/V data from the geographical area of the active fire is in response to sending the signal to the authorized party indicating the existence of the active fire.

In another embodiment of the fourth aspect, the authorized party is one of a firefighting authority, a disaster management authority, a neighborhood watch group, a search and rescue team, a police department, a government agency, a government emergency response team, and a civil emergency response team.

In another embodiment of the fourth aspect, the authorization request is for providing the live A/V data to the authorized party and authorizing the authorized party to provide the live A/V data to at least one additional party.

In another embodiment of the fourth aspect, the additional party is one of a firefighting authority, a news reporting outlet, a disaster management authority, a neighborhood watch group, a search team, a rescue team, a police department, a government agency, a government emergency response team, a civil emergency response team, and an aerial firefighting team.

In a fifth aspect, a computer program application for monitoring active fires is being embodied in code executable by at least one processing unit of a networked device, the program comprises sets of instructions that, when executed, cause the networked device to: receive a request from an authorized party for live A/V data from a geographical area of an active fire; identify one or more A/V recording and communication devices, in the geographical area of the active fire, that have preauthorized providing the live A/V data to the authorized party; and provide the live A/V data from one or more A/V recording and communication devices associated with the at least one client device to the authorized party.

In an embodiment of the fifth aspect, the program further comprises sets of instructions that, when executed, cause the networked device to: receive, prior to receiving the request from the authorized party for the live A/V data from the geographical area of the active fire, a signal from an A/V recording and communication device in the geographical area of the fire indicating one or more signs of an active fire is detected by the A/V recording and communication device; and send a signal to the authorized party indicating an existence of an active fire.

In another embodiment of the fifth aspect, receiving the request from the authorized party for the live A/V data from the geographical area of the active fire is in response to sending the signal to the authorized party indicating the existence of the active fire.

In another embodiment of the fifth aspect, the authorized party is one of a firefighting authority, a disaster management authority, a neighborhood watch group, a search and rescue team, a police department, a government agency, a government emergency response team, and a civil emergency response team.

In another embodiment of the fifth aspect, the authorization request is for providing the live A/V data to the authorized party and authorizing the authorized party to provide the live A/V data to at least one additional party.

In another embodiment of the fifth aspect, the additional party is one of a firefighting authority, a news reporting outlet, a disaster management authority, a neighborhood watch group, a search team, a rescue team, a police department, a government agency, a government emergency response team, a civil emergency response team, and an aerial firefighting team.

In a sixth aspect, a method of monitoring an active emergency comprises: identifying one or more audio/video (A/V) recording and communication devices in a geographical area within which the active emergency is occurring; and providing live A/V data from at least one A/V recording and communication device associated with at least one client device that has authorized providing the live A/V data to an authorized party.

An embodiment of the sixth aspect comprises: sending a request to the at least one client device to provide preauthorization for the live A/V data of the A/V recording and communication devices to the authorized party prior to a start of the emergency disaster; and receiving preauthorization for providing the live A/V data from the at least one client device, where providing the live A/V data from the at least one A/V recording and communication device associated with the at least one client device comprises determining that the preauthorization is received from the at least one client device.

Another embodiment of the sixth aspect comprises: receiving a request from the authorized party for live A/V data from the geographical area of the emergency disaster after a start of the emergency disaster; identifying a plurality of A/V recording and communication devices in the geographical area of the emergency disaster; sending an authorization request to a plurality of client devices that each is associated with at least of the one of the A/V recording and communication devices, the authorization request for accessing live A/V data generated by the A/V recording and communication devices; and receiving authorization for providing live A/V data from the at least one client device prior to providing the live A/V data from the at least one A/V recording and communication device associated with the at least one client device.

In an embodiment of the sixth aspect, the emergency disaster is one of a manmade fire, a wildfire, a tornado, a hurricane, a cyclone, a typhoon, a flood, a volcano, and an earthquake.

In a seventh aspect, a method of monitoring an active fire at an electronic device implementing a firefighting portal comprises: at the electronic device, receiving a signal identifying a location of an active fire; determining a geographical area of the active fire, at least partially, based on the received signal; sending a request for receiving live A/V data from one or more A/V recording and communication devices in the geographical area of the active fire; and receiving at least one live A/V data provided by at least one of the A/V recording and communication devices.

In an embodiment of the seventh aspect, the request for receiving live A/V data is sent to one or more networked devices communicating with the one or more A/V recording and communication devices in the geographical area of the active fire, and wherein the at least one live A/V data is received from the at least one A/V recording and communication devices through the one or more networked devices.

In another embodiment of the seventh aspect, the geographical area of the active fire is determined, at least partially, based on a distance from the identified location of the active fire.

In another embodiment of the seventh aspect, the geographical area of the active fire is determined, at least partially, based on a topography of an area around the identified location of the active fire.

In another embodiment of the seventh aspect, the geographical area of the active fire is determined, at least partially, based on whether conditions in an area around the identified location of the active fire.

In another embodiment of the seventh aspect, the geographical area of the active fire is determined, at least partially, based on a residential map of an area around the identified location of the active fire.

In another embodiment of the seventh aspect, determining the geographical area of the active fire comprises: displaying, on a display of the electronic device, a map of an area including the identified location of the active fire; receiving one or more inputs identifying one or more locations of interest on the map; and determining the geographical area of the active fire based on the identified location of the fire and the one or more locations of interest.

In an eight aspect, an electronic device implementing a firefighting portal for monitoring an active fire comprises: a processing unit configured to: receive a signal at the electronic device identifying a location of an active fire; determine a geographical area of the active fire, at least partially, based on the received signal; send a request for receiving live A/V data from one or more A/V recording and communication devices in the geographical area of the active fire; and receive at least one live A/V data provided by at least one of the A/V recording and communication devices.

In an embodiment of the eight aspect, the request for receiving live A/V data is sent to one or more networked devices communicating with the one or more A/V recording and communication devices in the geographical area of the active fire, and wherein the at least one live A/V data is received from the at least one A/V recording and communication devices through the one or more networked devices.

In another embodiment of the eight aspect, the geographical area of the active fire is determined, at least partially, based on a distance from the identified location of the active fire.

In another embodiment of the eight aspect, the geographical area of the active fire is determined, at least partially, based on a topography of an area around the identified location of the active fire.

In another embodiment of the eight aspect, the geographical area of the active fire is determined, at least partially, based on whether conditions in an area around the identified location of the active fire.

In another embodiment of the eight aspect, the geographical area of the active fire is determined, at least partially, based on a residential map of an area around the identified location of the active fire.

In another embodiment of the eight aspect, determining the geographical area of the active fire comprises: displaying, on a display of the electronic device, a map of an area including the identified location of the active fire; receiving one or more inputs identifying one or more locations of interest on the map; and determining the geographical area of the active fire based on the identified location of the fire and the one or more locations of interest.

In a ninth aspect, a method for providing live audio/video (A/V) data during an alarm condition to a law enforcement agency's portal comprises: at a networked device, receiving a signal from a security system's device indicating a detection of an alarm condition; determining one or more A/V devices of the security system that are authorized to capture the live A/V data during the alarm condition for sharing with the law enforcement agency's portal; sending one or more signals to the authorized A/V devices to capture the live A/V data during the alarm condition; and providing the live A/V data captured by the authorized A/V devices from the networked device to the law enforcement agency's portal during the alarm condition.

In an embodiment of the ninth aspect, the security system's device is one of a security sensor and an A/V recording and communication device.

In another embodiment of the ninth aspect, the security sensor is one of a door sensor, a window sensor, a contact sensor, glass break sensor, and a motion sensor, and wherein the A/V recording and communication device is one of a floodlight camera, a spotlight camera, and a video doorbell.

An embodiment of the ninth aspect comprises: prior to the determination, receiving a request from a client device associated with the security system to authorize the one or more A/V devices to capture the live A/V data during the alarm condition for sharing with the law enforcement agency's portal.

In another embodiment of the ninth aspect, sending the one or more signals to an authorized A/V device to capture the live A/V data during the alarm condition comprises sending one or more signals to the authorized A/V device to activate a camera of A/V device to capture the live A/V data.

Another embodiment of the ninth aspect comprises: receiving a signal indicating an end of the alarm condition; and sending one or more signals to the authorized A/V devices to stop capturing the live A/V data.

In another embodiment of the ninth aspect, the signal indicating an end of the alarm condition is received from one of a client device associated with the alarm system, a security hub associated with the alarm system, and the law enforcement agency's portal.

In a tenth aspect, an audio/video (A/V) recording and communication device, the A/V recording and communication device comprises: a processing unit; a camera configured to capture A/V data; and a gyro sensor configured to: detect shaking during an earthquake; and send a signal to the processing unit indicating the detection of the shaking; the processing unit is configured to: receive the signal indicating the detection of the shaking from the gyro sensor; in response to receiving the signal, send a signal to the camera to capture A/V data during the earthquake; receive the captured A/V data from the camera; and send the A/V data to one or more networked devices.

In an embodiment of the tenth aspect, the gyro sensor is further configured to: detect the shaking has stopped; and send a signal to the processing unit indicating the stop of the shaking; and the processing unit is further configured to: receive the signal indicating the stop of the shaking from the gyro sensor; and in response to receiving the signal indicating the stop of the shaking, send a signal to the camera to stop capturing the A/V data.

In another embodiment of the tenth aspect, the processing unit is configured to enter an earthquake mode in respond to receiving the signal from the gyro sensor indicating the detection of the shaking, the processing unit configured to leave the earthquake mode in response to receiving the signal from the gyro sensor indicating the stop of the shaking, and the processing unit configured to cause the camera to capture the A/V data for a duration of the earthquake mode.

In another embodiment of the tenth aspect, the A/V recording and communication device further comprises a memory, the processing unit is further configured to store the A/V data received from the camera during the earthquake mode in the memory.

In another embodiment of the tenth aspect, the gyro sensor is one of a microelectromechanical system (MEMS) gyro sensor, a tuning fork gyro sensor, a vibrating-wheel gyro sensor, a wine glass resonator gyro sensor, and a Foucault pendulum gyros sensors.

In another embodiment of the tenth aspect, the signal from the gyro sensor indicating the detection of the shaking causes an interrupt to the processing unit.

In an eleventh aspect, an audio/video (A/V) recording and communication device comprises: a processing unit; a camera configured to capture A/V data; and an inertial sensor configured to send a signal to the processing unit in response to detection of the shaking during an earthquake; the processing unit is configured to: send a signal to the camera to capture and send A/V data during the earthquake in response to receiving the signal; and send the A/V data received from the camera to one or more networked devices.

In an embodiment of the eleventh aspect, the inertial sensor is one of a gyro sensor and an accelerometer sensor.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for monitoring an active fire, the method comprising:
    receiving a request from an authorized party for live audio/video (A/V) data from a geographical area of the fire;
    identifying a plurality of A/V recording and communication devices in the geographical area of the fire;
    sending, in response to receiving the request from the authorized party for live A/V data, an authorization request to a plurality of client devices that each is associated with at least one of the A/V recording and communication devices, the authorization request for accessing live A/V data generated by the A/V recording and communication devices;
    receiving authorization from at least one of the client devices for accessing the live A/V data generated by at least one A/V recording and communication device associated with the at least one client device; and
    providing the live A/V data generated by the at least one A/V recording and communication device to the authorized party.

2. The method of claim 1 further comprising:
    updating the geographical area of the fire using the live A/V data received from the at least one A/V recording and communication device associated with the at least one client device; and
    sending the updated geographical area of the fire to the authorized party.

3. The method of claim 2, wherein updating the geographical area comprises using computer vision to determine whether one or more signs of the active fire are identified in the live A/V data received from the at least one A/V recording and communication device.

4. The method of claim 2, wherein the plurality of A/V recording and communication devices is a first plurality of A/V recording and communication devices and the plurality of client devices is a first plurality of client devices, the method further comprising:
    based on the updated geographical area of the fire, sending a request to a second plurality of client devices that each is associated with at least one A/V recording and communication device in a second plurality of A/V recording and communication devices, wherein the request is for providing live A/V data generated by the second plurality of A/V recording and communication devices to the authorized party;
    receiving authorization for providing the live A/V data from at least one of the client devices in the second plurality of client devices; and
    providing the live A/V data generated by one or more A/V recording and communication devices associated with the at least one client device in the second plurality of the client devices to the authorized party.

5. The method of claim 1 further comprising:
    receiving a signal from the authorized party indicating an end to the active fire in at least a portion of the geographical area; and
    terminating providing of the live A/V data to the authorized party from a set of A/V recording and communication devices located within the at least a portion of the geographical area.

6. The method of claim 1, wherein the authorization request sent to the plurality of client devices is for providing the live A/V data of the associated A/V recording and communication devices to the authorized party for a temporary duration while the fire is active.

7. The method of claim 1, wherein the authorization request provides an option to each client device to authorize access to the live A/V data from a subset of the A/V recording and communication devices associated with the client device.

8. The method of claim 1, wherein the authorized party is one of a firefighting authority, a disaster management authority, a neighborhood watch group, a search and rescue team, a police department, a government agency, a government emergency response team, and a civil emergency response team.

9. The method of claim 1 further comprising:
    using computer vision to analyze the live A/V data received from the A/V recording and communication devices associated with the at least one client device;
    based on the analysis, identifying a location of at least one person or one animal in need of rescue; and
    sending the location and an identification of the at least one person or one animal to one of the authorized party and a rescuing authority.

10. The method of claim 1 further comprising:
    prior to receiving the request from the authorized party for the live A/V data from the geographical area of the fire, receiving a signal from an A/V recording and communication device in the geographical area of the fire indicating one or more signs of an active fire detected by the A/V recording and communication device; and
    sending a signal to the authorized party indicating an existence of an active fire, wherein receiving the authorization request from the authorized party for the live A/V data from the geographical area of the fire is in response to sending the signal to the authorized party indicating the existence of the active fire.

11. A method of monitoring an active emergency event, the method comprising:
    identifying one or more audio/video (A/V) recording and communication devices in a geographic area within which the active emergency event is occurring;
    receiving a request from an authorized party for live A/V data from the geographic area of the active emergency event after a start of the active emergency event;
    sending, in response to receiving the request from the authorized party, an authorization request to one or more client devices, wherein each of the one or more client devices is associated with at least one of the one or more A/V recording and communication devices, the authorization request for accessing live A/V data generated by the at least one of the one or more A/V recording and communication devices;
    receiving authorization from the one or more client devices for accessing live A/V data from the one or more client devices; and
    providing live A/V data from the at least one of the one or more A/V recording and communication devices to the authorized party.

12. The method of claim 11, wherein:
    the receiving authorization for providing live A/V data from the one or more client devices occurs prior to providing the live A/V data from the at least one of the one or more A/V recording and communication devices.

13. The method of claim 11, wherein the active emergency event is one of a manmade fire, a wildfire, a tornado, a hurricane, a cyclone, a typhoon, a flood, a volcano, and an earthquake.

14. A method for capturing video of an active emergency event, comprising:
   receiving a notification from an emergency portal that the active emergency event is occurring;
   determining a geographic area associated with the active emergency event;
   identifying one or more audio/video recording and communication devices (A/V devices) within the geographic area;
   transmitting, in response to the identifying, access requests to one or more client devices associated with the one or more A/V devices within the geographic area; and
   receiving access responses from the one or more client devices;
   transmitting, to the one or more A/V devices, one or more requests for the video data from the one or more A/V devices; and
   receiving the video data from the one or more A/V devices.

15. The method of claim 14, wherein determining the geographic area associated with the active emergency event comprises receiving an indication of the geographic area from the emergency portal.

16. The method of claim 14, wherein identifying the one or more A/V devices within the geographic area for which access to video data from the one or more A/V devices has been authorized comprises determining one or more A/V devices within the geographic area for which access to video data from the one or more A/V devices has been pre-authorized.

17. The method of claim 14, further comprising:
   transmitting the video data to one or more requesting devices.

* * * * *